(12) United States Patent
Park et al.

(10) Patent No.: US 11,921,347 B2
(45) Date of Patent: Mar. 5, 2024

(54) LENS MOVING APPARATUS, AND CAMERA MODULE AND OPTICAL INSTRUMENT COMPRISING SAME

(71) Applicant: LG INNOTEK CO., LTD., Seoul (KR)

(72) Inventors: Sang Ok Park, Seoul (KR); Sang Jun Min, Seoul (KR); Byung Wook Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/809,839

(22) Filed: Jun. 29, 2022

(65) Prior Publication Data
US 2022/0326474 A1 Oct. 13, 2022

Related U.S. Application Data

(63) Continuation of application No. 16/338,328, filed as application No. PCT/KR2017/010605 on Sep. 26, 2017, now Pat. No. 11,409,071.

(30) Foreign Application Priority Data

| Sep. 30, 2016 | (KR) | 10-2016-0126652 |
| Sep. 30, 2016 | (KR) | 10-2016-0126653 |
| Oct. 11, 2016 | (KR) | 10-2016-0131103 |

(51) Int. Cl.
*G02B 7/09* (2021.01)
*G02B 7/08* (2021.01)
(Continued)

(52) U.S. Cl.
CPC ............... *G02B 7/09* (2013.01); *G02B 7/08* (2013.01); *G02B 27/646* (2013.01); *G03B 5/00* (2013.01);
(Continued)

(58) Field of Classification Search
CPC ........ G02B 7/09; G02B 27/646; G02B 7/028; G02B 7/08; G03B 5/00; G03B 13/36;
(Continued)

(56) References Cited

U.S. PATENT DOCUMENTS

| 2013/0135762 A1 | 5/2013 | Lee et al. |
| 2015/0212291 A1 | 7/2015 | Lee |

(Continued)

FOREIGN PATENT DOCUMENTS

| CN | 104702081 A | 6/2015 |
| CN | 104902149 A | 9/2015 |

(Continued)

OTHER PUBLICATIONS

International Search Report in International Application No. PCT/KR2017/010605, filed Sep. 26, 2017.

(Continued)

*Primary Examiner* — Marin Pichler
(74) *Attorney, Agent, or Firm* — Saliwanchik, Lloyd & Eisenschenk

(57) ABSTRACT

An embodiment comprises: a housing comprising side parts, a first corner part, a second corner part, a third corner part, and a fourth corner part, in which each of the first corner part, the second corner part, the third corner part and the fourth corner is disposed between two adjacent side parts; a bobbin disposed in the housing; a first coil disposed on an outer surface of the bobbin; first magnets disposed on the side parts of the housing; a first circuit board disposed on the first corner part and comprising a first pad, a second pad, a third pad, a fourth pad, a fifth pad and a sixth pad; a first location sensor disposed on the first circuit board and electrically connected to the first pad, the second pad, the third pad, the fourth pad, the fifth pad and the sixth pad; first, second, third and fourth upper springs disposed apart from (Continued)

each other on the housing; and first and second lower springs coupled to a lower portion of the housing, electrically connected with the first coil, and coupled to the fifth and sixth pads, wherein each of the first to fourth upper springs is coupled to a corresponding one of the first to fourth pads in the first corner part.

18 Claims, 36 Drawing Sheets

(51) Int. Cl.
  *G02B 27/64* (2006.01)
  *G03B 5/00* (2021.01)
  *G03B 13/36* (2021.01)
  *H04N 5/225* (2006.01)
  *H04N 23/55* (2023.01)
(52) U.S. Cl.
  CPC ............ *G03B 13/36* (2013.01); *H04N 23/55* (2023.01); *G03B 2205/0007* (2013.01)
(58) Field of Classification Search
  CPC .... G03B 2205/0007; G03B 2205/0015; G03B 2205/0069; H04N 5/2254; H04N 5/2257; H02K 41/0356; H02K 41/035
  USPC .......................... 359/823, 824, 557; 348/208
  See application file for complete search history.

(56) References Cited

U.S. PATENT DOCUMENTS

| 2015/0309282 | A1 | 10/2015 | Lee et al. |
| 2015/0331251 | A1 | 11/2015 | Hu et al. |
| 2016/0054578 | A1 | 2/2016 | Dong |
| 2016/0274328 | A1 | 9/2016 | Shin et al. |
| 2017/0115466 | A1* | 4/2017 | Murakami ............... G03B 5/00 |
| 2017/0192195 | A1* | 7/2017 | Murakami ........... G02B 27/646 |
| 2017/0371127 | A1 | 12/2017 | Murakami |
| 2018/0011284 | A1 | 1/2018 | Park et al. |
| 2018/0026515 | A1 | 1/2018 | Park et al. |
| 2018/0120532 | A1 | 5/2018 | Murakami et al. |
| 2018/0239217 | A1 | 8/2018 | Konuma et al. |
| 2018/0246296 | A1 | 8/2018 | Sugawara |

FOREIGN PATENT DOCUMENTS

| CN | 105607213 A | 5/2016 |
| CN | 105739051 A | 7/2016 |
| JP | H08-15599 A | 1/1996 |
| JP | 2014-56031 A | 3/2014 |
| KR | 10-2015-0128262 A | 11/2015 |
| KR | 10-2015-0128264 A | 11/2015 |
| KR | 10-2016-0008860 A | 1/2016 |
| KR | 10-2016-0035244 A | 3/2016 |
| KR | 10-2016-0073763 A | 6/2016 |
| KR | 10-2016-0075100 A | 6/2016 |
| KR | 10-2016-0089703 A | 7/2016 |
| KR | 10-2016-0094636 A | 8/2016 |
| KR | 10-2016-0112126 A | 9/2016 |
| TW | 201015985 A | 4/2010 |
| WO | 2016/006239 A1 | 1/2016 |
| WO | 2016/099051 A1 | 6/2016 |
| WO | 2016/126061 A1 | 8/2016 |

OTHER PUBLICATIONS

Supplementary European Search Report dated Jul. 9, 2019 in European Application No. 17856695.6.
Office Action dated Nov. 9, 2020 in Chinese Application No. 201780068218.2.
Office Action dated Dec. 10, 2021 in U.S. Appl. No. 16/338,328.
Notice of Allowance dated Mar. 29, 2022 in U.S. Appl. No. 16/338,328.
European Search Report dated May 26, 2023 in European Application No. 22201558.8.

* cited by examiner

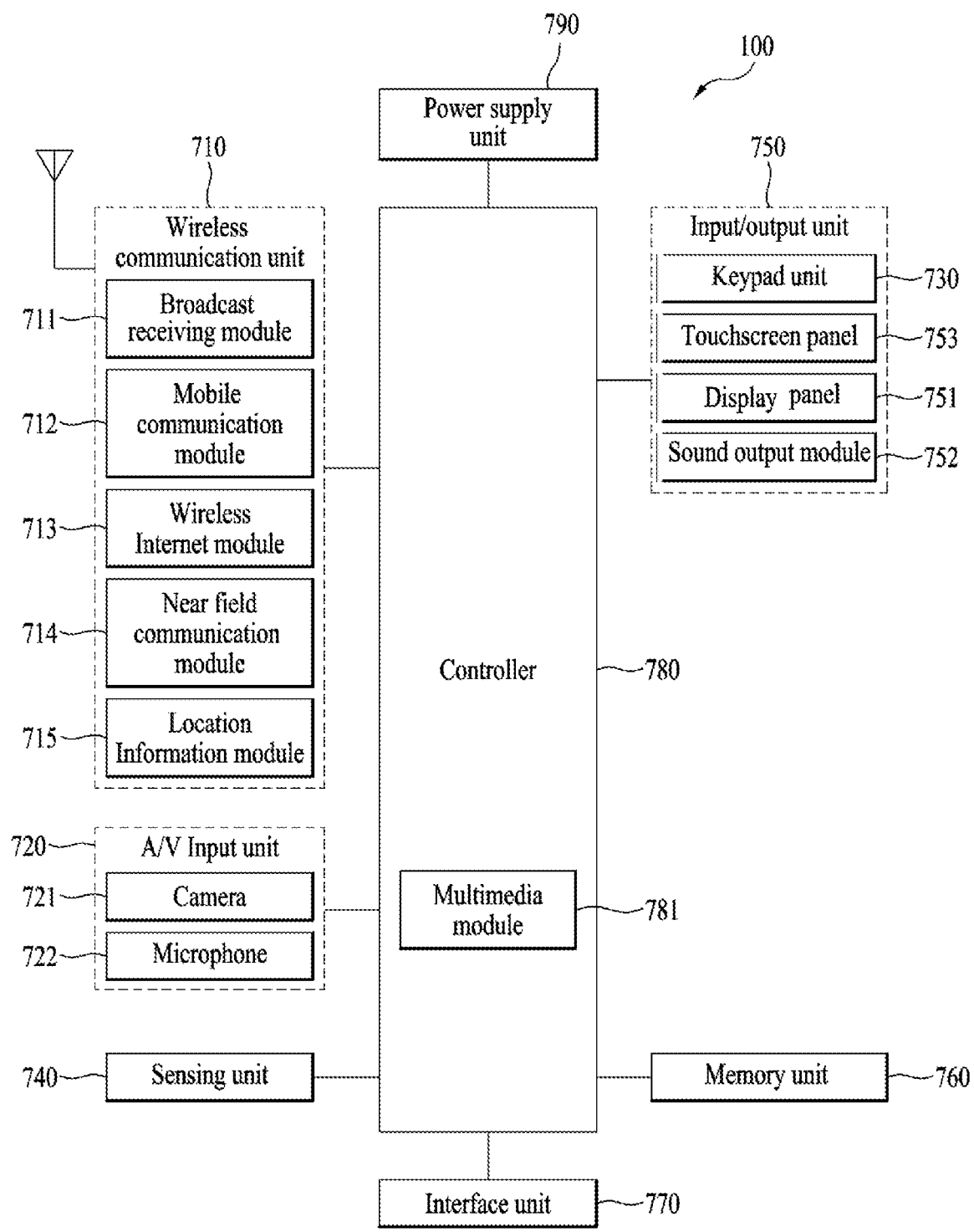

LENS MOVING APPARATUS, AND CAMERA MODULE AND OPTICAL INSTRUMENT COMPRISING SAME

CROSS-REFERENCE TO RELATED APPLICATIONS

This application is a continuation of U.S. application Ser. No. 16/338,328, filed Mar. 29, 2019; which is the U.S. national stage application of International Patent Application No. PCT/KR2017/010605, filed Sep. 26, 2017, which claims the benefit under 35 U.S.C. § 119 of Korean Application Nos. 10-2016-0126652, filed Sep. 30, 2016; 10-2016-0126653, filed Sep. 30, 2016; and 10-2016-0131103, filed Oct. 11, 2016; all of which are hereby incorporated by reference in their entirety.

TECHNICAL FIELD

Embodiments relate to a lens moving apparatus, and a camera module and optical instrument including the same.

BACKGROUND ART

It is difficult to apply technology of a voice coil motor (VCM) used in a conventional general camera module for miniaturization and low power consumption, and thus research has been actively conducted thereon.

Electronic products such as a smartphone and a portable phone including a camera installed thereon have gradually consumed and produced. A camera for a portable phone has had high pixel and has been miniaturized in accordance with a current tendency, and accordingly an actuator has also been miniaturized, has had a large caliber, and has been multi-functioned. In order to realize a high-pixel camera for a portable phone, the performance of a camera for a portable phone needs to be enhanced, and additional functions such as auto focusing, shutter shake correction, and zoom function are required.

DISCLOSURE

Technical Problem

Embodiments provide a lens moving apparatus, and a camera module and optical instrument including the same, for reducing the sizes, reducing current consumption, and enhancing the sensitivity of driving of an optical image stabilizer (OIS).

Further, embodiments provide a lens moving apparatus including a hall driver integrated circuit (IC) in which a hall device and a driver are integrated into each other and including a conductive arrangement structure for the hall driver IC, and a camera module and optical instrument including the lens moving apparatus.

Technical Solution

In one embodiment, a lens moving apparatus includes a housing having side portions, a first corner portion, a second corner portion, a third corner portion, and a fourth corner portion, each of the first corner portion, the second corner portion, the third corner portion, and the fourth corner portion being disposed between two adjacent side portions, a bobbin disposed in the housing, a first coil disposed on an external surface of the bobbin, first magnets disposed on the side portions of the housing, a first circuit board disposed at the first corner portion and comprising a first pad, a second pad, a third pad, a fourth pad, a fifth pad, and a sixth pad, a first position sensor disposed on the first circuit board and electrically connected to the first pad, the second pad, the third pad, the fourth pad, the fifth pad, and the sixth pad, a first upper spring, a second upper spring, a third upper spring, and a fourth upper spring, which are disposed to be spaced apart from each other on the housing, and first and second lower springs coupled to a lower portion of the housing, electrically connected to the first coil, and coupled to the fifth and sixth pads, wherein each of the first to fourth upper springs is coupled to a corresponding one of the first to fourth pads at the first corner portion.

The lens moving apparatus may further includes a fifth upper spring disposed at the fourth corner portion, wherein the first and second upper springs may be disposed at the first corner portion and are coupled to a corresponding one of the first and second pads, the third upper spring may be disposed at the second corner portion and is coupled to the third pad, the fourth upper spring may be disposed at the third corner portion and is coupled to the fourth pad, and the fourth corner portion may diagonally face the first corner portion.

The lens moving apparatus may further includes a second circuit board disposed below the first and second lower springs, first and second supporting members disposed at the first corner portion and configured to connect a corresponding one of the first and second upper springs to the second circuit board, at least one third supporting member disposed at the second corner portion and configured to connect the third upper spring to the second circuit board, at least one fourth supporting member disposed at the third corner portion and configured to connect the fourth upper spring to the second circuit board, and at least one fifth supporting member disposed at the fourth corner portion and configured to connect the fifth upper spring to the second circuit board, wherein each of the third to fifth supporting members may include two supporting members that are spaced apart from each other.

Each of the first and second lower springs may include a second internal frame coupled to the bobbin, a second external frame coupled to the housing, and a second frame connecting portion configured to connect the second internal frame to the second external frame, and each of the fifth and sixth pads may be coupled to a corresponding one of second external frames of the first and second lower springs.

The first upper spring may be disposed at the first corner portion, the second upper spring may be disposed at the second corner portion, the third upper spring may be disposed at the third corner portion, the fourth upper spring may be disposed at the fourth corner portion, and the fourth corner portion may diagonally face the first corner portion.

One end of the second upper spring may extend to the first corner portion from the second corner portion, one end of the third upper spring may extend to the first corner portion from the third corner portion, one end of the fourth upper spring may extend to the first corner portion from the fourth corner portion, and one end of each of the first upper spring, the second upper spring, the third upper spring, and the fourth upper spring may be coupled to a corresponding one of the first pad, the second pad, the third pad, and the fourth pad.

The lens moving apparatus may further include a second circuit board disposed below the first and second lower springs, a first supporting member disposed at the first corner portion and coupled between the first upper spring and the second circuit board, a second supporting member disposed at the second corner portion and coupled between the second upper spring and the second circuit board, a third supporting member disposed at the third corner portion and coupled between the third upper spring and the second circuit board, and a fourth supporting member disposed at the fourth corner portion and coupled between the fourth upper spring and the second circuit board.

The first position sensor may transmit signals for data communication to the circuit board or receive the signals from the circuit board through the first to fourth pads, and may provide a driving signal to the first coil through the fifth and sixth pads.

Each of the first to fourth upper springs may include an external frame coupled to the housing; and the external frame may include a first coupling portion coupled to a corresponding one of the first to fourth corner portions, a second coupling portion coupled to a corresponding one of the first to fourth supporting members, and at least one connecting portion configured to connect the first coupling portion to the second coupling portion.

The fourth upper spring may include a $(1-1)^{th}$ external frame coupled to the first corner portion and a $(1-2)^{th}$ external frame coupled to the fourth corner portion, two first internal frames coupled to the bobbin, first frame connecting portions configured to connect the $(1-1)^{th}$ and $(1-2)^{th}$ external frames to the two first internal frames, and a connecting frame configured to connect the two first internal frames to each other.

Advantageous Effects

Embodiments provide a lens moving apparatus, and a camera module and optical instrument including the same, for reducing the sizes, reducing current consumption, and enhancing the sensitivity of driving of an optical image stabilizer (OIS).

Embodiments provide a lens moving apparatus, and a camera module and optical instrument including the same, for accurate auto focus feedback control via a temperature sensing function of a hall driver integrated circuit (IC) even if temperature is changed temperature sensing function.

DESCRIPTION OF DRAWINGS

FIG. 35 is a diagram showing a configuration of the portable terminal shown in FIG. 34.

BEST MODE

Figure 1:
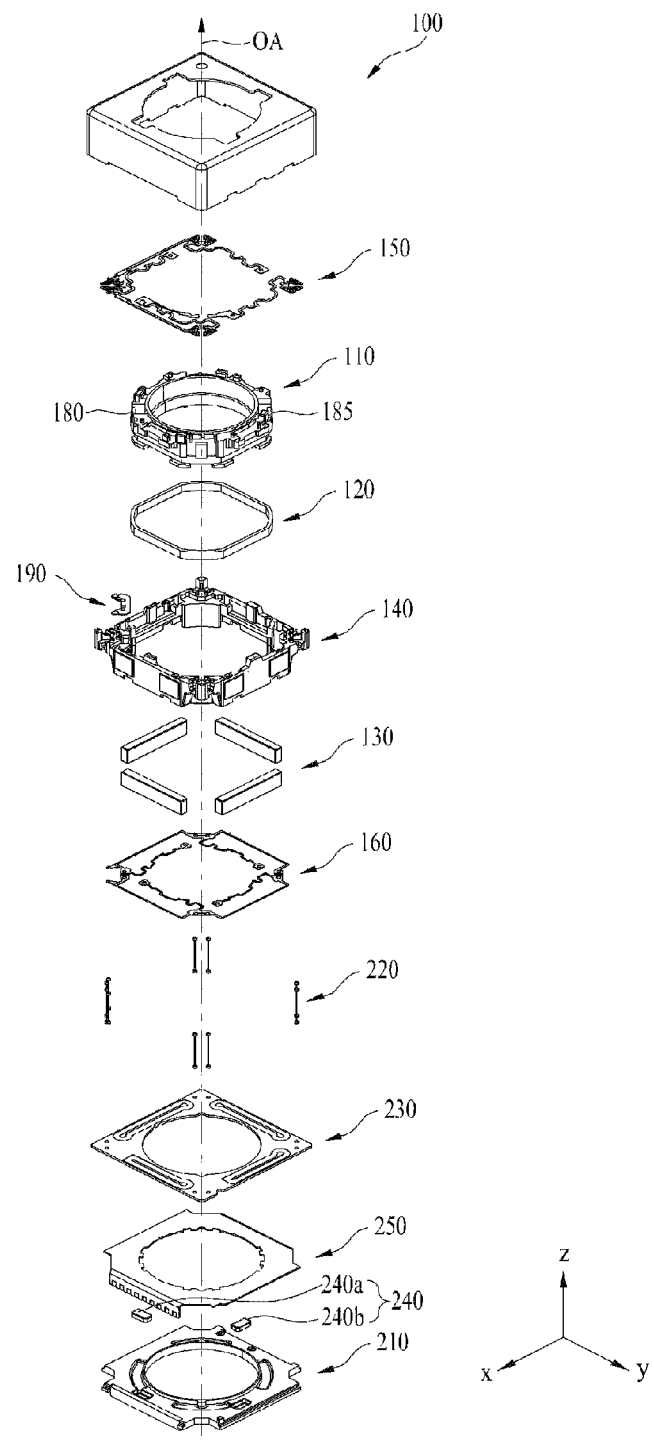
FIG. 1 is an exploded perspective view of a lens moving apparatus according to an embodiment.

Hereinafter, embodiments will be clearly understood from the annexed drawings and the description associated with the embodiments. In description of the embodiments, it will be understood that when an element, such as a layer (film), a region, a pattern or a structure, is referred to as being "on" or "under" another element, such as a layer (film), a region, a pad or a pattern, the term "on" or "under" means that the element is directly on or under the other element or intervening elements may also be present. It will also be understood that "on" or "under" is determined based on the drawings.

In the drawings, the sizes of elements may be exaggerated, omitted or schematically illustrated for convenience in description and clarify. Further, the sizes of elements do not mean the actual sizes of the elements. Wherever possible, the same reference numbers will be used throughout the drawings to refer to the same parts.

Hereinafter, a lens moving apparatus according to an embodiment will be described with reference to the accompanying drawings. For convenience of description, the lens moving apparatus according to an embodiment is described based on the Cartesian coordinates system (x, y, z), but is described based on other coordinates systems and embodiments are not limited thereto. In each drawing, the x axis and the y axis refer to a direction perpendicular to the z axis, the z-axis direction that is an optical axis direction may be referred to as a "first direction", the x-axis direction may be referred to as a "second direction", and the y-axis direction may be referred to as a "third direction".

A 'hand shake correction device' applied to a small-size camera module of a mobile device such as a smart phone or a tablet personal computer (PC) may refer to a device configured to inhibit a contour of a captured image from blurring due to vibration from user hand shake during capture of a still image.

An 'auto focusing device' refers to a device for automatically forming a focal point of an image of a subject on a surface of an image sensor. The hand shake correction device and the auto focusing device may be configured in various ways, and a lens moving apparatus according to an embodiment may perform an auto focusing operation of moving an optical module including at least one lens in a first direction parallel to an optical axis or may perform a hand shake correction operation of moving the optical module with respect to a surface formed by second and third directions perpendicular to the first direction.

Figure 2:
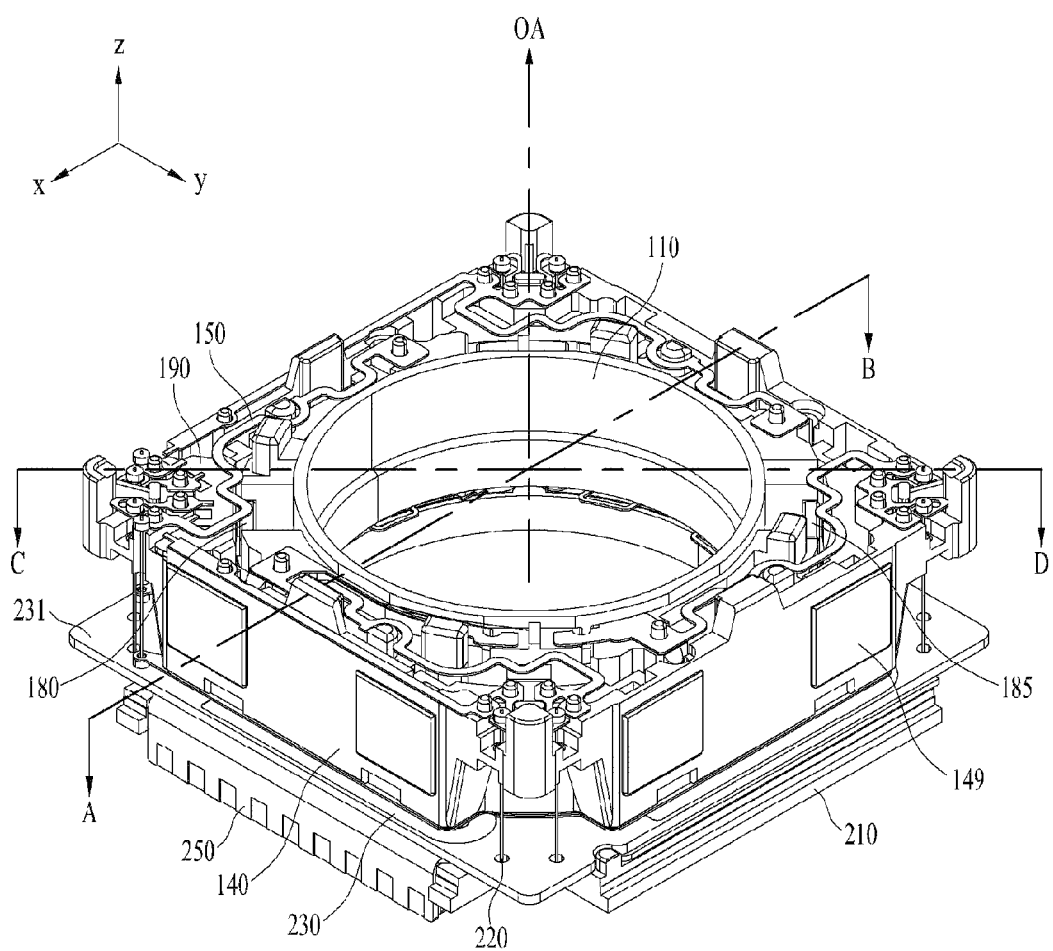
FIG. 2 is a coupling perspective view of a lens moving apparatus from which a cover member of FIG. 1 is removed.

FIG. 1 is an exploded perspective view of a lens moving apparatus 100 according to an embodiment. FIG. 2 is a coupling perspective view of the lens moving apparatus 100 from which a cover member 300 of FIG. 1 is removed.

Referring to FIGS. 1 and 2, the lens moving apparatus 100 may include a bobbin 110, a first coil 120, a first magnet 130, a housing 140, an upper elastic member 150, a lower elastic member 160, a first position sensor 170, and a second magnet 180.

The lens moving apparatus 100 may further include a third magnet 185, a first circuit board 190, a support member 220, a second coil 230, a second position sensor 240, a second circuit board 250, a base 210, and the cover member 300.

The cover member 300 may accommodate the bobbin 110, the first coil 120, the first magnet 130, the housing 140, the upper elastic member 150, the lower elastic member 160, the first position sensor 170, the second magnet 180, the first circuit board 190, the support member 220, the second coil 230, the second position sensor 240, and the second circuit board 250 in an accommodation space in which the base 210 is formed therewith.

The cover member 300 may be shaped like a box having an open lower portion, and upper and side plates, the lower portion of the cover member 300 may be coupled to an upper portion of the base 210. An upper end portion of the cover member 300 may be shaped like a polygon, for example, a rectangle or an octagon.

The cover member 300 may include a hollow for exposing a lens (not shown) coupled to the bobbin 110 to external light. In order to inhibit impurities such dust or moisture from penetrating into a camera module, the hollow of the cover member 300 may further include a window formed of an optically transparent material.

A material of the cover member 300 may be a nonmagnetic substance such as SUS in order to inhibit attachment with the first magnet 130, or may be a magnetic material to function as a yoke that enhances electromagnetic force between the first coil 120 and the first magnet 130.

Hereinafter, the bobbin 110 will be described.

The bobbin 110 may be disposed inside the housing 140 and may be moved in an optical axis OA or a first direction (e.g., the Z-axis direction) through electromagnetic interaction between the first coil 120 and the first magnet 130.

Figure 3:
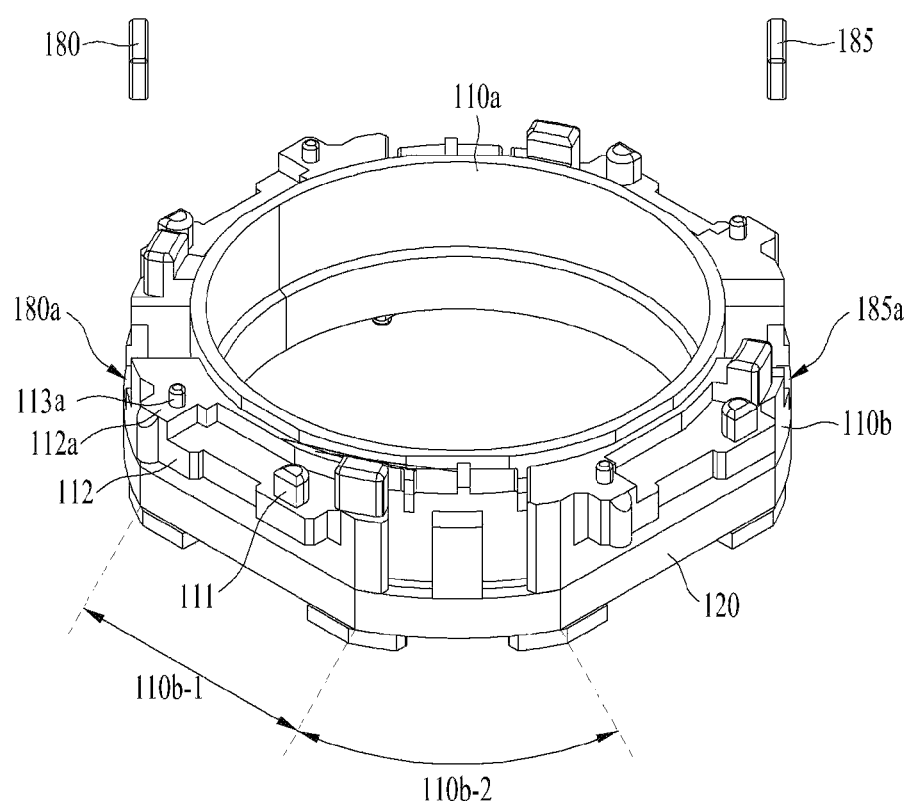
FIG. 3 is a perspective view of a bobbin, and first, second, and third magnets shown in FIG. 1.

FIG. 3 is a perspective view of the bobbin 110, and the first, second, and third magnets 120, 180, and 185 shown in FIG. 1.

Referring to FIG. 3, the bobbin 110 may have a hollow for installing a lens or a lens barrel. For example, a hollow of the bobbin 110 may have a circular shape, an oval shape, or a polygonal shape, but embodiments are not limited thereto.

A lens may be installed directly in the hollow of the bobbin 110, but embodiments are not limited thereto, and according to another embodiment, a lens barrel in which at least one lens is installed or coupled may be coupled to or installed in the hollow of the bobbin 110. The lens or the lens barrel may be coupled to an inner periphery surface 110a of the bobbin 110 using various methods.

The bobbin 110 may include first side portions 110b-1 that are spaced apart from each other and second side portions 110b-2 that are spaced apart from each other, and each of the second side portions 110-b2 may connect two adjacent first side portions. For example, the length of each of the first side portions 110b-1 of the bobbin 110 in a horizontal direction or a transverse direction may be greater than the length of each of the second side portions 110b-2 in a horizontal direction or a transverse direction.

A guide portion 111 for guiding an installation position of the upper elastic member 150 may be provided on an upper surface of the bobbin 110. For example, as shown in FIG. 3, the guide portion 111 of the bobbin 110 may protrude in the first direction (e.g., the Z-axis direction) from an upper surface to guide a path along which a frame connecting portion 153 of the upper elastic member 150 passes.

An external surface 110b of the bobbin 110 may include a protrusion portion 112 that protrudes in second or/and third direction. An internal frame 151 of the upper elastic member 150 may be accommodated on an upper surface 112a of the protrusion portion 112 of the bobbin 110.

The protrusion portion 112 of the bobbin 110 may inhibit an external surface of the bobbin 110 from directly colliding with the housing 140 even if the bobbin 110 is moved by a prescribed range or greater due to external shocks or the like when the bobbin 110 is moved in the optical axis direction for auto focusing.

The bobbin 110 may include an upper support protrusion 113a that is coupled and fixed to the upper elastic member 150.

A coil accommodation groove in which the first coil 120 is accommodated, inserted, or disposed may be provided on an external surface of the bobbin 110. The coil accommodation groove may be a groove that is recessed from the external surface 110b of the first and second side portions 110b-1 and 110b-2 of the bobbin 110 and may have a shape corresponding to a shape of the first coil 120, for example, a ring shape.

The bobbin 110 may have an external surface including a second magnet accommodation groove 180a in which the second magnet 180 is accommodated, inserted, fixed, or disposed.

The second magnet accommodation groove 180a of the bobbin 110 may be recessed from the external surface 110b of the bobbin 110 and may have an opening that is open over an upper surface of the bobbin 110, but embodiments are not limited thereto.

The second magnet accommodation groove 180a of the bobbin 110 may be positioned above the coil accommodation groove in which the first coil 120 is disposed and may be spaced apart from the coil accommodation groove, but embodiments are not limited thereto.

The bobbin 110 may have an upper surface including a third magnet accommodation groove 185a in which the third magnet 185 is accommodated, inserted, fixed, or disposed.

The third magnet accommodation groove 185a may be recessed from the external surface 110b of the bobbin 110 and may have an opening that is open over an upper surface of the bobbin 110, but embodiments are not limited thereto.

The third magnet accommodation groove 185a of the bobbin 110 may be disposed above a coil accommodation groove in which the first coil 120 is disposed and may be spaced apart from the coil accommodation groove, but embodiments are not limited thereto.

The second magnet accommodation groove 180a may be provided in any one of the second side portions 110b-2 of the bobbin 110, and the third magnet accommodation groove 185a may be provided in another any one of the second side portions 110b-2 of the bobbin 110.

The third magnet accommodation groove 185a may be disposed to face the second magnet accommodation groove 180a. For example, the second and third magnet accommodation grooves 180a and 185a may be provided two facing second side portions of the bobbin 110.

The second magnet 180 and the third magnet 185 may be disposed or aligned to be counterbalanced on the bobbin 110 with respect to the first position sensor 170, and thus influence of magnetic force of the second magnet 180 with respect to the first coil 120 may be offset by the third magnet 185, thereby enhancing the accuracy of auto focusing (AF) driving.

The first coil 120 may be disposed on the external surface 110b of the bobbin 110.

The first coil 120 may be disposed below the second and third magnets 180 and 185, but embodiments are not limited thereto. For example, the first coil 120 may not overlap the second and third magnets 180 and 185 in the second or third direction, but embodiments are not limited thereto.

For example, the first coil 120 may be disposed in the coil accommodation groove, the second magnet 180 may be inserted or disposed in the second magnet accommodation groove 180a, and the third magnet 185 may be inserted or disposed in the third magnet accommodation groove 185a.

Each of the second magnet 180 and the third magnet 185 that are disposed on the bobbin 110 may be spaced apart from the first coil 120 in an optical axis OA direction, but embodiments are not limited thereto, and according to another embodiment, each of the second magnet 180 and the third magnet 185 that are disposed on the bobbin 110 may contact the first coil 120 or may overlap the first coil 120 in the second or third direction.

The first coil 120 may be shaped like a closed loop that surrounds the external surface 110b of the bobbin 110 in a rotation direction based on the optical axis OA and may be shaped like, for example, a ring.

The first coil 120 may be directly wound on the external surface 110b of the bobbin 110, but embodiments are not limited thereto, and according to another embodiment, the first coil 120 may be wound on the bobbin 110 using a coil ring or may be provided in the form of a coil block shaped like an angulated ring.

When a driving signal (e.g., driving current) is supplied to the first coil 120, electromagnetic force may be formed through an electromagnetic interaction with the first magnet 130, and the bobbin 110 may be moved in the optical axis OA direction by the formed electromagnetic force.

At an initial position of an AF moving part, for example, at an initial position of the bobbin 110, the first coil 120 may be disposed to correspond to the first magnet 130 disposed in the housing 140 or to overlap or to be aligned in a direction perpendicular to the optical axis OA.

For example, the AF moving part may include the bobbin 110 and components coupled to the bobbin 110, e.g., the first coil 120, and the second and third magnets 180 and 185. The initial position of the AF moving part may be a first position of the AF moving part in a state in which power is not supplied to the first coil 120 or a position at which the AF moving part is positioned as the upper and lower elastic members 150 and 160 are elastically deformed only by the weight of the AF moving part.

In addition, the initial position of the AF moving part may be a position at which the AF moving part is positioned when gravity is applied in a direction from the bobbin 110 to the base 210 or, on the contrary, when gravity is applied in a direction from the base 210 to the bobbin 110.

The second magnet 180 may be disposed in the second magnet accommodation groove 180a of the bobbin 110, and a portion of one surface of the second magnet 180, which faces the first position sensor 170, may be exposed from the second magnet accommodation groove 180a.

For example, each of the second and third magnets 180 and 185 disposed on the bobbin 110 may have a boundary surface of N and S poles, which is parallel to a direction perpendicular to the optical axis OA. For example, a surface of each of the second and third magnets 180 and 185, which faces the first position sensor 170, may be divided into N and S poles, but embodiments are not limited thereto.

For example, according to another embodiment, each of the second and third magnets 180 and 185 disposed on the bobbin 110 may have a boundary surface of N and S poles, which is parallel to the optical axis OA.

The second magnet 180 may be moved in the optical axis direction along with the bobbin 110, and the first position sensor 170 may detect intensity of a magnetic field of the second magnet 180 that is moved in the optical axis direction. The intensity of a magnetic field detected by the first position sensor 170 is changed depending on displacement of the bobbin 110 in the optical axis direction, and thus displacement of the bobbin 110 in the optical axis direction may be detected based on the intensity of the magnetic field detected by the first position sensor 170.

The magnetic field of the second magnet 180 may affect interaction between the first magnet 130 and the first coil 120, and the third magnet 185 may alleviate or remove influence of the magnetic field of the second magnet 180 on the interaction between the first magnet 130 and the first coil 120. In addition, the third magnet 185 may be counterbalanced to the weight of the second magnet 180, thereby enhancing the accuracy of AF driving.

For example, the third magnet 185 may be disposed on a second side portion that is positioned at an opposite side to a second side portion of the bobbin 110, on which the second magnet 180 is disposed, so as to face the second magnet 180. Through such arrangement of the second and third magnets 180 and 185, the magnetic field of the third magnet 185 may compensate for the magnetic field of the second magnet 180, which affects the interaction between the first magnet 130 and the first coil 120, and accordingly influence of the magnetic field of the second magnet 180 on an AF operation may be alleviated or removed, thereby enhancing the accuracy of the AF operation, according to an embodiment.

Hereinafter, the housing 140 will be described.

The housing 140 may accommodate the bobbin 110 therein and may support the first circuit board 190 on which the first magnet 130, and the first position sensor 170 are disposed.

The housing 140 may have an overall hollow column shape. For example, the housing 140 may include a polygonal (e.g., rectangular or octagonal) or circular hollow.

Figure 4:
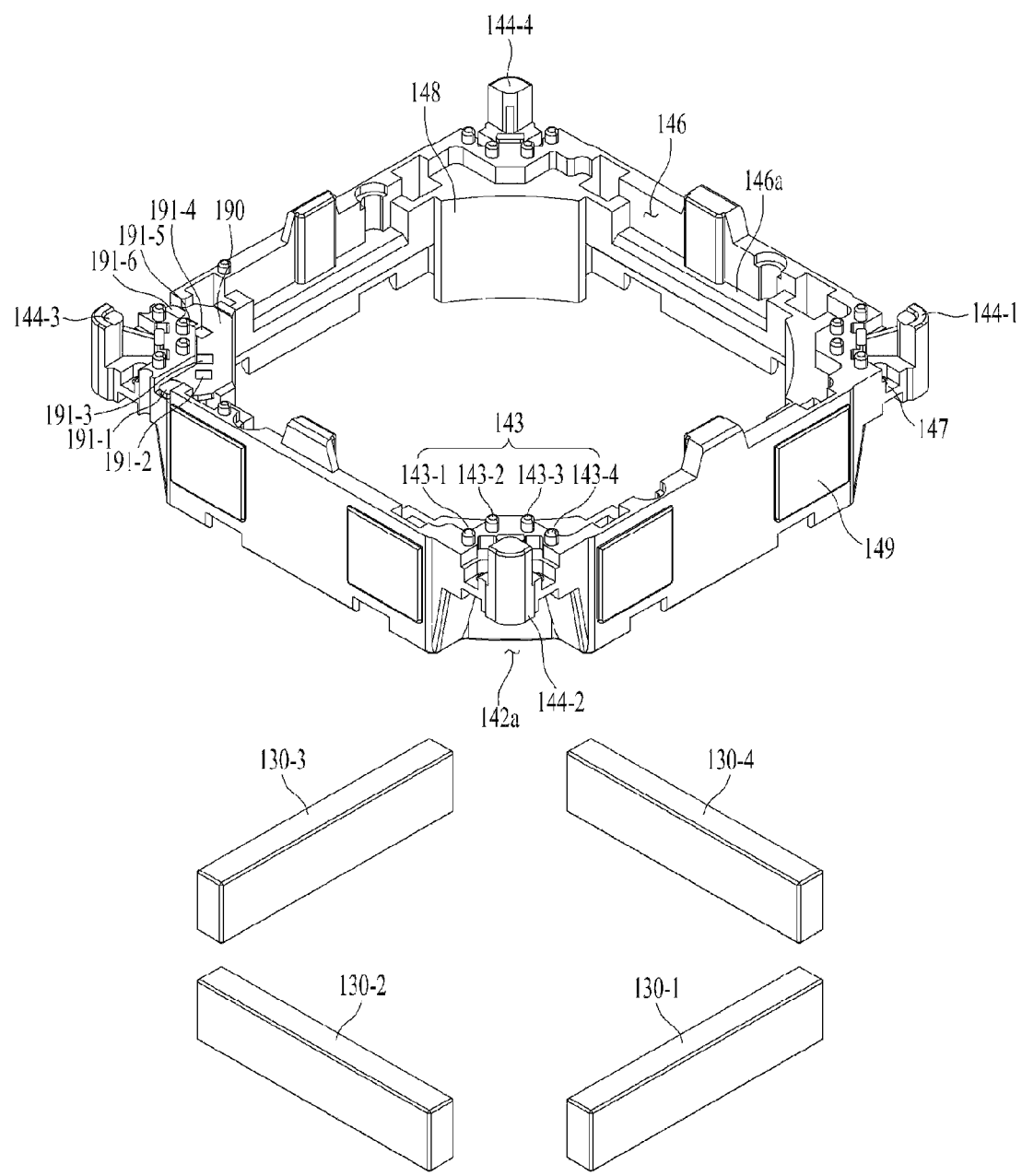
FIG. 4 is an exploded perspective view of a housing and a first magnet shown in FIG. 1.
Figure 5:
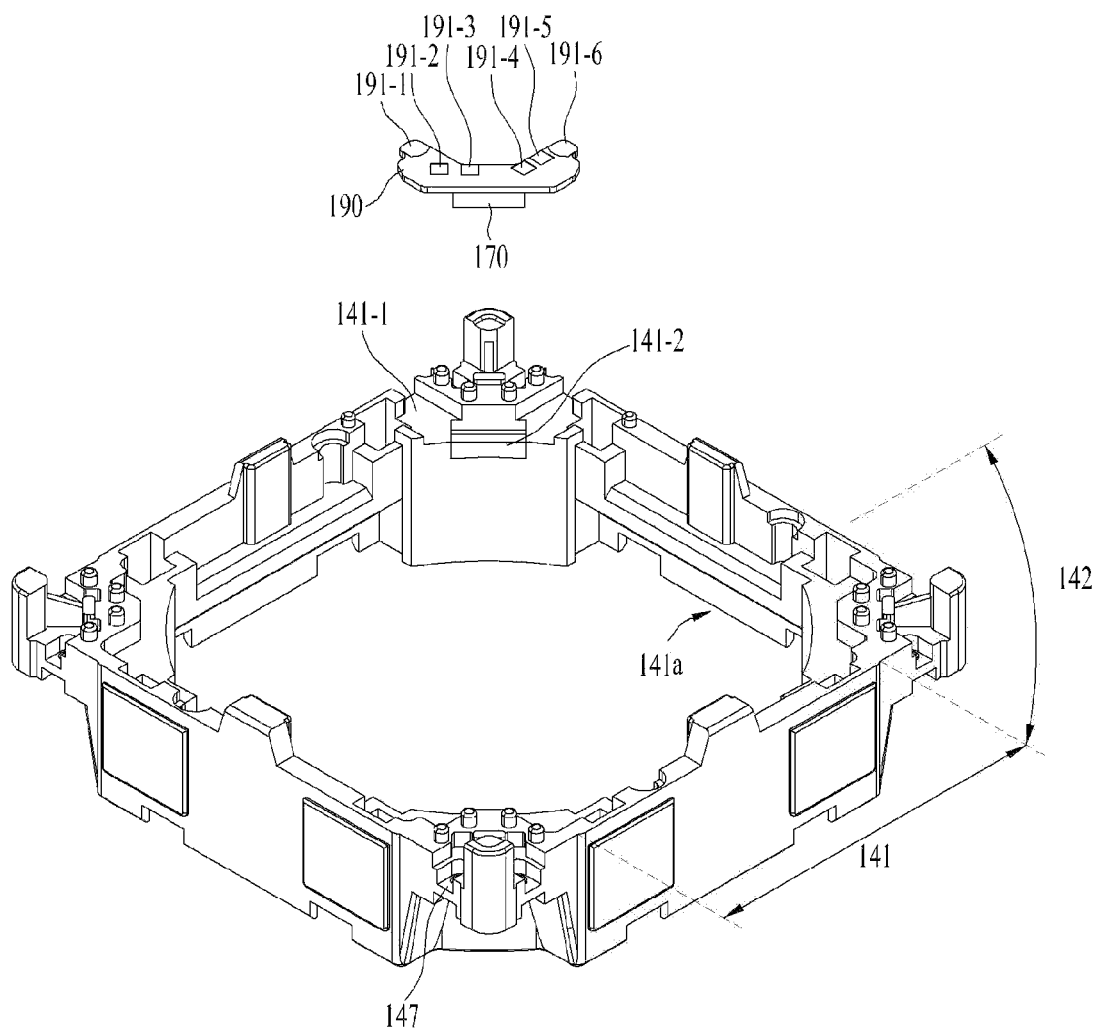
FIG. 5 is an exploded perspective view of a housing, a first position sensor, and a first circuit board shown in FIG. 1.

FIG. 4 is an exploded perspective view of the housing 140 and the first magnet 130 shown in FIG. 1. FIG. 5 is an exploded perspective view of the housing 140, the first position sensor 170, and the first circuit board 190 shown in FIG. 1.

Referring to FIGS. 4 and 5, the housing 140 may include a plurality of side portions 141 and 142. For example, the housing 140 may include first side portions 141 that are spaced apart from each other and second side portions 142 that are spaced apart from each other.

Each of the first side portions 141 of the housing 140 may be disposed or positioned between two adjacent second side portions 142, may connect the second side portions 142 to each other, and may include a plane with a predetermined depth.

For example, the second side portions 142 may be positioned at corners or edges of the housing 140 and may be replaced with the term "corner portions", and the first side portions 141 may be replaced with the term "side portions".

For example, the number of the first side portions 141 of the housing 140 may be four, and the number of the second side portions 142 may be four, but embodiments are not limited thereto.

The length of each of the first side portions 141 of the housing 140 in a horizontal direction may be greater than the length of each of the second side portions 142 in the horizontal direction, but embodiments are not limited thereto.

The first magnet 130 may be disposed or installed on the first side portions 141 of the housing 140. Each of the second side portions 142 of the housing 140 may be disposed between two adjacent first side portions 141, and the support member 220 may be disposed on the second side portions 142 of the housing 140.

The housing 140 may include a groove 146 provided at a position corresponding to the protrusion portion 112 of the bobbin 110 in order to inhibit interference with the protrusion portion 112 of the bobbin 110 when the bobbin 110 is moved in the optical axis OA direction.

When a state in which a lower surface of the protrusion portion 112 of the bobbin 110 contacts a bottom surface 146*a* of the groove 146 is set as an initial position of the bobbin 110, an auto focusing function may be controlled in a single direction (e.g., a positive z-axis direction from the initial position).

However, for example, when a state in which the lower surface of the protrusion portion 112 of the bobbin 110 is spaced apart from the bottom surface 146*a* of the groove 146 of the housing 140 by a predetermined distance is set as the initial position of the bobbin 110, the auto focusing function may be controlled in two directions (e.g., a positive z-axis direction from the initial position and a negative z-axis direction from the initial position).

The housing 140 may include a first magnet accommodation portion 141*a* for accommodating the first magnet 130, a first installation groove 141-1 for accommodating the first circuit board 190, and a second installation groove 141-2 for accommodating the first position sensor 170.

The first magnet accommodation portion 141*a* may be provided at an internal lower end of at least one of the first side portions 141 of the housing 140. For example, the first magnet accommodation portion 141*a* may be provided at an internal lower end of each of the four first side portions 141, and each of first magnets 130-1 to 130-4 may be inserted into and fixed to a corresponding one of first magnet accommodation portions 141*a*.

The first magnet accommodation portion 141*a* of the housing 140 may be formed as a concave groove corresponding to the size of the first magnet 130. An opening may be formed on a bottom surface of the first magnet accommodation portion 141*a* of the housing 140, which faces the second coil 230, and a bottom surface of the first magnet 130 fixed to the first magnet accommodation portion 141*a* may face the second coil 230 in the optical axis direction.

The first installation groove 141-1 may be provided at an upper portion or upper end of any one of the second side portions 142 of the housing 140.

In order to easily install the first circuit board 190, the first installation groove 141-1 may be formed as a groove having an open upper portion, a side surface, and a bottom, and may have an opening that is open toward an internal side of the housing 140. The bottom of the first installation groove 141-1 may have a corresponding shape or the same shape as a shape of the first circuit board 190.

The second installation groove 141-2 may be provided on a bottom of the first installation groove 141-1. The second installation groove 141-2 may be recessed from the bottom of the first installation groove 141-1.

In order to easily install the first position sensor 170, the second installation groove 141-2 may be formed as a groove having an open upper portion, a side surface, and a bottom, and may have an opening that is open toward an internal side of a second side portion 142 of the housing 140. The second installation groove 141-2 may have a corresponding shape or the same shape as a shape of the first position sensor 170.

Each of the first magnet 130 and the first circuit board 190 may be fixed to the first magnet accommodation portion 141*a* and the first installation groove 141-1 of the housing 140 by an adhesive member, e.g., epoxy or double-sided tapes. The first position sensor 170 may be fixed to the second installation groove 141-2 by an adhesive member.

Each of the first side portions 141 of the housing 140 may be disposed in parallel to a corresponding one of lateral plates of the cover member 300. For example, an area of an external surface of each of the first side portions 141 of the housing 140 may be greater than an area of an external surface of each of the second side portions 142.

Each of the second side portions 142 of the housing 140 may include a through hole 147 that forms a path through which the support member 220 passes. For example, the housing 140 may include the through hole 147 that penetrates an upper portion of the second side portion 142.

According to another embodiment, the through hole provided in a second side portion of the housing 140 may be recessed from an external surface of the second side portion 142 of the housing 140, and at least a portion of the through hole may be open to an external surface of the second side portion 142.

The number of through holes 147 of the housing 140 may be the same as the number of support members. One end of the support member 220 may penetrate the through hole 147 and may be connected or bonded to the upper elastic member 150.

In order to inhibit direct collision with an internal surface of an upper end portion of the cover member 300 shown in FIG. 1, stoppers 144-1 to 144-4 may be provided on an upper end of the housing 140.

For example, the stoppers 144-1 to 144-4 may be provided on an upper surface of each of the second side portions 142 of the housing 140.

The housing 140 may include at least upper support protrusion 143 coupled to an external frame 152 of the upper elastic member 150.

The upper support protrusion 143 of the housing 140 may be formed on an upper surface of at least one of the first side portion 141 or the second side portion 142 of the housing 140. For example, the upper support protrusion 143 of the housing 140 may be provided on upper surfaces of the second side portions 142 of the housing 140, but embodiments are not limited thereto.

The housing 140 may include a lower support protrusion (not shown) that is formed on a lower surface thereof and is coupled and fixed to an external frame 162 of the lower elastic member 160.

In order to ensure a space for filling gel-type silicon functioning as damping as well as to form a path through which the support member 220 passes, the housing 140 may include a concave groove 142a that is formed on a lower portion or a lower end of the second side portion 142. That is, in order to alleviate vibration of the support member 220, the concave groove 142a of the housing 140 may be filled with a damping member, for example, silicon.

The housing 140 may include at least one stopper 149 that protrudes from an external surface of the first side portions 141, and the at least one stopper 149 may inhibit collision with the cover member 300 when the housing 140 is moved in a second and/or third direction.

In order to inhibit a lower surface of the housing 140 from colliding with the base 210 and/or the second circuit board 250, the housing 140 may further include a stopper (not shown) that protrudes from the lower surface.

At the initial position of the AF moving part, the first magnets 130-1 to 130-4 may be disposed in the housing 140 to at least partially overlap the first coil 120 in a direction perpendicular to the optical axis OA.

For example, the first magnets 130-1 to 130-4 may be inserted or disposed in one accommodation portion 141a of the first side portions 141 of the housing 140.

According to another embodiment, the first magnets 130-1 to 130-4 may be disposed on the external surface of the first side portions 141 of the housing 140 or may be disposed on the internal surface or the external surface of the second side portions 142 of the housing 140.

Each of the first magnets 130-1 to 130-4 may have a shape corresponding to the first side portion 141 of the housing 140, e.g., a rectangular parallelepiped, but embodiments are not limited thereto, and according to another embodiment, one surface of a first magnet, which faces one surface of the first coil 120, may have a corresponding curvature or the same curvature as one surface of the first coil 120.

Each of the first magnets 130 may be configured as one body and may be configured with a surface facing the first coil 120 as an S pole and an opposite surface as an N pole. However, embodiments are not limited thereto, and a surface of each of the first magnets 130-1 to 130-4, which faces the first coil 120, may be an N pole, and an opposite surface may be an S pole.

The first magnets 130-1 to 130-4 may be disposed or installed on first side portions of the housing 140 in such a way that at least two first magnets face each other.

For example, two pairs of the first magnets 130-1 to 130-4 that face each other may be disposed on the first side portions 141 of the housing 140. In this case, a planar shape of each of the first magnets 130-1 to 130-4 may be approximately a rectangle, or alternatively, a triangle or a rhombus.

According to another embodiment, only one pair first magnets that face each other may be disposed on first side portions of the housing 140, which face each other.

Figure 7:
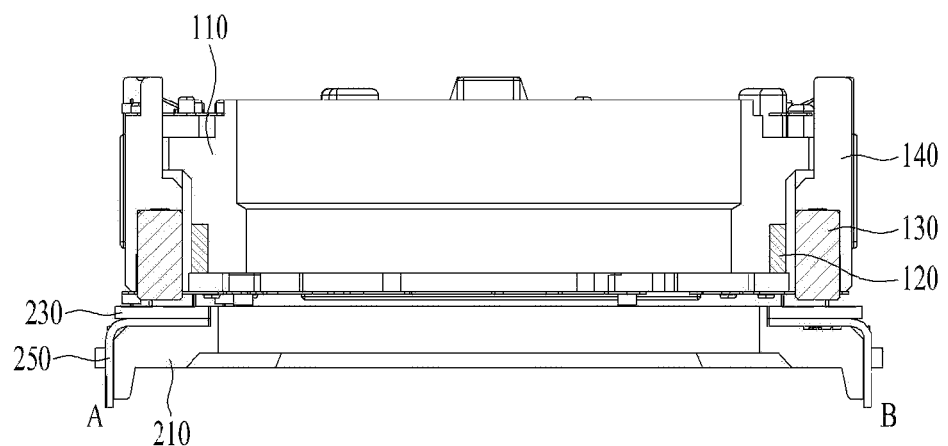
FIG. 7 is a cross-sectional view of a lens moving apparatus taken in direction AB shown in FIG. 2.
Figure 8:
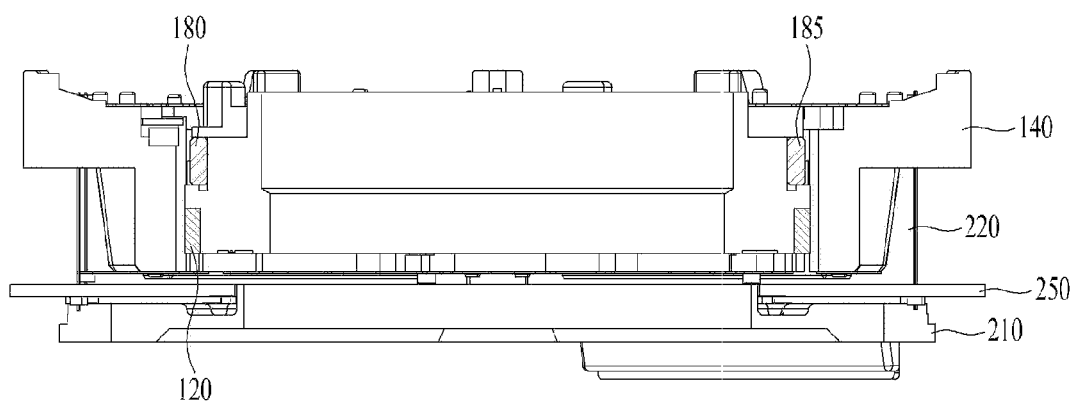
FIG. 8 is a cross-sectional view of a lens moving apparatus taken in direction CD shown in FIG. 2.

FIG. 7 is a cross-sectional view of the lens moving apparatus 100 taken in direction AB shown in FIG. 2. FIG. 8 is a cross-sectional view of the lens moving apparatus 100 taken in direction CD shown in FIG. 2.

Referring to FIGS. 7 and 8, each of the second and third magnets 180 and 185 may not overlap the first coil 120 in a direction 701 perpendicular to the optical axis OA, but embodiments are not limited thereto.

At the initial position of the AF moving part, the second magnet 180 may overlap or be aligned with the third magnets 180 and 185 in a direction perpendicular to the optical axis OA.

At the initial position of the AF moving part, the first position sensor 170 may overlap each of the second and third magnets 180 and 185 in a direction perpendicular to the optical axis OA, but embodiments are not limited thereto. According to another embodiment, the first position sensor 170 may not overlap at least one of the second and third magnets 180 and 185 in a direction perpendicular to the optical axis OA.

Hereinafter, the first position sensor 170 and the first circuit board 190 will be described.

Figure 6A:
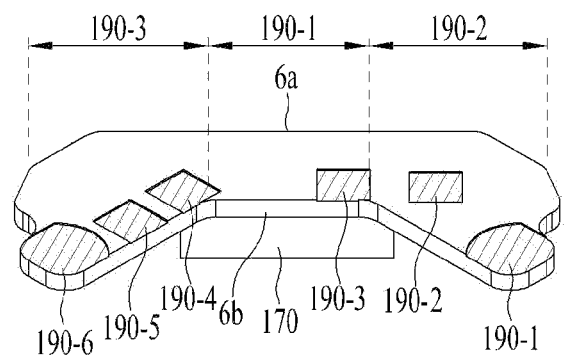
FIG. 6A is an enlarged view of a first circuit board and a first position sensor shown in FIG. 5.
Figure 6B:
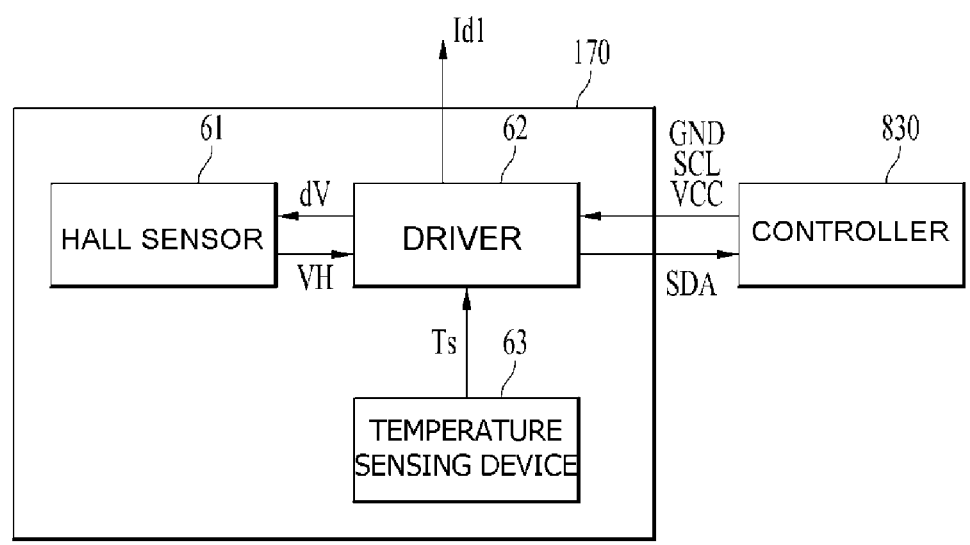
FIG. 6B is a diagram illustrating the configuration of a first position sensor shown in FIG. 6A.

FIG. 6A is an enlarged view of the first circuit board 190 and the first position sensor 170 shown in FIG. 5. FIG. 6B is a diagram illustrating the configuration of the first position sensor 170 shown in FIG. 6A.

Referring to FIGS. 6A and 6B, the first position sensor 170 may be installed on the first circuit board 190 disposed in the housing 140 and may be fixed to the housing 140. For example, the first position sensor 170 may be moved along with the housing 140 along with hand shake correction.

The first position sensor 170 may detect the intensity of the magnetic field of the second magnet 180 installed on the bobbin 110 as the bobbin 110 is moved and may output an output signal based on the detection result.

In the embodiment of FIG. 1, the first position sensor 170 may detect the intensity of the magnetic field of the second magnet 180 to detect the displacement of the bobbin 110, but embodiments are not limited thereto, and according to another embodiment, the second and third magnets 180 and 185 may be omitted, an output signal based on the detection result of the intensity of the magnetic field of the first magnets of the first position sensor 170 may be generated, and the displacement of the bobbin 110 may be detected or controlled using the output signal.

The first position sensor 170 may be disposed on the first circuit board 190. For example, the first position sensor 170 may be disposed on a lower surface of the first circuit board 190. Here, the lower surface of the first circuit board 190 may be a surface of the first circuit board 190, which is directed to an upper surface of the housing 140 or a surface that contacts the first installation groove 141-1 of the housing 140 when the first circuit board 190 is installed on the housing 140.

Referring to FIG. 6B, the first position sensor 170 may include a hall sensor 61 and a driver 62.

For example, the hall sensor 61 may be formed of a silicon based material, and as surrounding temperature increased, output VH of the hall sensor 61 may increase.

According to another embodiment, the hall sensor 61 may be formed of GaAs, and the output VH of the hall sensor 61 may have an inclination of about −0.06%/° C. with respect to the surrounding temperature.

The first position sensor 170 may further include a temperature sensing device 63 for detecting the surrounding temperature. The temperature sensing device 63 may output a temperature detection signal Ts based on a measurement result of the surrounding temperature of the first position sensor 170 to the driver 62.

For example, the hall sensor 61 of the first position sensor 170 may generate an output based on the detection result of the intensity of the magnetic force of the first magnets 130-1 to 130-4.

The driver 62 may output a driving signal dV for driving the hall sensor 61 and a driving signal Id1 for driving the first coil 120.

For example, the driver 62 may receive a clock signal SCL, a data signal SDA, and power signals VCC and GND from a controller 830 by using data communication using a protocol, for example, I2C communication.

The driver 62 may generate the driving signal dV for driving the hall sensor 61 and the driving signal Id1 for driving the first coil 120 by using the clock signal SCL and the power signals VCC and GND.

The driver 62 may receive the output VH of the hall sensor 61 and may transmit the clock signal SCL and the data signal SDA with respect to the output VH of the hall sensor 61 to the controller 830 by using data communication using a protocol, for example, I2C communication.

The driver 62 may receive the temperature detection signal Ts measured by the temperature sensing device 63 and may transmit the temperature detection signal Ts to the controller 830 by using data communication using a protocol, for example, I2C communication.

The controller 830 may compensate for temperature of the output VH of the hall sensor 61 based on a change in the surrounding temperature measured by the temperature sensing device 63 of the first position sensor 170.

For example, when the driving signal dV or a bias signal of the hall sensor 61 is 1 mA, the output VH of the hall sensor 61 of the first position sensor 170 may be −20 mV to +20 mV.

In the case of temperature compensation on the output VH of the hall sensor 61 with a negative inclination with respect to a change in the surrounding temperature, the output VH of the hall sensor 61 of the first position sensor 170 may be 0 mV to +30 mV.

When output of the hall sensor 61 of the first position sensor 170 is indicated on the xy coordinates system, an output range of the hall sensor 61 of the first position sensor 170 may be a first quadrant (e.g., 0 mV to +30 mV) for the following reason.

Output of the hall sensor 61 of the first quadrant of the xy coordinates system and output of the hall sensor 61 of the third quadrant are moved in opposite directions along with a change in surrounding temperature, and thus when both the first and third quadrants are used as an AF driving control period, the accuracy and reliability of a hall sensor may be degraded. For accurate compensation along with a change in surrounding temperature, a predetermined range of the first quadrant may be an output range of the hall sensor 61 of the first position sensor 170.

The first position sensor 170 may include first to third terminals for the clock signal SCL and two power signals VCC and GND, a fourth terminal for data SDA, and fifth and sixth terminals for providing a driving signal to the first coil 120.

The first to sixth terminals of the first position sensor 170 may be electrically connected to a corresponding one of pads 190-1 to 190-6 of the first circuit board 190.

The first circuit board 190 may include first to sixth pads 190-1 to 190-6, and a circuit pattern or wiring (not shown) provided on an upper surface of the first circuit board 190.

Referring to FIG. 6A, the first circuit board 190 may include a body portion 190-1, a first bent portion 190-2 that is bent at one end of the body portion 190-1, and a second bent portion 190-3 that is bent at the other end of a body portion 190-2.

For example, the first and second bent portions 190-2 and 190-3 may be bent in the same direction based on the body portion 190-1.

For example, the first and second bent portions 190-2 and 190-3 of the first circuit board 190 disposed on the first installation groove 141-1 of the housing 140 may be bent in a direction toward an edge of the second side portion 142 of the housing 140 based on the body portion 190-1.

For example, the first circuit board 190 disposed in the housing 140 may include a first side surface 6a directed in the optical axis OA direction, and a second side surface 6b positioned at an opposite side to the first side surface 6a, the first side surface 6a of the first circuit board 190 may be flat, and the second side surface 6b of the first circuit board 190 may be bent.

In FIG. 6A, the first circuit board 190 may have opposite ends that are bent for easy bonding with upper springs, but embodiments are not limited thereto. According to another embodiment, the first circuit board 190 may be formed in one straight line rather than being bent.

The first to sixth pads 190-1 to 190-6 may be spaced apart from an upper surface of the first circuit board 190 in order to facilitate conductive connection with the upper elastic member 150.

For example, the first pad 190-1 may be disposed at one end of the first bent portion 190-2 of the first circuit board 190, the sixth pad 190-6 may be disposed at one end of the second bent portion 190-3 of the first circuit board 190, and the second to fifth pads 190-2 to 190-5 may be spaced apart from each other between the first pad 190-1 and the sixth pad 190-6.

The first to sixth pads 190-1 to 190-6 may be disposed to contact the second side surface 6b of the first circuit board 190 in order to ensure a space for bonding with first to sixth upper springs on an upper surface of the first circuit board 190.

An area of each of the first and sixth pads 190-1 and 190-6 may be greater than an area of each of the second to fifth pads 190-2 to 190-5, but embodiments are not limited thereto.

Upper springs bonded to the first and sixth pads 190-1 and 190-6 are coupled to the housing 140 at a longer distance than upper springs bonded to the second to fifth pads 190-2 to 190-5, and thus an area of a pad may be increased to increase bonding force with an upper elastic member.

The circuit pattern or wiring (not shown) of the first circuit board 190 may electrically connect the first to sixth pads 190-1 to 190-6 to the first to sixth terminals of the first position sensor 170 and may be provided on at least one of lower and upper surfaces of the first circuit board 190, but embodiments are not limited thereto.

For example, the first circuit board 190 may be a printed circuit board (PCB) or a flexible printed circuit board (FPCB).

According to another embodiment, the first position sensor 170 may be disposed on an upper surface of the first circuit board 190, and the pads 190-1 to 190-4 may be provided on the lower surface of the first circuit board 190.

The first to sixth pads 190-1 to 190-6 of the first circuit board 190 may be electrically connected to terminals of the second circuit board 250 by the upper elastic member 150 and the support member 220, and thus the first position sensor 170 may be electrically connected to the second circuit board 250.

Hereinafter, the upper elastic member 150, the lower elastic member 160, and the support member 220 will be described.

Figure 9A:
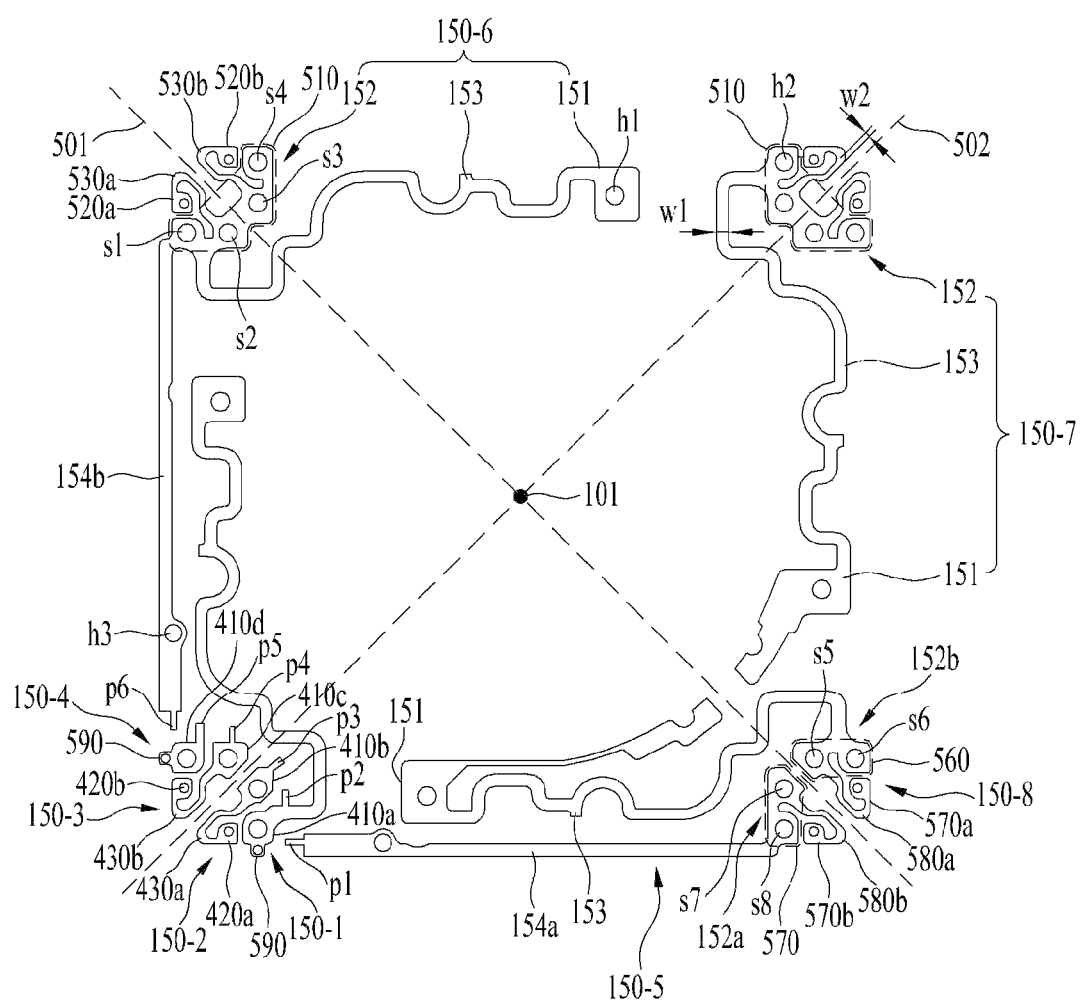
FIG. 9A is a plan view of an upper elastic member shown in FIG. 1.
Figure 9B:
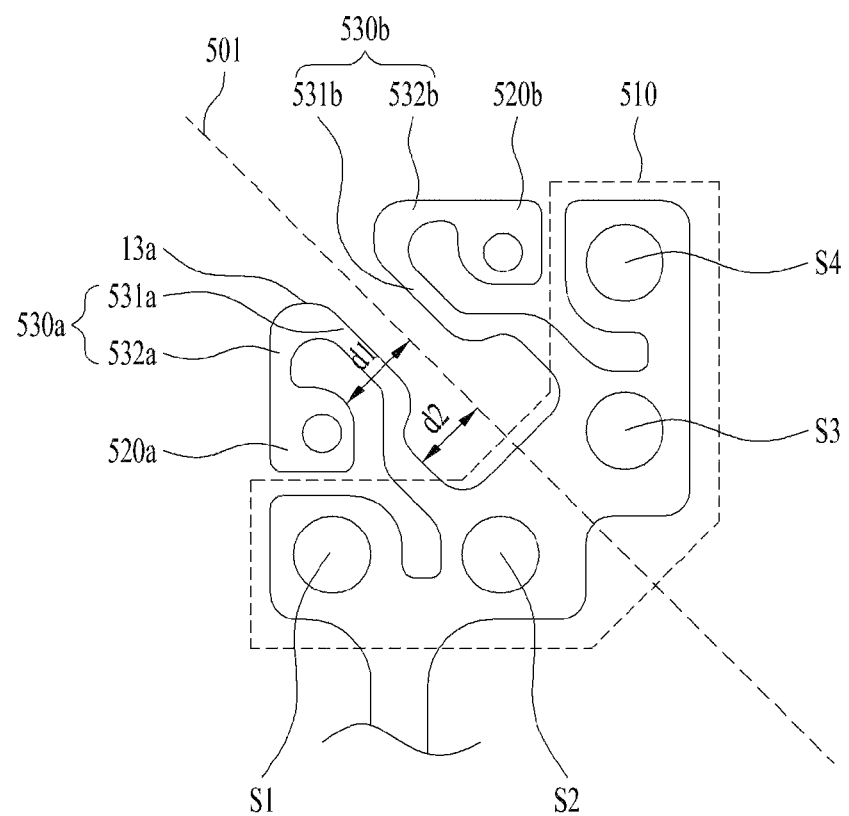
FIG. 9B is an enlarged view of a first external frame of sixth and seventh springs shown in FIG. 9A.
Figure 9C:
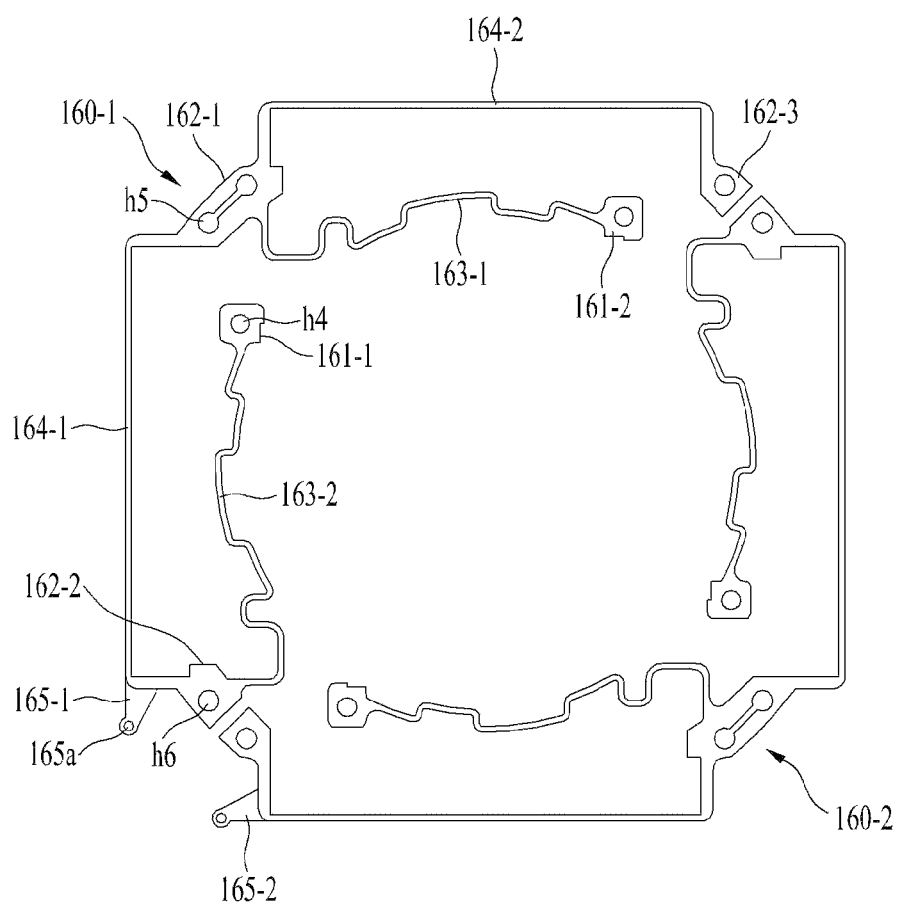
FIG. 9C is a plan view of a lower elastic member shown in FIG. 1.
Figure 10:
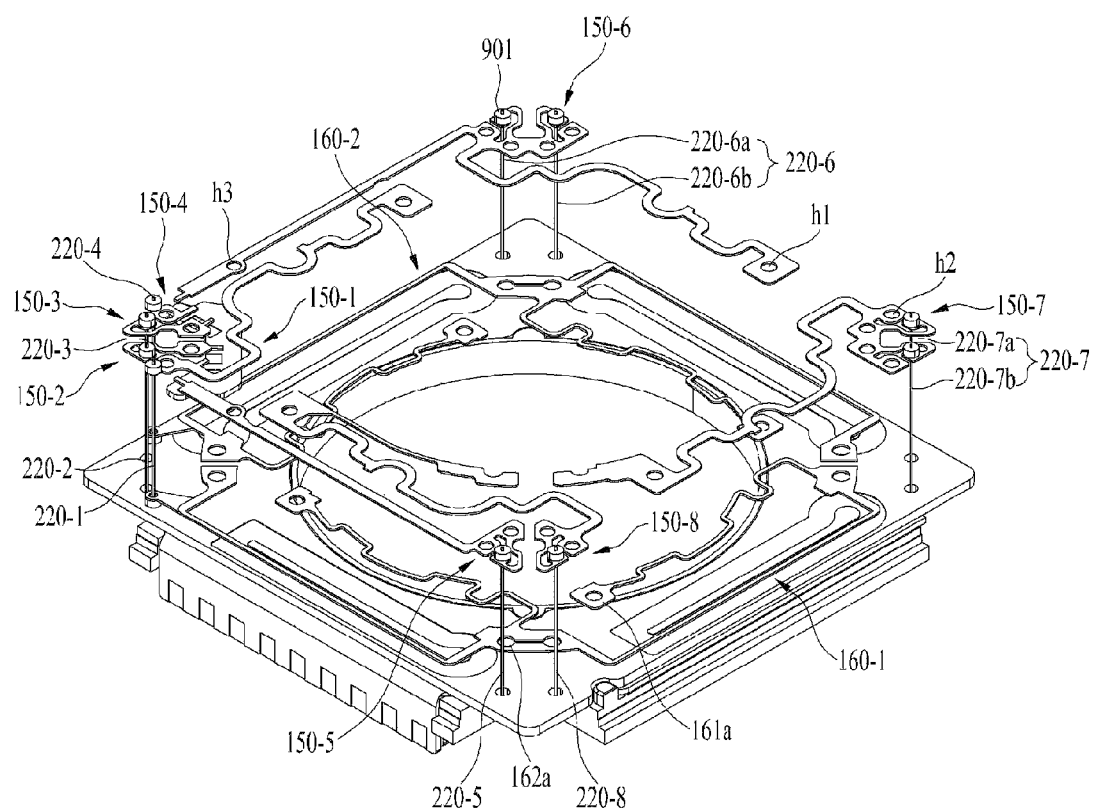
FIG. 10 is a coupling perspective view of an upper elastic member, a lower elastic member, a base, a support member, a second coil, and a second circuit board shown in FIG. 1.
Figure 11:
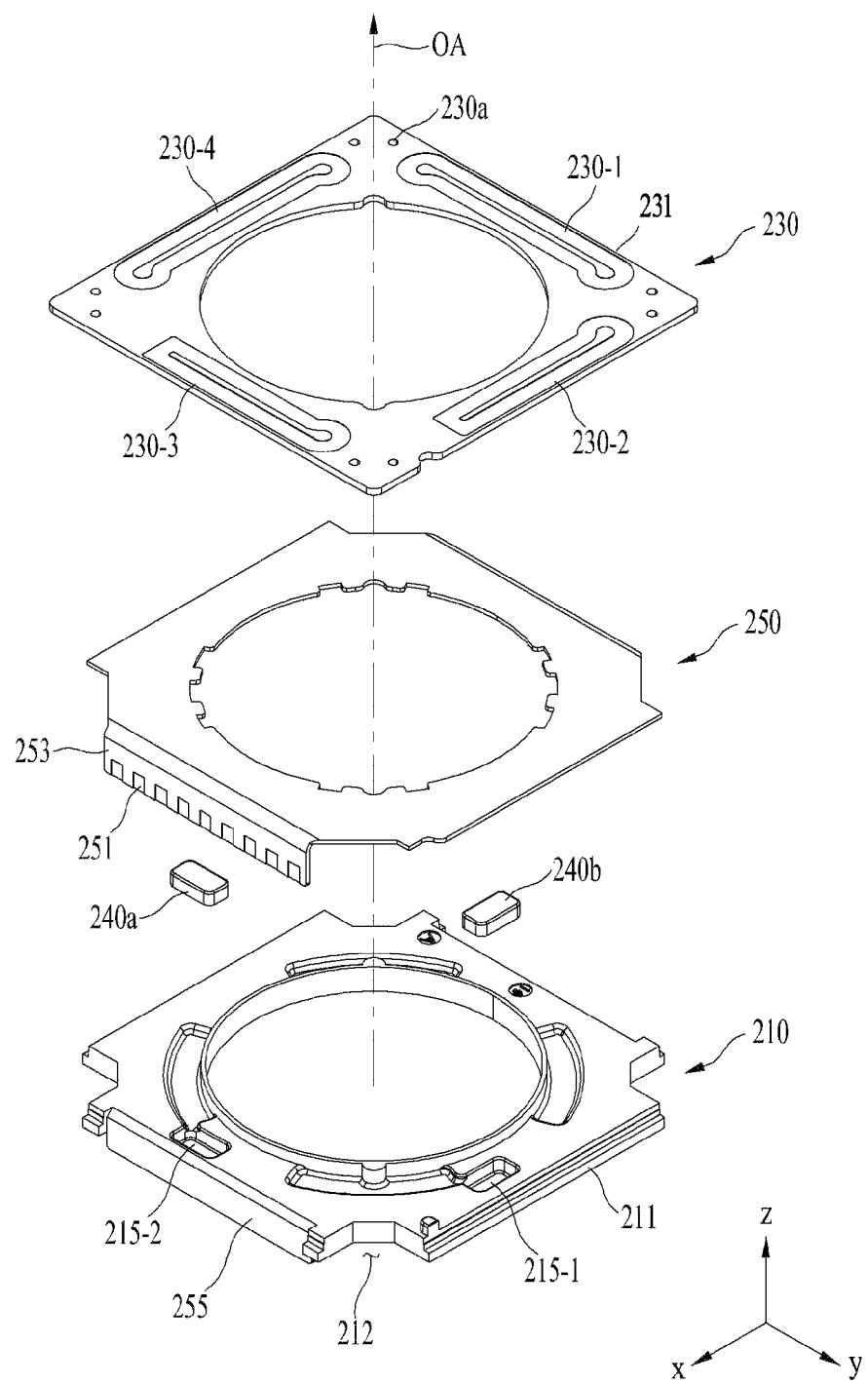
FIG. 11 is an exploded perspective view of a second coil, a second circuit board, a base, and a second position sensor shown in FIG. 1.

FIG. 9A is a plan view of the upper elastic member 150 shown in FIG. 1. FIG. 9B is an enlarged view of a first external frame 152a of sixth and seventh springs 150-6 and 150-7 shown in FIG. 9A. FIG. 9C is a plan view of the lower elastic member 160 shown in FIG. 1. FIG. 10 is a coupling perspective view of the upper elastic member 150, the lower elastic member 160, the base 210, the support member 220, the second coil 230, and the second circuit board 250 shown in FIG. 1. FIG. 11 is an exploded perspective view of the second coil 230, the second circuit board 250, the base 210, and the second position sensor 240 shown in FIG. 1.

The upper elastic member 150 and the lower elastic member 160 may support the bobbin 110 via elasticity.

The upper elastic member 150 may be coupled to an upper portion of the bobbin 110 and an upper portion of the housing 140 and may support the upper portion of the bobbin 110 and the upper portion of the housing 140. The lower elastic member 160 may be connected to a lower portion of the bobbin 110 and a lower portion of the housing 140 and may support the lower portion of the bobbin 110 and the lower portion of the housing 140.

The support member 220 may support the housing 140 to be moved in a direction perpendicular to the optical axis with respect to the base 210 and may electrically connect at least one of the upper or lower elastic member 150 or 160 to the second circuit board 250.

Referring to FIG. 9A, the upper elastic member 150 may include a plurality of upper springs 150-1 to 150-8 that are electrically separated from each other. FIG. 9A illustrates eight upper springs that are electrically separated from each other, but embodiments are not limited thereto.

The upper elastic member 150 may include first to sixth upper springs 150-1 to 150-6 that are bonded directly to and are electrically connected to first to sixth pads 191-1 to 191-6 of the first circuit board 190, and seventh and eighth upper springs 150-7 and 150-8 that are not electrically connected to the first to sixth pads 191-1 to 191-6 of the first circuit board 190.

A plurality of upper springs may be disposed at a first corner portion of the housing 140 in which the first circuit board 190 is disposed, and at least one upper spring may be disposed at each of second to fourth corner portions that are remaining corner portions except for the first corner portion.

Referring to FIGS. 2, 5, 9A, and 10, four upper springs 150-1 to 150-4 that are separated or spaced apart from each other may be disposed at the first corner portion of the housing 140.

Two upper springs 150-5 and 150-8 that are separated or spaced apart from each other may be disposed at the second corner portion of the housing 140.

One upper spring 150-6 may be disposed at the third corner portion of the housing 140, and one upper spring may be disposed at the fourth corner portion for easy bonding of the upper springs 150-1 to 150-6 to the six pads 190-1 to 190-6 of the first circuit board 190.

Any one of the upper springs 150-1, 150-6, 150-7, and 150-8 that are disposed at the first to fourth corner portions of the housing 140, respectively may be coupled to the upper portion of the housing 140 and the upper portion of the bobbin 110.

At least one of the first to fourth upper springs 150-1 to 150-4 and at least one of the fifth to eighth springs 150-5 to 150-8 may include a first internal frame 151 coupled to the bobbin 110, a first external frame 152 coupled to a corresponding one of the first to fourth corner portions of a housing 140a, a first frame connecting portion 153 for connecting the first internal frame 151 and the first external frame 152.

For example, any one of the upper springs 150-1, 150-6, 150-7, and 150-8 that are disposed at the first to fourth corner portions of the housing 140, respectively may include the first internal frame 151 coupled to the bobbin 110, the first external frame 152 coupled to the housing 140, and the first frame connecting portion 153 for connection of the first internal frame 151 and the first external frame 152.

For example, a through hole h1 for coupling with the upper support protrusion 113a of the bobbin 110 may be provided in the first internal frame 151, and a through hole h2 for coupling with the upper support protrusion 143 of the housing 140 may be provided in the first external frame 152.

For example, the first to fourth upper springs 150-1 to 150-4 may be spaced apart from each other at the first corner portion of the housing 140 in which the first circuit board 190 is disposed and may be coupled to the first corner portion of the housing 140.

For example, the second and third upper springs 150-2 and 150-3 may be positioned or disposed between the first upper spring 150-1 and the fourth upper spring 150-4.

For example, the fifth and sixth upper springs 150-5 and 150-6 may be disposed at a corresponding one of the second and third corner portions adjacent to the first corner portion and may be coupled to a corresponding one of the second and third corner portions.

For example, the seventh upper spring 150-7 may be disposed at the fourth corner portion of the housing 140, which faces the first corner portion in a diagonal direction, and may be coupled to the fourth corner portion.

For example, the eighth upper spring 150-8 may be disposed at any one of the second and third corner portions and may be coupled to any one of the second and third corner portions.

Referring to FIG. 9A, each of the first to fourth upper springs 150-1 to 150-4 disposed at the first corner portion of the housing 140 may include first coupling portions 410a to 410d coupled to the first corner portion of the housing 140.

Each of the first coupling portions 410a to 410d of the first to fourth upper springs 150-1 to 150-4 may include contact portions P2 to P5 that contact or are connected to a corresponding one of the first to sixth pads 191-1 to 191-6 of the first circuit board 190.

Each of the contact portions P2 to P5 may extend or protrude from one end of a corresponding one of the first coupling portions 410a to 410d and may be bonded to a corresponding one pad of the first circuit board 190 via soldering or a conductive adhesive member.

The second and third upper springs 150-2 and 150-3 may be disposed between the first and fourth upper springs 150-1 and 150-4. Each of the second and third upper springs 150-2 and 150-3 may include second coupling portions 420a and 420b coupled to second and third supporting members 220-2 and 220-3, and connecting portions 430a and 430b for connecting first coupling portions 410b and 410c and the second coupling portions 420a and 420b to each other.

The first external frame 152 of each of the fifth to eighth springs 150-5 to 150-8 disposed at the second to fourth corner portions of the housing 140 may include first coupling portions 510, 560, and 570 coupled to the second to fourth corner portions of the housing 140, second coupling portions 520a, 520b, 570a, and 570b coupled to fifth to eighth supporting members 220-5 to 220-8, and connecting portions 530a, 530b, 580a, and 580b for connecting the first coupling portions 510, 560, and 570 and the second coupling portions 520a, 520b, 570a, and 570b to each other.

The fifth to eighth supporting members 220-5 to 220-8 may be electrically connected to the second coupling portions 520a, 520b, 570a, and 570b via soldering or a conductive adhesive member (e.g., conductive epoxy) 901 (refer to FIG. 10).

The first coupling portions 410a to 410d, 510, 560, and 570 of each of first external frames of the first to fourth upper springs 150-1 to 150-4 and first external frames 152, 152a, and 152b of the fifth to eighth springs 150-5 to 150-8 may include one or more coupling regions (e.g., S1 to S8) coupled to the housing 140.

In FIG. 9A, the coupling regions S1 to S8 may be configured in the form of a through hole, and a through hole may be configured in the second coupling portions 420a, 420b, 520a, 520b, 570a, and 570b, and the third coupling portion 590, but embodiments are not limited thereto, and according to another embodiment, the coupling regions S1 to S8 may be configured in various shapes for sufficient coupling with the housing 140, for example, in the form of a groove.

The connecting portions 430a, 430b, 530a, 530b, 580a, and 580b may be bent at least once, and a width W2 of the connecting portions 430a, 430b, 530a, 530b, 580a, and 580b may be smaller than a width W1 of the first frame connecting portion 153 of the upper elastic member 150 (W2<W1).

Because of W2<W1, the connecting portions 430a, 430b, 530a, 530b, 580a, and 580b may be easily moved in the optical axis direction, and accordingly stress applied to the upper elastic member 150 and stress applied to the support member 220 may be dispersed.

According to an embodiment, the width W1 of the first frame connecting portion 153 of the upper elastic member 150 may be greater than the width of second frame connecting portions 163-1 and 163-2 of the lower elastic member 160, but embodiments are not limited thereto.

For example, the first external frames 152 of the sixth and seventh upper springs 150-6 and 150-7 may be symmetric in right and left directions based on reference lines 501 and 502.

For example, the first external frames of the fifth and eighth upper springs 150-5 and 150-8 may be symmetric in right and left directions based on the reference line 501.

The reference line 501 may be a straight line that passes through a central point 101 (refer to FIG. 9A) and edges of second and third corner portions of the housing 140, which face each other, and the reference line 502 may be a straight line that passes through the central point 101 (refer to FIG. 9A) and edges of first and fourth corner portions of the housing 140, which face each other. For example, the central point 101 may be the center of the bobbin 110 or the center of the housing 140, and the edges of the housing 140 may be the stoppers 144-1 to 144-4.

For example, in order to counterbalance and support the housing 140 while inhibiting the housing 140 from being inclined to one side, the coupling regions S1 to S8 of the first coupling portions 410a to 410d, 510, 560, and 570 of the first to eighth upper springs 150-1 to 150-8 may be symmetric in right and left directions based on the reference lines 501 and 502, but embodiments are not limited thereto.

The fifth upper spring 150-5 disposed at the second corner portion may include a first upper extension frame 154a that extends toward the first corner portion from one end of the first coupling portion 570 of the first external frame 152a. For example, the first upper extension frame 154a may have one end connected to the first external frame 152a and the other end coupled to the pad 190-1 of the first circuit board 190.

The sixth upper spring 150-6 disposed at the third corner portion may include a second upper extension frame 154b that extends toward the first corner portion from one end of the first coupling portion 510 of the first external frame 152. For example, the second upper extension frame 154b may have one end connected to the first external frame 152 and the other end coupled to the pad 190-6 of the first circuit board 190.

Contact portions P1 and P6 that contact or are connected to a corresponding one of the first to sixth pads 191-1 to 191-6 of the first circuit board 190 may be provided on each of the first and second upper extension frames 154a and 154b.

For example, each of the contact portions P1 and P6 may extend or protrude from one end of a corresponding one of the first and second upper extension frames 154a and 154b and may be bonded to a corresponding one of the first and sixth pads 191-1 and 191-6 of the first circuit board 190 via soldering or a conductive adhesive member. For example, the width of each of the contact portions P1 to P6 may be smaller than the width of an external frame of a corresponding upper spring, but embodiments are not limited thereto.

A through hole h3 coupled to an upper supporting protrusion of the housing 140 may be provided in each of the first and second upper extension frames 154a and 154b.

The first coupling portions 410a to 410d, 510, 560, and 570 may contact an upper surface of the corner portions 142 of the housing 140 and may be supported by the corner portions 142 of the housing 140. On the other hand, the connecting portions 430a, 430b, 530a, 530b, 580a, and 580b may not contact the upper surface of the housing 140 and may be spaced apart from the housing 140. In order to inhibit oscillation due to vibration, a damper (not shown) may be filled in an empty space between the connecting portions 430a, 430b, 530a, 530b, 580a, and 580b and the housing 140.

Referring to FIG. 9C, the lower elastic member 160 may include a plurality of lower springs 160-1 and 160-2.

For example, each of first and second lower springs 160-1 and 160-2 may include second internal frames 161-1 and 161-2 coupled or fixed to a lower portion of the bobbin 110, second external frames 162-1 to 162-3 coupled or fixed to a lower portion of the housing 140, the second frame connecting portions 163-1 and 163-2 for connecting the second internal frames 161-1 and 161-2 and second external frames 162-1 and 162-2 to each other, and connecting frames 164-1 and 164-2 that connects second external frames to each other.

The width of each of the connecting frames 164-1 and 164-2 may be smaller than the width of each of first internal frames, but embodiments are not limited thereto.

In order to inhibit spatial interference with second coils 230 and the first magnets 130-1 to 130-4, the connecting frames 164-1 and 164-2 may be positioned outside the second coils 230-1 to 230-4 and the first magnets 130-1 to 130-4 based on the second coils 230-1 to 230-4 and the first magnets 130-1 to 130-4.

In this case, the outside of the second coils 230-1 to 230-4 and the first magnets 130-1 to 130-4 may be an opposite side to a region in which the center of the bobbin 110 or the center of the housing 140 is positioned, based on the second coils 230-1 to 230-4 and the first magnets 130-1 to 130-4.

For example, the connecting frames 164-1 and 164-2 may be positioned not to overlap the second coils 230-1 to 230-4 in the optical axis direction, but embodiments are not limited thereto, and according to another embodiment, at least a portion of the connecting frames 164-1 and 164-2 may be aligned with or may overlap the second coils 230-1 to 230-4 in the optical axis direction.

A first connecting protrusion 165-1 to which the other end of a first supporting member 220-1 is bonded may be provided at a portion at which the connecting frame 164-1 and the second external frame 162-2 of the first lower spring 160-1 are connected.

A second connecting protrusion 165-2 to which the other end of a fourth supporting member 220-4 is bonded may be provided at a portion at which a connecting frame of the second lower spring 160-2 and the second external frame are connected.

A through hole 165a for coupling with the other end of a corresponding one of the first and fourth supporting members 220-1 and 220-4 may be provided in each of the first and second connecting protrusions 165-1 and 165-2.

The upper springs 150-1 to 150-8 and the lower springs 160-1 and 160-2 may each be configured as a leaf spring, but embodiments are not limited thereto, and the upper springs 150-1 to 150-8 and the lower springs 160-1 and 160-2 may each be embodied as a coil spring or the like.

Hereinafter, the supporting members 220-1 to 220-8 will be described.

The supporting members 220-1 to 220-8 may be disposed to correspond to the corner portions 142 of the housing 140, may connect two (e.g., 150-1 and 150-4) of the upper springs 150-1 to 150-8 and the first and second lower springs 160-1 and 160-2 to each other, and may connect other four (e.g., 150-2, 150-3, 150-5, and 150-6) of the upper springs 150-1 to 150-8 to the second circuit board 250.

For example, the supporting members 220-2 and 220-3 may connect two (e.g., 150-2 and 150-3) of the four upper springs 150-1 to 150-4 positioned at the first corner portion and the second circuit board 250 to each other.

For example, the supporting members 220-1 and 220-4 may connect other two (e.g., 150-1 and 150-4) of the upper springs 150-1 to 150-4 positioned at the first corner portion to the first and second lower springs 160-1 and 160-2.

The fifth supporting member 220-5 may connect the upper spring 150-5 positioned at the second corner portion and the second circuit board 250 to each other.

The sixth supporting member 220-6 may connect the upper spring 150-6 positioned at the third corner portion and the second circuit board 250 to each other.

The seventh supporting member 220-7 may connect the upper spring 150-7 positioned at the fourth corner portion and the second circuit board 250 to each other.

The eighth supporting member 220-8 may connect the upper spring 150-8 positioned at the second corner portion and the second circuit board 250 to each other.

The supporting members 220-1 to 220-8 may electrically connect at least one of upper springs positioned at at least one of the corner portions and a circuit board to each other.

For example, the supporting members 220-2, 220-3, 220-5, and 220-6 may electrically connect the upper springs 150-2, 150-3, 150-5, and 150-6 and the second circuit board 250 to each other.

The supporting members 220-1 to 220-8 may be spaced apart from the housing 140 and may not be fixed to the housing 140, and instead, one end of the supporting members 220-2, 220-3, and 220-5 to 220-8 may be connected or bonded directly to the second coupling portions 420a, 420b, 520a, 520b, 570a, and 570b of the second, third, and fifth to eighth upper springs 150-2, 150-3, and 150-5 to 150-8.

The other end of the second, third, and fifth to eighth supporting members 220-2, 220-3, and 220-5 to 220-8 may be connected or bonded directly to the second circuit board 250.

One end of the first and fourth supporting members 220-1 and 220-4 may be connected or bonded directly to the third coupling portion 590 of the first and fourth upper springs 220-1 and 220-4.

The other end of the first and fourth supporting members 220-1 and 220-4 may be connected or bonded directly to the through hole 165a provided in the first and second connecting protrusions 165-1 and 165-2 of the lower springs 160-1 and 160-2.

Single contact may be formed between the second coupling portions 420a, 420b, 520a, 520b, 570a, and 570b, and the first coupling portions 410b, 410c, 510, 560, and 570 by the connecting portions 430a, 430b, 530a, 530b, 580a, and 580b.

For example, the second, third, and fifth to eighth supporting members 220-2, 220-3, and 220-5 to 220-8 may pass through the through hole 147 (refer to FIG. 4) provided in the corner portion 142 of the housing 140, but the supporting members 220-1 and 220-4 may be disposed adjacently to a boundary line between the first side portion 141 and the corner portion 142 of the housing 140 and may not pass through the corner portion 142 of the housing 140.

Each of the first to fourth supporting members 220-1 to 220-4 may be electrically and independently connect the first to fourth upper springs 150-1 to 150-4 to the second circuit board 250.

In order to counterbalance and support the housing 140 via symmetric arrangement, each of the sixth and seventh supporting members 220-6 and 220-7 may include two supporting members 220-6a and 220-6b or 220-7a and 220-7b that are connected or bonded to the sixth upper elastic member 150-6 or the seventh upper elastic member 150-7, and at least one of the two supporting members 220-6a and 220-6b or 220-7a and 220-7b may be electrically connected to the second circuit board 250.

The first coil 120 may be connected or bonded directly to a corresponding one of second internal frames of the first and second lower springs 160-1 and 160-2.

The four pads 191-1, 191-3, 191-4, and 191-6 of the first circuit board 190 may be electrically connected to the second circuit board 250 by the four upper springs 150-5, 150-2, 150-3, and 150-6 corresponding to the four pads 191-1, 191-3, 191-4, and 191-6, and the supporting members 220-5, 220-2, 220-3, and 220-6 that are electrically connected to the four upper springs 150-5, 150-2, 150-3, and 150-6.

The two pads 191-2 and 191-5 of the first circuit board 190 may be electrically connected to the first coil 120 by the two upper springs 150-1 and 150-4 corresponding to the two pads 191-2 and 191-5, the supporting members 220-1 and 220-4 that are electrically connected to the two upper springs 150-1 and 150-4, and the first and second lower springs 160-1 and 160-2.

The six pads 191-1 to 191-6 of the first circuit board 190 may be electrically connected to the first position sensor 170, and four (e.g., 191-1, 191-3, 191-4, and 191-6) of the six pads 191-1 to 191-6 may be electrically connected to the second circuit board 250. The clock signal SCL, and power signals VCC and GND for data communication may be transmitted and received between the first position sensor 170 and the second circuit board 250 through four pads (e.g., 191-1, 191-3, 191-4, and 191-6) of the first circuit board 190, the upper springs 150-2, 150-3, 150-5, and 150-6 connected to the four pads, and the supporting members 220-2, 220-3, 220-5, and 220-6.

The support member 220 may be embodied as a member for elastic support, e.g., a suspension wire, a leaf spring, or a coil spring. According to another embodiment, the support member 220 may be integrated into the upper elastic member 150.

In the embodiment of FIG. 10, the second and fifth pads 191-2 and 191-5 of the first circuit board 190 may be connected to the first and second lower springs through the first and fourth supporting members 220-1 and 220-4, and thus may be connected to the first coil 120, but embodiments are not limited thereto.

According to another embodiment, the first coil 120 may be bonded to first internal frames of two of the upper springs 150-2, 150-5, and 150-6, and the first and fourth supporting members 220-1 and 220-4 may be omitted.

According to another embodiment, one end of the first coil 120 may be bonded to a second internal frame of any one of the first and second lower springs 160-1 and 160-2, the remaining one end of the first coil 120 may be bonded to a first internal frame of any one of the upper springs 150-2, 150-5, and 150-6, and at least one of the first and fourth supporting members 220-1 and 220-4 may be configured.

Hereinafter, the base 210, the second circuit board 250, and the second coil 230 will be described.

Referring to FIG. 11, the base 210 may include a hollow that corresponds to a hollow of the bobbin 110 or/and a hollow of the housing 140 and may have the same shape or a corresponding shape to the cover member 300, for example, a rectangular shape.

The base 210 may include a stair 211 with adhesives coated thereon when the cover member 300 is adhered and fixed. In this case, the stair 211 may guide the cover member 300 coupled to an upper side thereof, and a lower end of lateral plates of the cover member 300 may contact the stair 211.

The stair 211 of the base 210 and the lower end of the lateral plate of the cover member 300 may be adhered and fixed by adhesives or the like.

A support portion 255 may be provided in a region of the base 210, which faces a terminal 251 of the second circuit board 250. The support portion 255 may support a terminal surface 253 of the second circuit board 250 on which the terminal 251 is formed.

The base 210 may have a concave groove 212 in a region corresponding to an edge of the cover member 300. When an edge of the cover member 300 protrudes, a protrusion of the cover member 300 may be coupled to the base 210 in the second concave groove 212.

Accommodation grooves 215-1 and 215-2 in which the second position sensor 240 including image stabilizer (OIS) position sensors 240a and 240b is to be disposed may be configured on an upper surface of the base 210. An accommodation portion (not shown) on which a filter 610 of a camera module 200 is installed may be formed on a lower surface of the base 210.

The second coil 230 may be disposed above the second circuit board 250, and the OIS position sensors 240a and 240b may be disposed in the accommodation grooves 215-1 and 215-2 of the base 210 positioned below the second circuit board 250.

The OIS position sensors 240a and 240b may detect displacement of the OIS moving part in a direction perpendicular to the optical axis. Here, the OIS moving part may include an AF moving part, and components installed in the housing 140.

For example, the OIS moving part may include the AF moving part and the housing 140, and according to an embodiment, the OIS moving part may further include the magnets 130-1 to 130-4. For example, the AF moving part may include the bobbin 110, and components that are installed on the bobbin 110 and are moved along with the bobbin 110. For example, the AF moving part may include the bobbin 110, a lens (not shown) installed on the bobbin 110, and the first coil 120.

The second circuit board 250 may be disposed below the bobbin 110, may be disposed on an upper surface of the base 210, and may include a hollow corresponding to a hollow of the bobbin 110, a hollow of the housing 140, or/and a hollow of the base 210. A shape of an outer periphery surface of the second circuit board 250 may have the same or a corresponding shape to an upper surface of the base 210, for example, a rectangular shape.

The second circuit board 250 may include at least one terminal surface 253 bent from an upper surface, and a plurality of terminals 251 or pins for receiving electric signals from the outside may be provided on the terminal surface 253.

The second coil 230 may be positioned between a bobbin and the second circuit board 250, and may be disposed above the second circuit board 250 to face the magnets 130-1 to 130-4 fixed to the housing 140 in the optical axis direction.

The second coil 230 may include four second coils 230-1 to 230-4 that are installed on four sides of a circuit member 231 shaped like a rectangle. For example, the second coil 230 may include two second coils 230-1 and 230-3 for a second direction, and two second coils 230-2 and 230-4 for a third direction, but embodiments are not limited thereto. According to another embodiment, the second coil 230 may include only one second coil for the second direction and one second coil for the third direction or may include four or more second coils.

The housing 140 may be moved by interaction between the magnets 130-1 to 130-4 and the second coils 230-1 to 230-4, which are disposed to face each other, in the second and/or third direction, e.g., the x-axis and/or y-axis direction, and thus hand shake correction may be performed.

In FIG. 11, the second coils 230-1 to 230-4 may be configured on the circuit member 231 that is separately configured from the second circuit board 250, but embodiments are not limited thereto, and according to another embodiment, the second coils 230-1 to 230-4 may be configured in the form of a coil block shaped like a ring, may be configured in the form of an FP coil, or may be embodied in the form of a circuit pattern formed on the second circuit board 250.

The second coil 230 may include a through hole penetrated by the circuit member 231, and supporting members may penetrate the through hole and may be electrically connected to the second circuit board 250.

Each of the OIS position sensors 240a and 240b may be a hall sensor and may be any sensor as long as the sensor is capable of detecting the intensity of a magnetic field. For example, each of the OIS position sensors 240a and 240b may be embodied in the form of a driver including a hall sensor or may be embodied as a position detection sensor such as a hall sensor alone.

Through the plurality of terminals 251 installed on the terminal surface 253 of the second circuit board 250, signals SCL, SDA, VCC, and GND for data communication with the first position sensor 170 may be transmitted and received, a driving signal to be supplied to the OIS position sensors 240a and 240b may be received, and signals output from the OIS position sensors 240a and 240b may be received and may be output to the outside.

According to an embodiment, the second circuit board 250 may be provided as a flexible printed circuit board (FPCB), but embodiments are not limited thereto, and terminals of the second circuit board 250 may be formed directly on a surface of the base 210 using a surface electrode method or the like.

According to an embodiment, a driving signal is provided directly to the first coil 120 from the first position sensor 170 through the supporting members 220-1 and 220-4, and thus the number of supporting members may be reduced and an electrical connection structure may be simplified compared with the case in which a driving signal is provided to the first coil 120 through the second circuit board 250.

The first position sensor 170 is embodied as a driver integrated circuit (IC) for measuring temperature, and thus output of a hall sensor may be compensated for to have a minimum change depending on a temperature change or to have a constant inclination depending on a temperature change, thereby enhancing the accuracy of AF driving irrespective of a temperature change.

Figure 12:
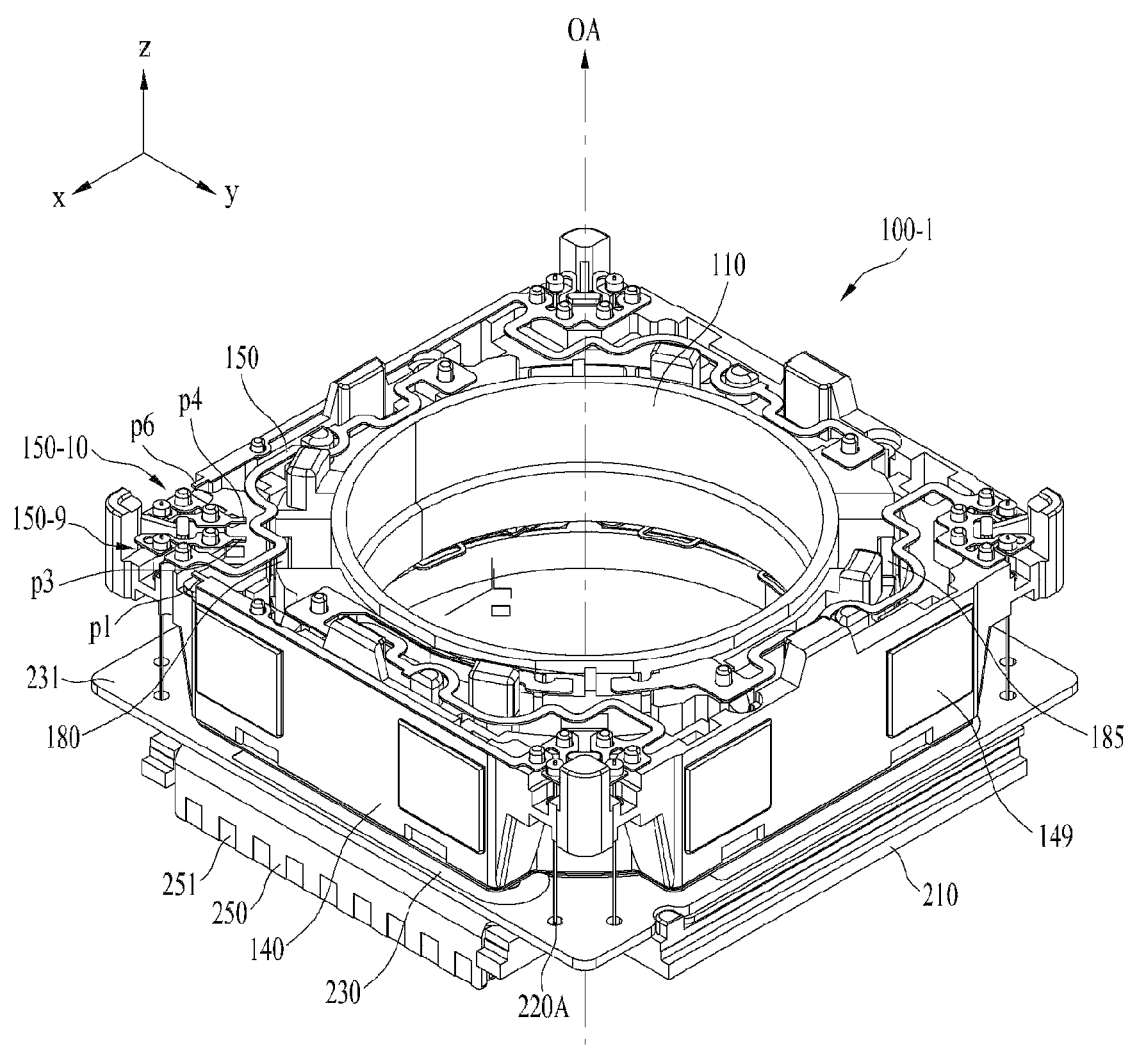
FIG. 12 is a perspective view of a lens moving apparatus according to another embodiment.
Figure 13A:
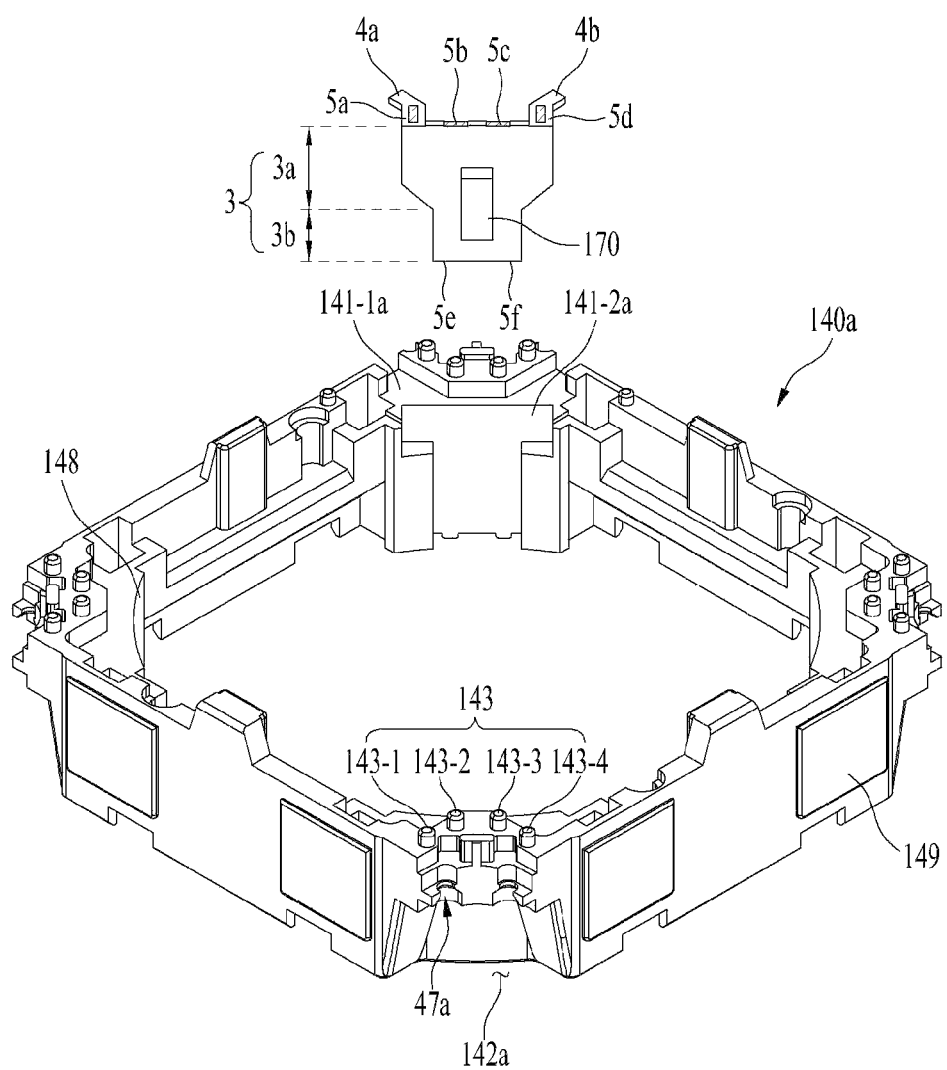
FIG. 13A is an exploded perspective view of a first circuit board on which a housing and a first position sensor are installed.
Figure 13B:
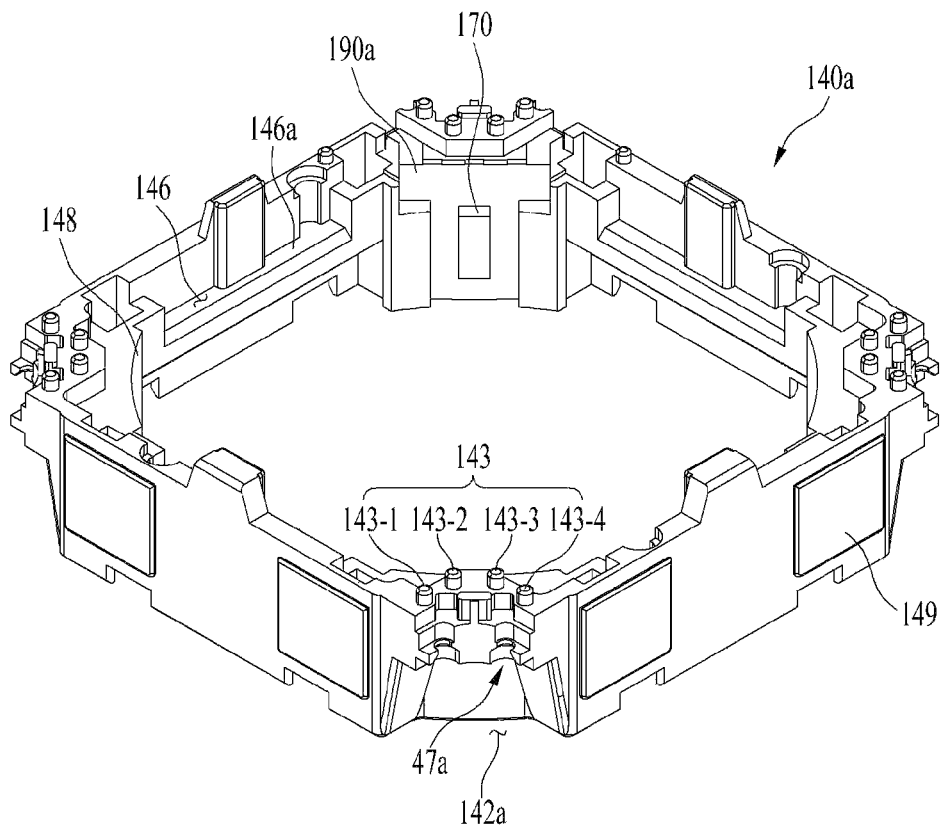
FIG. 13B is a coupling perspective view of a housing, a first position sensor, and a first circuit board.
Figure 14:
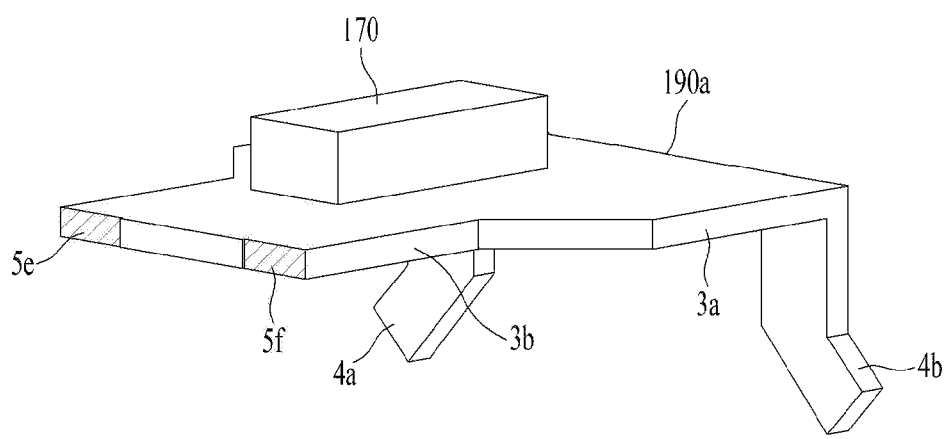
FIG. 14 is a coupling perspective view of a first circuit board and a first position sensor.

FIG. 12 is a perspective view of a lens moving apparatus 100-1 according to another embodiment. FIG. 13A is an exploded perspective view of a first circuit board 190a on which the housing 140a and the first position sensor 170 are installed. FIG. 13B is a coupling perspective view of the housing 140a, the first position sensor 170, and the first circuit board 190a. FIG. 14 is a coupling perspective view of a first circuit board and a first position sensor. The same reference numerals as in FIGS. 1 to 11 refer to the same parts, and a description of the same parts will be omitted or simplified.

Referring to FIGS. 12 to 14, the lens moving apparatus 100-1 may include the bobbin 110, the first coil 120, the first magnet 130, the housing 140a, an upper elastic member 150A, a lower elastic member 160A, the first position sensor 170, the second magnet 180, the first circuit board 190a, and a supporting member 220A.

The lens moving apparatus 100-1 may further include the third magnet 185, the second coil 230, the second position sensor 240, the second circuit board 250, the base 210, and the cover member 300.

Referring to FIG. 13A, the first circuit board 190a may include a body 3, first and second protrusions 4a and 4b, and first to sixth pads 5a to 5f.

For example, the body 3 may be disposed in parallel to an internal surface of a first corner portion, and the first and second protrusions 4a and 4b may be disposed in parallel to an upper surface of the first corner portion.

The body 3 may include an upper end 3a and a lower end 3b.

The upper end 3a of the body 3 may include a portion having a width or a length in a horizontal direction, which is reduced in a downward direction from the above. This is because the body 3 needs to be stably accommodated or disposed in the housing 140a to inhibit the body 3 coupled to the housing 140a from being moved in a downward direction by gravity.

A width or a length in a horizontal direction of the lower end 3b of the body 3 may be constant, and may be equal to or smaller than the width or the length in a horizontal direction of the upper end 3a of the body 3.

The first position sensor 170 may be disposed on one surface (e.g., a front surface) of the body 3.

In FIGS. 13A and 13B, the first position sensor 170 may be disposed on a front surface of the body 3, which faces the external surface of the bobbin 110, but embodiments are not limited thereto. According to another embodiment, the first position sensor 170 may be disposed on a rear surface of the body 3, which faces an internal surface of the housing 140, and in this case the housing 140 may include a guide groove in which the first position sensor 170 is accommodated or disposed and which is configured to move the first position sensor 170 in the optical axis direction along with movement of the bobbin 110. In this case, the guide groove provided on the housing 140 may be configured to support or guide the first position sensor 170 in order to set the initial position of the first position sensor 170.

The first protrusion 4a may be disposed on one end of the upper end 3a of the body 3, and the second protrusion 4b may be disposed on the other end of the upper end 3a of the body 3.

For example, the first protrusion 4a may be connected to one end of an upper surface of the upper end 3a of the body 3, may be bent at one end of the upper surface of the upper end 3a of the body 3, and may protrude in a direction toward a rear surface from a front surface of the body 3 based on the rear surface of the body 3.

For example, the second protrusion 4b may be connected to the other end of the upper surface of the upper end 3a of the body 3, may be bent at the other end of the upper surface of the body 3, and may protrude in a direction toward the rear surface from the front surface of the body 3 based on the rear surface of the body 3.

The second and third pads 5b and 5c may be spaced apart from the upper surface of the upper end 3a of the body 3, and each of the first and fourth pads 5a and 5d may be disposed on a corresponding one of the first and second protrusions 4a and 4b.

In order to facilitate bonding between the first and second upper extension frames 154a and 154b and the first and fourth pads 5a and 5d, one end of each of the first and second protrusions 4a and 4b may be bent toward the first and second upper extension frames 154a and 154b.

In order to facilitate direct bonding with the first and second lower springs 160-1 and 160-2, the fifth and sixth pads 5e and 5f may be spaced apart from the lower surface of the lower end 3b of the body 3.

In FIG. 5, the housing 140 has the second installation groove 141-2 in which the first position sensor 170 is disposed, but in FIG. 12, the housing 140a does not have a groove in which the first position sensor 170 is disposed, but embodiments are not limited thereto, and according to another embodiment, the housing may include a groove for disposing the first position sensor 170.

An accommodation groove in which the first circuit board 190a is accommodated or disposed may be disposed on an upper portion or upper end of at least one of the corner portions 142 of the housing 140a.

For example, the accommodation groove of the housing 140a may include a first groove 141-1a and a second groove 141-2a.

For example, the first groove 141-1a may be provided at the first corner portion of the housing 140a, and the first and second protrusions 4a and 4b of the first circuit board 190a may be disposed or accommodated.

For example, the second groove 141-2a may be provided at the first corner portion of the housing 140a, and the body 3 of the first circuit board 190a may be disposed or accommodated.

The first groove 141-1a may have an open upper portion, a side surface, and a bottom and may have an opening that is open toward an internal side of the housing 140.

The second groove 141-2a may be recessed from the bottom of the first groove 141-1a, and in order to easily install the first position sensor 170, the second groove 141-2a may be configured in the form of a groove having an open upper portion, a side surface, and a bottom and may have an opening that is open toward an internal surface of the first corner portion 142 of the housing 140a.

The second groove 141-2a may have a portion with a diameter that is reduced downward from the above to have the corresponding shape or the same shape as the body 3 of the first circuit board 190a.

The housing 140a shown in FIGS. 13A and 13B may not include the stoppers 144-1 to 144-4 of the housing 140 shown in FIG. 4, but according to another embodiment, the housing 140a may include the stoppers 144-1 to 144-4 shown in FIG. 4.

A through hole 47a of the housing 140a shown in FIGS. 13A and 13B may be partially open, but embodiments are not limited thereto, and according to another embodiment, the through hole 47a may be configured in the form of a through hole shown in FIG. 4.

Figure 15:
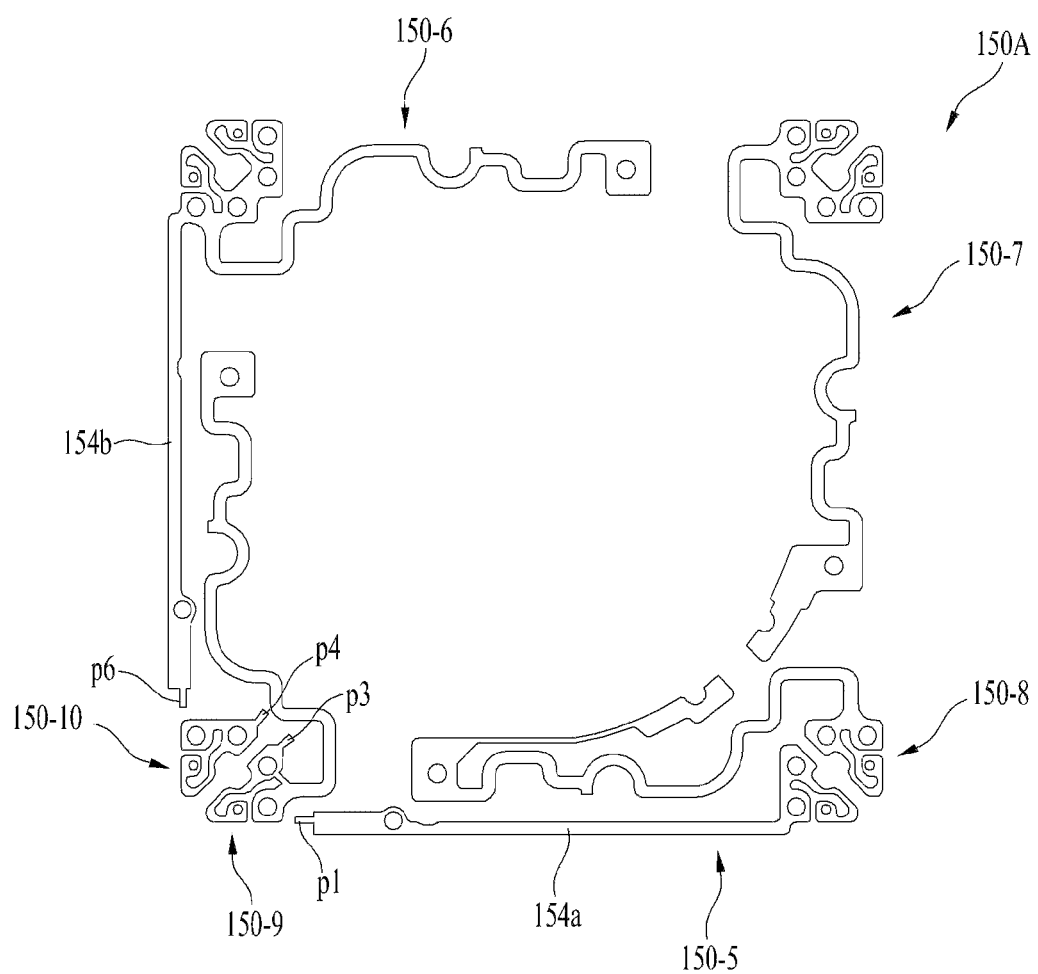
FIG. 15 illustrates an upper elastic member shown in FIG. 12.

FIG. 15 illustrates the upper elastic member 150A shown in FIG. 12. The same reference numeral as in FIG. 9A refers to the same part and the description of FIG. 9A may be applied to the same part.

The upper elastic member 150A may include a plurality of upper springs 150-5 to 150-10.

In the embodiment of FIGS. 9A and 10, the six pads 191-1 to 191-6 of the first circuit board 190 disposed at the first corner portion of the housing 140 are connected or bonded to six upper springs, and thus the four upper springs 150-1 to 150-4 that are spaced apart from each other may be disposed at the first corner portion.

In FIG. 15, the four pads 5a to 5d of the first circuit board 190a disposed at the first corner portion of the housing 140a are connected or bonded directly to the four upper springs 150-3, 150-5, 150-9, and 150-10, and thus the two upper springs 150-9 and 150-10 that are spaced apart from each other may be disposed at the first corner portion.

For example, the upper springs 150-9 and 150-10 may be disposed at the first corner portion of the housing 140a and may be connected to the pads 5b and 5c of the first circuit board 190a.

The upper spring 150-3 may be disposed at the second corner portion of the housing 140a and may be connected to the pad 4b of the first circuit board 190a.

The upper spring 150-5 may be disposed at the third corner portion of the housing 140a and may be connected to the pad 4a of the first circuit board 190a.

The upper spring 150-7 may be disposed at the fourth corner portion of the housing 140a.

The first and second lower springs 160-1 and 160-2 may be connected, coupled, or bonded directly to the pads 5e and 5f.

For example, the upper spring 150-9 of FIG. 15 may be configured by connecting the first coupling portions 410a and 410b of the first and second upper springs 150-1 and 150-2 of FIG. 9A to each other, the upper spring 150-10 of FIG. 15 may be configured by connecting the first coupling portions 410c and 410d of the first and fourth upper springs 150-3 and 150-4 of FIG. 9A, and the contact portions P2 and P5 may be omitted.

The supporting member 220A according to the embodiment of FIG. 15 may include the supporting members 220-2, 220-3, and 220-5 to 220-8, and the supporting members 220-1 and 220-4 for connecting the first and fourth upper springs 150-1 and 150-4 and the first and second lower springs 160-1 and 160-2 of FIG. 9A may be omitted.

For example, the supporting members 220-2, 220-3, and 220-5 to 220-8 may be disposed at first to fourth corners of the housing 140a and may connect the upper springs 150-5 to 150-10 and the second circuit board 250 to each other. For example, the upper springs 150-5 to 150-10 and the second circuit board 250 may be electrically connected to each other by the supporting members 220-2, 220-3, and 220-5 to 220-8.

For example, the two supporting members 220-2 and 220-3 may be disposed at the first corner portion and may connect a corresponding one of the upper springs 150-9 and 150-10 to the second circuit board 250.

The supporting member 220-5 may be disposed at the second corner portion and may connect the upper spring 150-5 to the second circuit board 250.

The supporting member 220-6 may be disposed at the third corner portion and may connect the upper spring 150-6 to the second circuit board 250.

The supporting member 220-7 may be disposed at the fourth corner portion and may connect the upper springs 150-7 and 150-8 to the second circuit board 250. For example, two supporting members that are spaced apart from each other may be disposed at each corner portion of the housing 140a.

For example, the upper spring 150-10 may be coupled only to the bobbin 110 and the first corner portion of the housing 140a, and the upper spring 150-9 may be coupled to each of the bobbin 110 and the first corner portion of the housing 140a, but embodiments are not limited, and according to another embodiment, each of the upper springs 150-9 and 150-10 may be coupled to the bobbin 110 and the housing 140a.

At least one (e.g., 150-6 to 150-8) of the upper springs 150-5 to 150-10 may include the first internal frame 151 coupled to the bobbin 110, the first external frame 152 coupled to a corresponding one of the first to fourth corner portions, and the first frame connecting portion 153 for connecting the first internal frame 151 and the first external frame 152.

For example, each of the upper springs 150-5 to 150-10 may include a first external frame coupled to the housing 140 (e.g., corner portions).

A first external frame of each of the upper springs 150-5 to 150-10 may include a first coupling portion coupled to a corresponding one of the first to fourth corner portions of the housing, a second coupling portion coupled to a corresponding one of the first to fourth supporting members, and at least one connecting portion for connecting the first coupling portion and the second coupling portion.

Each of the first and second lower springs 160-1 and 160-2 may include a second internal frame 161 coupled to the bobbin 110, a second external frame 162 coupled to the housing 140a, and a second frame connecting portion 163 for connecting the second internal frame 161 and the second external frame 162 to each other. Each of the pads 5e and 5f of the first circuit board 190a may be coupled to a corresponding one of the first and second lower springs 161 and 162.

The upper spring 150-5 may include the first upper extension frame 154a having one end connected to a first external frame of the upper spring 150-5 and the other end coupled to the pad 5a of the first circuit board 190a.

The upper spring 150-6 may include the second upper extension frame 154b having one end connected to a first external frame of the upper spring 150-6 and the other end coupled to the pad 5d of the first circuit board 190a.

Each of the upper springs 150-5 to 150-10 of FIG. 15 may include a first coupling portion, a second coupling portion, and a connecting portion, and the description of the first coupling portions 510, 560, and 570, the second coupling portions 520a, 520b, 570a, and 570b, and the connecting portions 530a, 530b, 580a, and 580b shown in FIG. 9A may be applied thereto.

Figure 16:
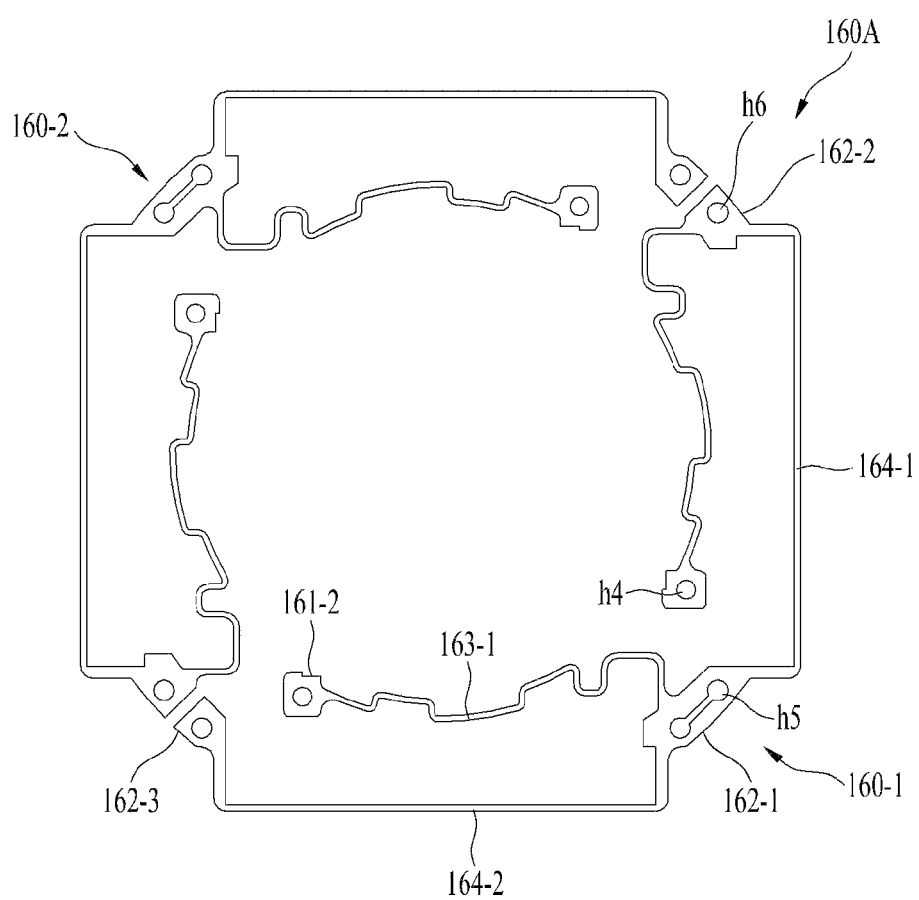
FIG. 16 illustrates a lower elastic member according to the embodiment shown in FIG. 12.
Figure 17:
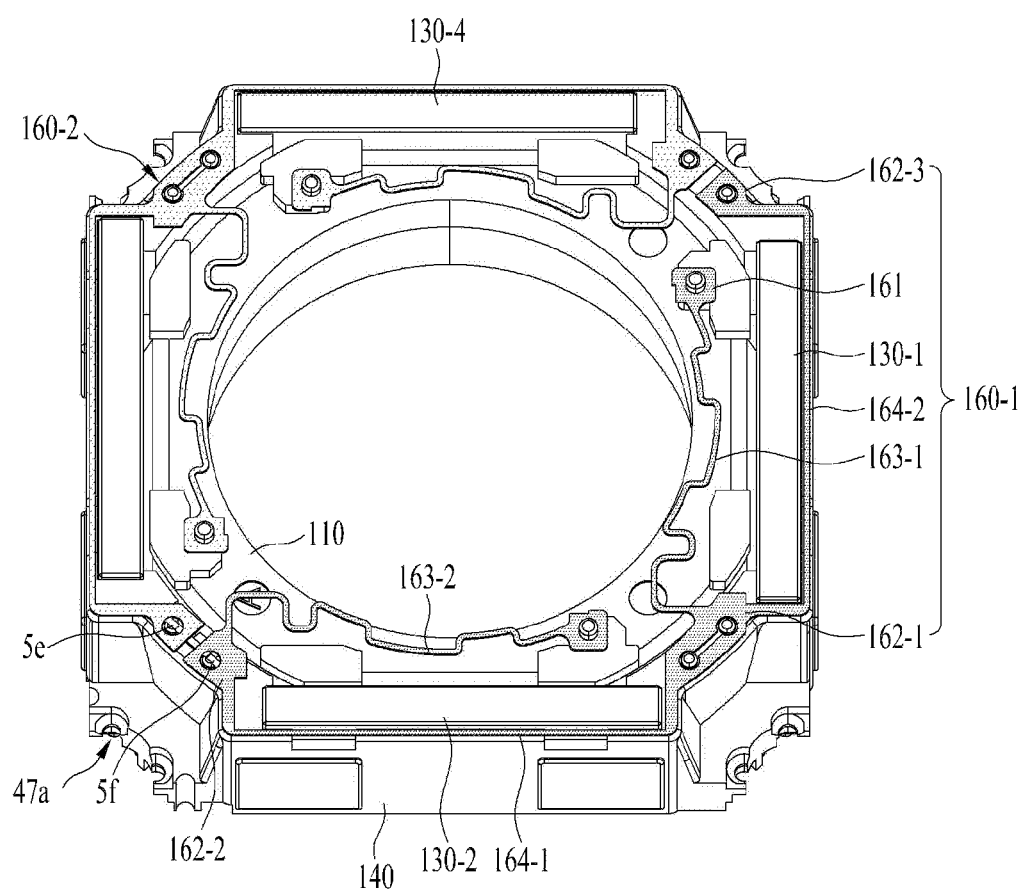
FIG. 17 illustrates conductive connection of first and second lower springs and pads of a first circuit board.

FIG. 16 illustrates the lower elastic member 160A according to the embodiment shown in FIG. 12. FIG. 17 illustrates conductive connection of the first and second lower springs 160-1 and 160-2 and pads of the first circuit board 190a.

Referring to FIGS. 16 and 17, the lower elastic member 160A shown in FIG. 16 may be configured by omitting the first and second connecting protrusions 165-1 and 165-2 from the lower elastic member 160 of FIG. 9C, and the description of FIG. 9C may be applied in the same way.

Each of the fifth and sixth pads 4e and 4f of the first circuit board 190a may be connected or bonded to the second external frame 162-2 of a corresponding one of the first and second lower springs 160-1 and 160-2.

For example, each of the fifth and sixth pads 5e and 5f of the first circuit board 190a may be bonded to a through hole h6 provided in the second external frame 162-2 of a corresponding one of the first and second lower springs 160-1 and 160-2 via soldering or a conductive adhesive member.

Each of the fifth and sixth pads 4e and 4f of the first circuit board 190a may be electrically connected to a corresponding one of the first and second lower springs 160-1 and 160-2.

In the embodiment of FIG. 12, the first position sensor 170 may transmit signals for data communication to the second circuit board 250 or may receive the signals from the second circuit board 250 through the four upper springs 150-5, 150-6, 150-9, and 150-10, and the four supporting members 220-2, 220-3, 220-5, and 220-6.

The first coil 120 may be electrically connected to the first and second lower springs 160-1 and 160-2 and the fifth and sixth pads 5e and 5f of the first circuit board 190a and the first and second lower springs 160-1 and 160-2 may be directly connected to each other, and thus the first position sensor 170 and the first coil 120 may be electrically connected to each other and the first position sensor 170 may provide a driving signal directly to the first coil 120.

Figure 18:
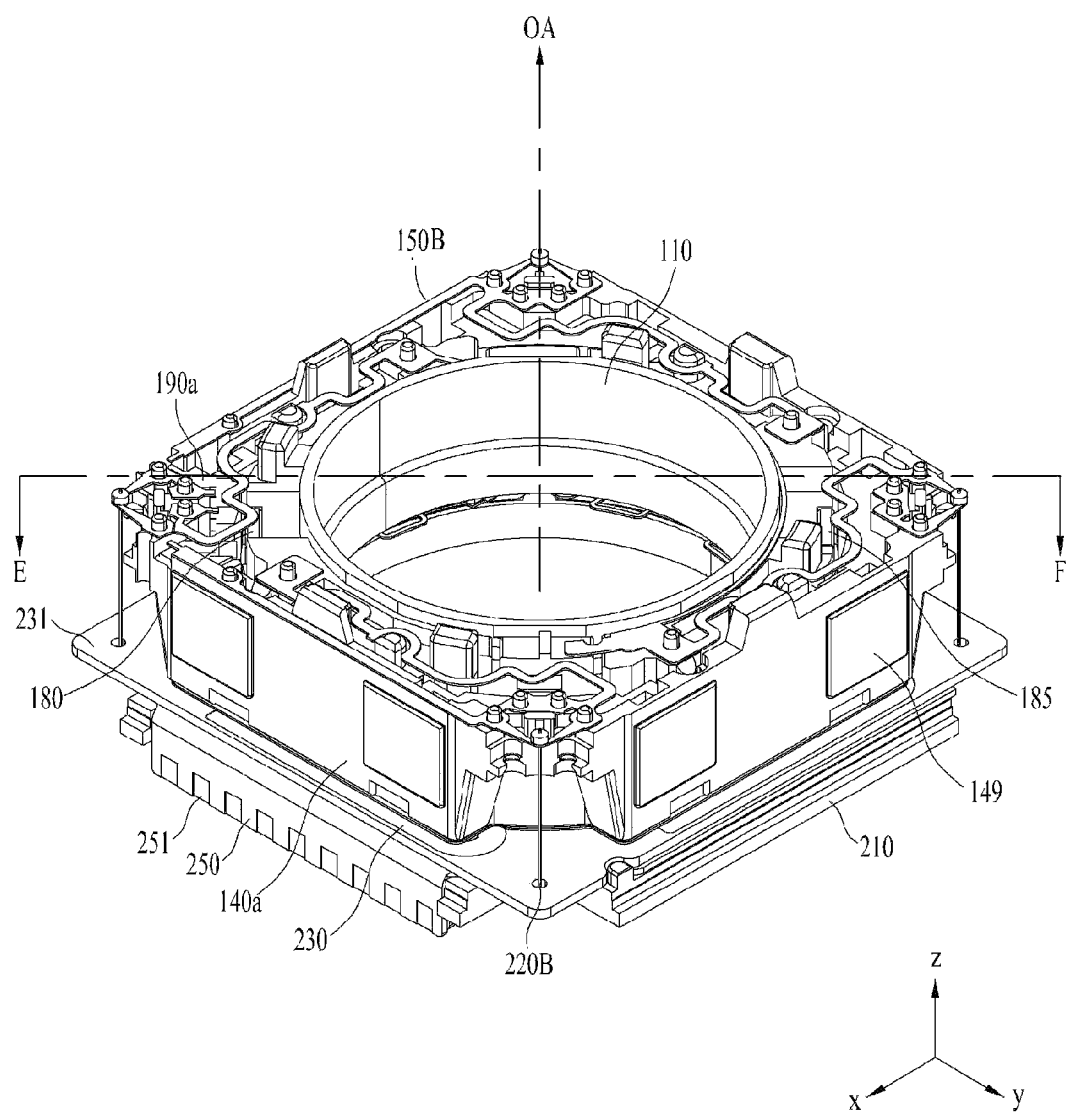
FIG. 18 is a perspective view of a lens moving apparatus according to another embodiment.
Figure 19:
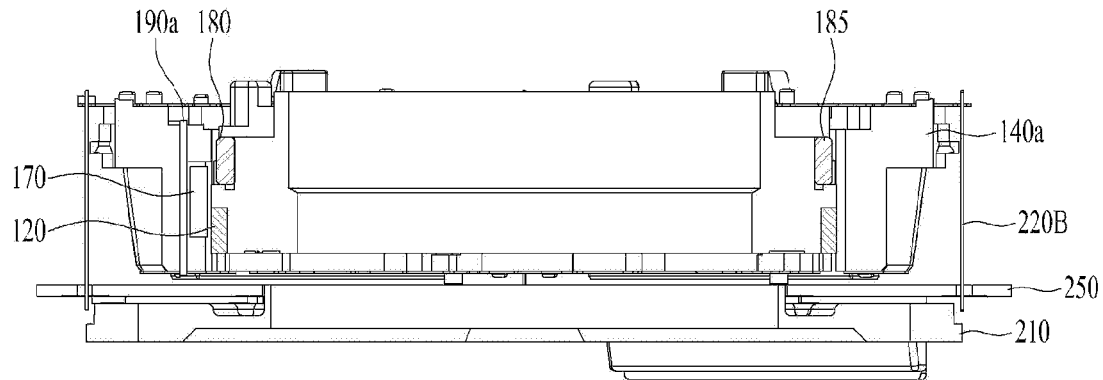
FIG. 19 is a cross-sectional view of a lens moving apparatus of FIG. 18 in direction EF.
Figure 20A:
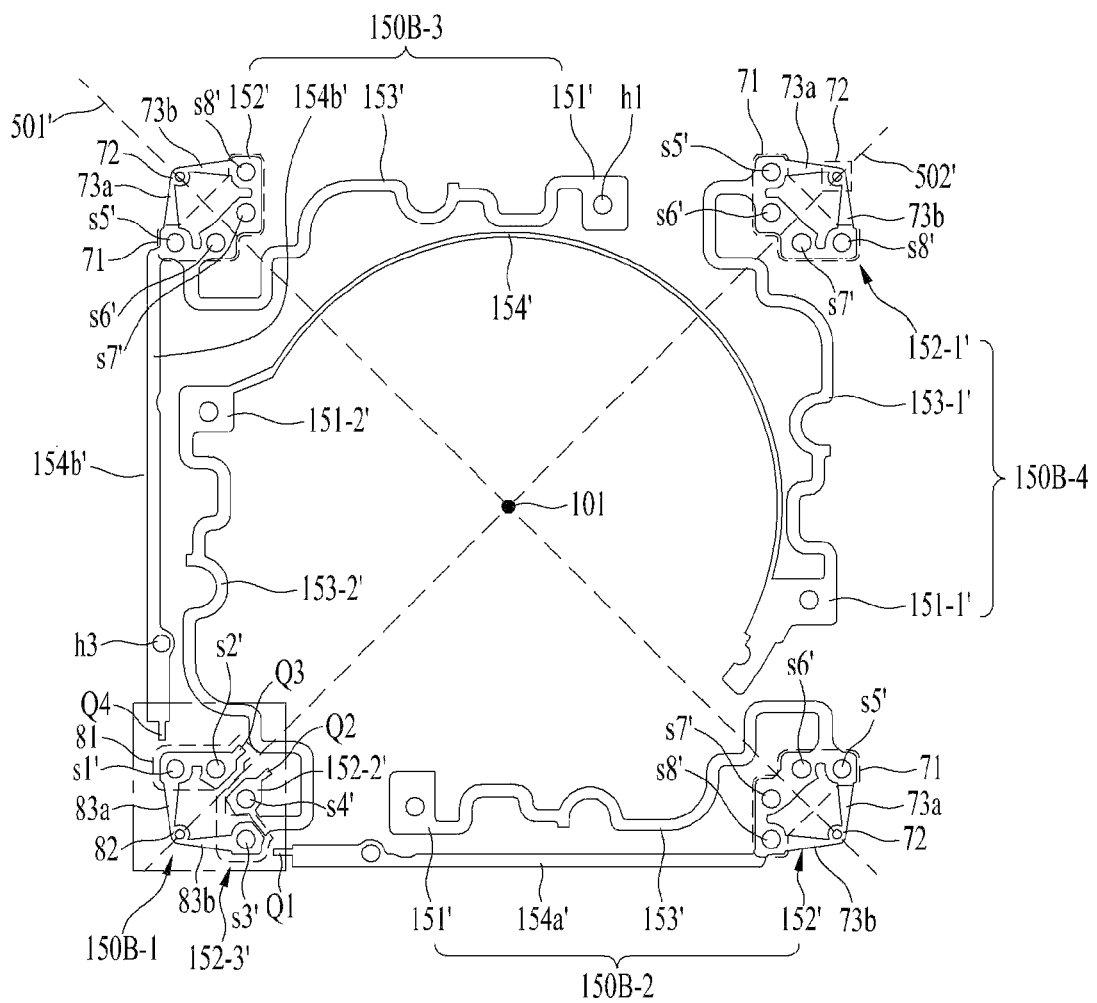
FIG. 20A illustrates an upper elastic member shown in FIG. 18.
Figure 20B:
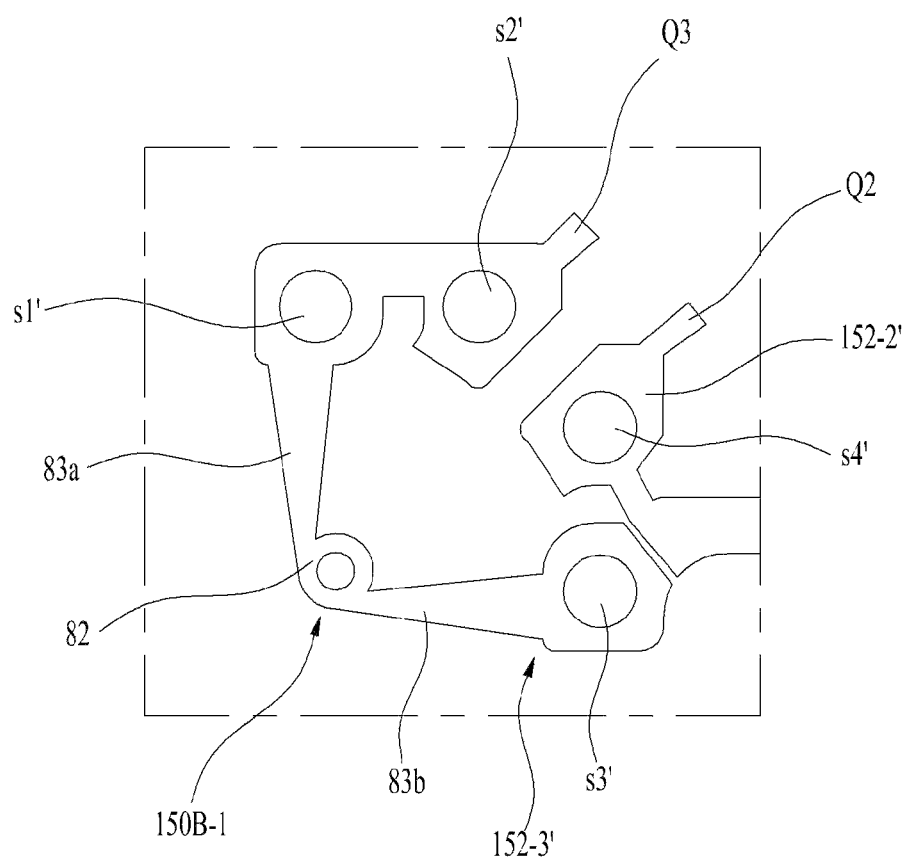
FIG. 20B is an enlarged view of a portion of FIG. 20A.
Figure 21:
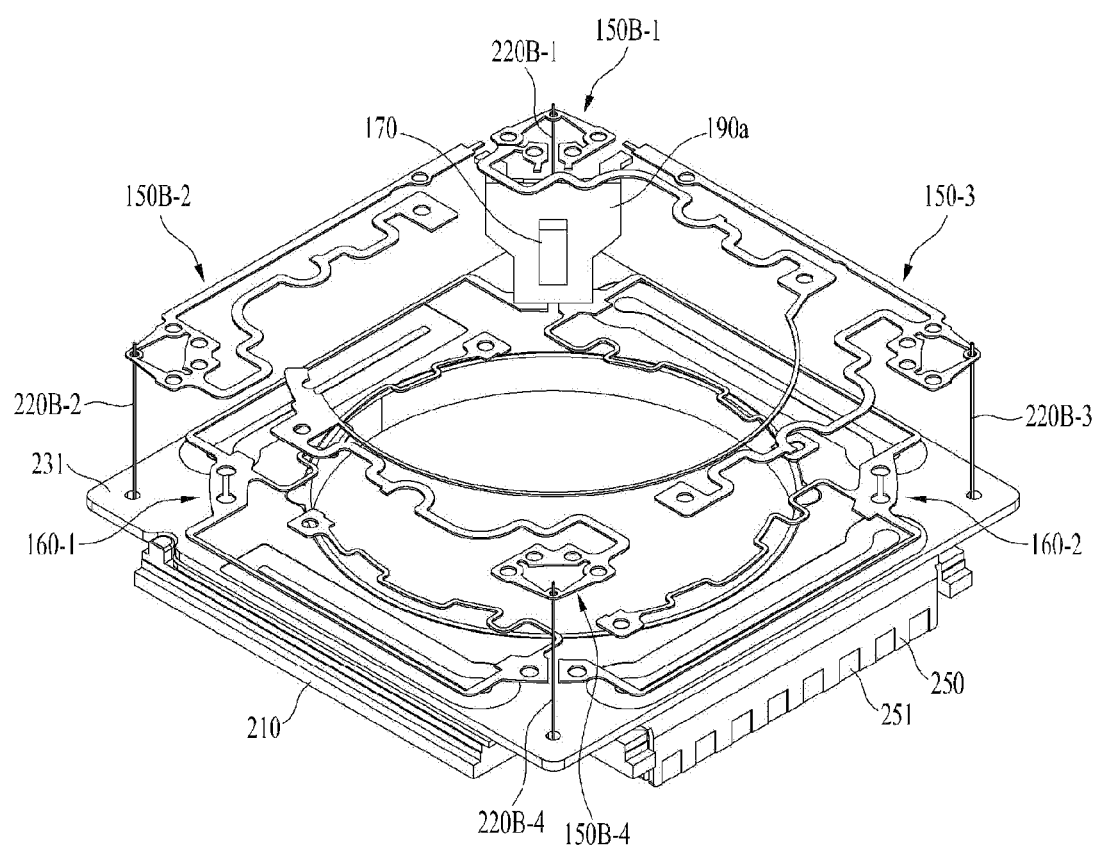
FIG. 21 illustrates a coupling relationship of an upper elastic member, a first circuit board, and supporting members shown in FIG. 18.

FIG. 18 is a perspective view of a lens moving apparatus 100-2 according to another embodiment. FIG. 19 is a cross-sectional view of the lens moving apparatus 100-2 of FIG. 18 in direction EF. FIG. 20A illustrates the upper elastic member 150A shown in FIG. 18. FIG. 20B is an enlarged view of a portion of FIG. 20A. FIG. 21 illustrates a coupling relationship of the upper elastic member, the first circuit board 190a, and supporting members shown in FIG. 18.

The lens moving apparatus 100-2 may include the bobbin 110, the first coil 120, the first magnet 130, the housing 140a, an upper elastic member 150B, the lower elastic member 160A, the first position sensor 170, the second magnet 180, the first circuit board 190a, and the supporting member 220A.

The lens moving apparatus 100-2 may further include the third magnet 185, the second coil 230, the second position sensor 240, the second circuit board 250, the base 210, and the cover member 300.

Except for the upper elastic member 150B and the supporting member 220A shown in FIG. 18, the same description of the embodiment shown in FIG. 12 may be applied to the remaining components of the lens moving apparatus 100-2 in the same way.

Referring to FIG. 20A, the upper elastic member 150B may include upper springs 150B-1 to 150B-4 that are electrically separated from each other.

For example, each of the four upper springs 150B-1 to 150B-4 may be disposed at a corresponding one of four corner portions of the housing 140a, and one end of the upper spring 150B-4 disposed at the fourth corner portion of the housing 140a may be disposed at the first corner portion of the housing 140 and may be coupled to the first corner portion.

The first circuit board 190a may be disposed at the first corner portion of the housing 140a, and the fourth corner portion of the housing 140a may diagonally face the first corner portion.

Each of the upper springs 150B-1 to 150B-4 may be bonded directly to a corresponding one of the first to fourth pads 5a to 5d of the first circuit board 190a disposed at the first corner portion of the housing 140a and may be electrically connected thereto.

Each of the first to fourth upper springs 150B-1 to 150B-4 may include an external frame coupled to the housing 140a (e.g., corner portions). An external frame of each of the first to fourth upper springs 150B-1 to 150B-4 may include a first coupling portion coupled to a corresponding one of the first to fourth corner portions of the housing 140a, a second coupling portion coupled to a corresponding one of first to fourth supporting members 220B-1 to 220B-4, and at least one connecting portion for connecting the first and second coupling portions to each other.

The first upper spring 150B-1 may include a first external frame 152-3' coupled to the first corner portion of the housing 140a.

The first external frame 152-3' of the first upper spring 150B-1 may include a first coupling portion 81 including coupling regions S1' to S3' coupled to the first corner portion of the housing 140a, a second coupling portion 82 coupled to a corresponding one (e.g., 220B-1) of the first to fourth supporting members 220B-1 to 220B-4, a first connecting portion 83a for connecting any one (e.g., S1') of the coupling regions S1' to S3' of the first coupling portion 81, and a second connecting portion 83b for connecting another one (e.g., S3') of the coupling regions S1' to S3' of the first coupling portion 81 to the second coupling portion 82.

For example, the coupling regions S1' to S3' of the first coupling portion 81 of the first upper spring 150B-1 may be spaced apart from each other and may be configured in the form of a through hole coupled to the upper support protrusion 143 of the housing 140a.

A contact portion Q3 that is connected or bonded to a corresponding one of the first to fourth pads 5a to 5d of first circuit board 190a may be provided on the first coupling portion 81 of the first upper spring 150B-1.

For example, the contact portion Q3 may be positioned adjacently to any one (e.g., S2') of the coupling regions S1' to S3'.

For example, the contact portion Q3 may extend or protrude from one end of a first external frame on which a coupling region is provided and may be bonded to the pad 5c of the first circuit board 190a via soldering or a conductive adhesive member.

Each of the second and third upper springs 150B-2 and 150B-3 may include a first internal frame 151' coupled to the bobbin 110, a first external frame 152' coupled to a corresponding one of the second and third corner portions of the housing 140a, and a first frame connecting portion 153' for connecting the first internal frame 151' and the first external frame 152'.

The first external frame 152' of each of the second and third upper springs 150B-2 and 150B-3 may include a first coupling portion 71 including coupling regions S5' to S8' coupled to a corresponding one of second and third corner portions of the housing 140a, a second coupling portion 72 coupled to a corresponding one (e.g., 220B-2 and 220B-3) of the first to fourth supporting members 220B-1 to 220B-4, and connecting portions 73a and 73b for connecting the first coupling portion 71 and the second coupling portion 72.

For example, the connecting portions 73a and 73b may include a first connecting portion 73a for connecting any one (e.g., S5') of the coupling regions S5' to S8' and the second coupling portion 72, and a second connecting portion 73b for connecting another one of the coupling regions S5' to S8' and the second coupling portion 72.

For example, the coupling regions S5' to S8' of the first coupling portion 71 of each of the second and third upper springs 150B-2 and 150B-3 may be spaced apart from each other and may be configured in the form of a through hole coupled to the upper support protrusion 143 of the housing 140a. The second coupling portions 72 and 72 of each of the first to fourth upper springs may be configured in the form of a through hole coupled to the supporting members 220B-1 to 220B-4, but embodiments are not limited thereto.

Each of the second and third upper springs 150B-2 and 150B-3 may further include upper extension frames 154a' and 154b' that are connected to any one (e.g., S5' or S8') of the coupling regions S5' to S8' of the first coupling portion 71 of the first external frame 152' and extend toward the first corner portion of the housing 140a, for bonding with the pads 5a and 5d of the first circuit board 190a.

The upper extension frames 154a' and 154b' are connected to any one (e.g., S5' or S8') of the coupling regions S5' to S8' of the first coupling portion 71, thereby enhancing supporting force by the housing 140a and inhibiting the upper extension frames 154a' and 154b' from being cut. The through hole h3 provided in the upper extension frames 154a' and 154b' shown in FIG. 20A may also be provided to enhance coupling force and supporting force with the housing 140a.

Contact portions Q1 and Q4 that are connected or bonded to a corresponding one of the first to fourth pads 5a to 5d of the first circuit board 190a may be provided on one end of the upper extension frames 154a' and 154b'.

The contact portions Q1 and Q4 may extend or protrudes from one end of the upper extension frames 154a' and 154b' and may be bonded to the pads 5a and 5d of the first circuit board 190a via soldering or a conductive adhesive member.

The fourth upper spring 150B-4 may include first internal frames 151-1' and 151-2' coupled to the bobbin 110, the first external frames 152-1' and 152-2' coupled to the housing 140a, first frame connecting portions 153-1' and 153-2' for connecting the first internal frames 151-1' and 151-2' and the first external frames 152-1' and 152-2', and a connecting frame 154' for connecting the first internal frames 151-1' and 151-2' to each other.

In FIG. 20A illustrates an example in which the fourth upper spring 150B-4 includes two first internal frames, two first external frames, and one connecting frame, but embodiments are not limited thereto, and according to another embodiments, the number of each of the first internal frames and the first external frames may be three or more and the number of connecting frames may be two or more.

Any one (e.g., 152-2') of the two first external frames of the fourth upper spring 150B-4 may be disposed at the first corner portion of the housing 140a, and another one (e.g., 152-1') may be disposed at the fourth corner portion of the housing 140a and may be spaced apart from each other.

Two first internal frames of the fourth upper spring 150B-4 may be spaced apart from each other and may be disposed on the two first side portions 110b-1 of the bobbin 110, which face each other.

For example, the two first internal frames 151-1' and 151-2' of the fourth upper spring 150B-4 may be disposed on the first side portions 110b-1 of the bobbin 110, which correspond to the two facing first side portions 141 of the housing 140a.

For example, the first internal frame 151-1' may be disposed on a first side portion of the bobbin 110, which is adjacent to a second corner portion of the housing 140a, and the first internal frame 151-2' may be disposed on a first side portion of the bobbin 110, which is adjacent to a third corner portion of the housing 140a.

For example, the first frame connecting portion 153-1' may connect the first external frame 152-1' of the fourth upper spring 150B-4 positioned at the fourth corner portion to the first internal frame 151-1' adjacent to the second corner portion.

The first frame connecting portion 153-2' may connect the first external frame 152-2' of the fourth upper spring 150B-4 positioned at the first corner portion to the first internal frame 151-2' adjacent to the third corner portion.

One end of the connecting frame 154' of the fourth upper spring 150B-4 may be connected to the first internal frame 151-1', and the other end of the connecting frame 154' may be connected to the first internal frame 151-2'.

The connecting frame 154' of the fourth upper spring 150B-4 may be configured in the form of a curve that surrounds at least a portion of the external surface 110b of the bobbin 110 in order to inhibit spatial interference with the bobbin 110.

For example, the connecting frame 154' of the fourth upper spring 150B-4 may be configured in the form of a curve that surrounds at least a portion of an upper side of the external surface 110*b* of the bobbin 110.

For example, the connecting frame 154' of the fourth upper spring 150B-4 may be configured in the form of a curve that is convex in a direction toward the fourth corner portion based on a reference line 502', but embodiments are not limited thereto.

For example, the connecting frame 154' of the fourth upper spring 150B-4 may be configured in the form of a curve that extends in a right direction of a reference line 501'.

For example, the reference line 501' may be a straight line that passes through the central point 101 and the second coupling portions 72 of the second and third upper springs 150B-2 and 150B-3, and the reference line 502' may be a straight line that passes through the central point 101 and the second coupling portions 72 and 82 of the first and fourth upper frames 150B-1 and 150B-4, but embodiments are not limited thereto, and the reference lines 501' and 502' may be defined as the reference lines 501 and 502 of FIG. 9A.

The description of the first external spring 152-1' of the second and third upper springs 150B-2 and 150B-3 may be applied to the first external frame 152-1' of the fourth upper spring 150B-4.

The first external frame 152-2' of the fourth upper spring 150B-4 may be spaced apart from the first external frame 152-3' of the first upper spring 150B-1 and may include a first coupling portion including a coupling region S4' coupled to the first corner portion of the housing 140*a*.

The coupling region S4' of the first external frame 152-2' of the fourth upper spring 150B-4 may be disposed between the coupling regions S2' and S3' of the first coupling portion 81 of the first upper spring 150B-1, but embodiments are not limited thereto.

A contact portion Q2 that is connected or bonded to a corresponding one of the first to fourth pads 5*a* to 5*d* of the first circuit board 190*a* may be provided on one end of the first coupling portion of the first external frame 152-3' of the fourth upper spring 150B-4.

The contact portion Q2 may extend or protrude from one end of the first external frame 152-2' of the fourth upper spring 150B-4 and may be boned to the pad 5*b* of the first circuit board 190*a* via soldering or a conductive adhesive member.

The first external frames 152' and 152-1' of the second and third upper springs 150B-2 and 150B-3 may be symmetric in right and left directions based on the reference lines 501' and 502'.

An overall shape of the first external frame 152-2' of the first external frame 152-3' and the fourth upper spring 150B-4 of the first upper spring 150B-1 disposed at the first corner portion of the housing 140*a* may be symmetric in right and left directions based on the reference line 502'. Accordingly, the supporting members 220B-1 to 220B-4 may counterbalance and support the housing 140*a* without inclination to one side.

The width of each of the first and second connecting portions 83*a* and 83*b*, and 73*a* and 73*b* may be reduced in a direction toward the second coupling portions 82 and 72 from the first coupling portions 81 and 71. Accordingly, each of the first and second connecting portions 83*a* and 83*b*, and 73*a* and 73*b* may be easily moved in the optical axis direction, and an effect of dispersing stress applied to the upper elastic member 150B and stress applied to the supporting member 220B may be improved.

The supporting member 220B may include the first to fourth supporting members 220B-1 to 220B-4 disposed at the corner portions of the housing 140*a*.

As shown in FIG. 21, each of the first to fourth supporting members 220B-1 to 220B-4 may be disposed at a corresponding one of the first to fourth corner portions of the housing 140*a* and may be boned to a corresponding one of first external frames of the first to fourth upper springs 150B-1 to 150B-4.

For example, one end of each of the first to fourth supporting members 220B-1 to 220B-4 may be bonded to the second coupling portions 82 and 72 of the first external frames 152', 152-2', and 152-3 of a corresponding one of the first to fourth upper springs 150B-1 to 150B-4, and the other end may be bonded to the second circuit board 250.

The first to fourth pads 5*a* to 5*d* of the first circuit board 190*a* and four corresponding terminals among terminals of the second circuit board 250 may be electrically connected by the upper springs 150B-1 to 150B-4 and the supporting members 220B-1 to 220B-4.

As described with reference to FIG. 17, the two pads 5*e* and 5*f* of the first circuit board 190*a* may be connected directly to the first and second lower springs 160-1 and 160-2 and may be electrically connected to the first coil 120.

The description of FIGS. 12 to 17 may be applied to data communication between the first position sensor 170 and the second circuit board 250 and provision of a driving signal to the first coil 120 from the first position sensor in the same way.

Compared with the embodiment 100-1 shown in FIG. 12, according to the embodiment 100-2 shown in FIG. 18, the number of supporting members may be reduced, and the size of a lens moving apparatus may be reduced due to reduction in the number of supporting members.

The number of supporting members is reduced, and thus resistance of the supporting members may be reduced to reduce consumption current, and the sensitivity of OIS driving may be enhanced.

The thickness of supporting members may be increased in order to acquire the same elastic force even if the number of supporting members are reduced, and as the thickness of the supporting members is increased, influence of external shocks on the OIS moving part may be reduced.

Figure 22:
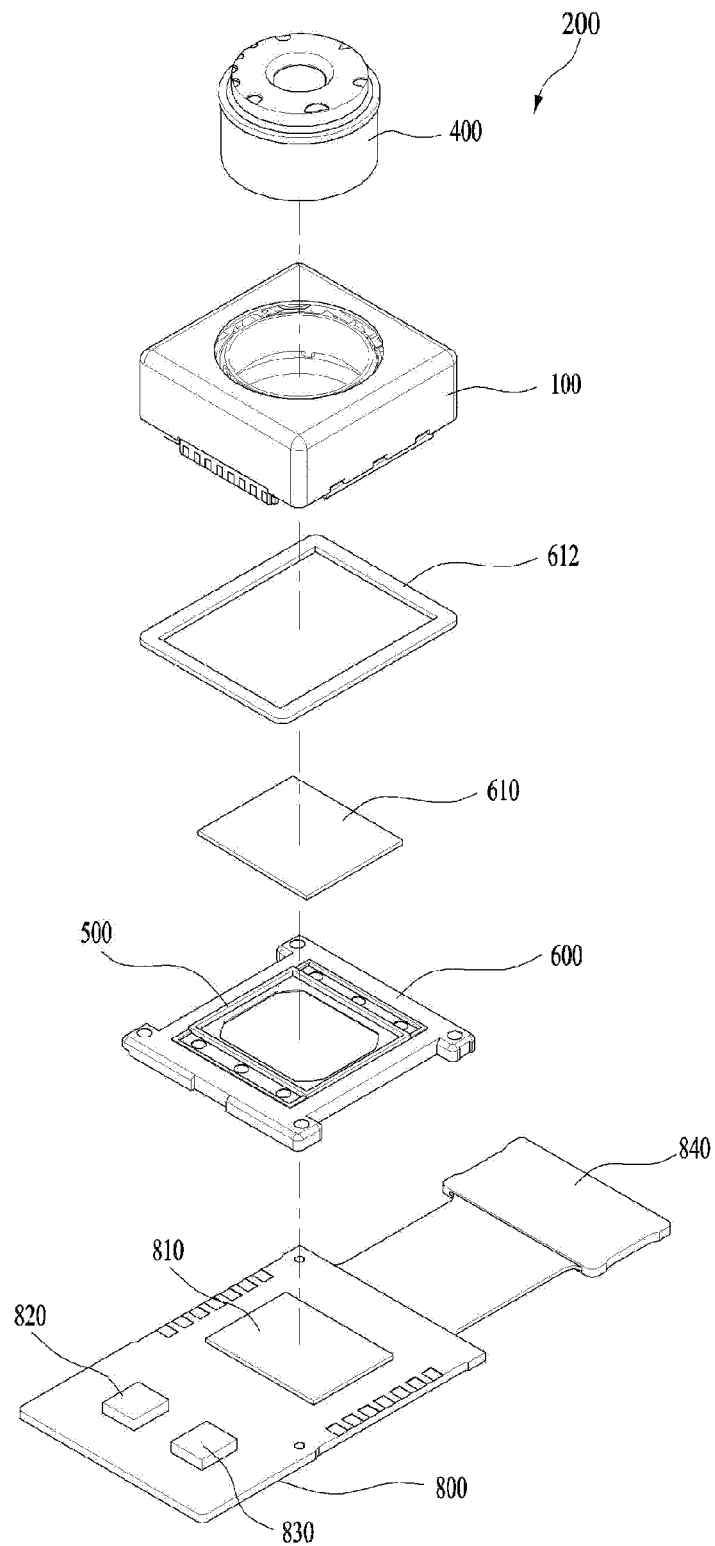
FIG. 22 is an exploded perspective view of a camera module according to an embodiment.

FIG. 22 is an exploded perspective view of the camera module 200 according to an embodiment.

Referring to FIG. 22, the camera module may include a lens barrel 400, the lens moving apparatus 100, an adhesive member 710, the filter 610, a first holder 600, a second holder 800, an image sensor 810, a motion sensor 820, the controller 830, and a connector 840.

The lens barrel 400 may be installed on the bobbin 110 of the lens moving apparatus 100.

The first holder 600 may be disposed below the base 210 of the lens moving apparatus 100. The filter 610 may be installed on the first holder 600, and the first holder 600 may include a protrusion 500 on which the filter 610 is accommodated.

The adhesive member 710 may couple or attach the base 210 of the lens moving apparatus 100 to the first holder 600. The adhesive member 710 may function as the aforementioned adhesives and may also inhibit impurities from being introduced into the lens moving apparatus 100.

For example, the adhesive member 710 may include epoxy, thermosetting adhesives, ultra violet (UV) curable adhesives, or the like.

The filter 610 may inhibit light in a specific frequency band among light transmitted through the lens barrel 400 from being incident on the image sensor 810. The filter 610 may be an infrared ray block filter, but embodiments are not limited thereto. In this case, the filter 610 may be disposed in parallel to the x-y plane.

A hollow may be formed in a portion of the first holder 600, on which the filter 610 is installed, so as to allow light transmitted through the filter 610 to be incident on the image sensor 810.

The second holder 800 may be disposed below the first holder 600, and the image sensor 810 may be installed on the second holder 800. The image sensor 810 may be a portion on which light transmitted through the filter 610 is incident to form an image included in the light.

The second holder 800 may include various circuits, a device, a controller, and the like in order to convert an image formed on the image sensor 810 into an electric signal and to transmit the electric signal to an external apparatus.

The second holder 800 may be embodied as a circuit board on which an image sensor is to be installed and a circuit pattern is to be formed and to which various devices are coupled.

The image sensor 810 may receive an image included in light emitted through the lens moving apparatus 100 and may convert the received image into an electric signal.

The filter 610 and the image sensor 810 may be spaced apart from each other to face each other in the first direction.

The motion sensor 820 may be installed on the second holder 800 and may be electrically connected to the controller 830 through a circuit pattern provided on the second holder 800.

The motion sensor 820 may output rotational angular velocity information based on movement of the camera module 200. The motion sensor 820 may be embodied as a 2-axis or 3-axis gyro sensor or an angular velocity sensor.

The controller 830 may be installed on the second holder 800 and may be electrically connected to the second position sensor 240 and the second coil 230 of the lens moving apparatus 100. For example, the second holder 800 may be electrically connected to the second circuit board 250 of the lens moving apparatus 100, and the controller 830 installed on the second holder 800 may be electrically connected to the second position sensor 240 and the second coil 230 through the second circuit board 250.

The controller 830 may output a driving signal for performing hand shake correction on the OIS moving part of the lens moving apparatus 100 based on output signals provided from the second position sensor 240 of the lens moving apparatus 100.

For example, the controller 830 may provide driving signals IS1 to IS4, or a driving signal DS and control signals C1 to C4, for driving first coils 120-1 to 120-4, to the second circuit board 250.

The connector 840 may be electrically connected to the second holder 800 and may include a port for conductive connection with an external apparatus.

Figure 23:
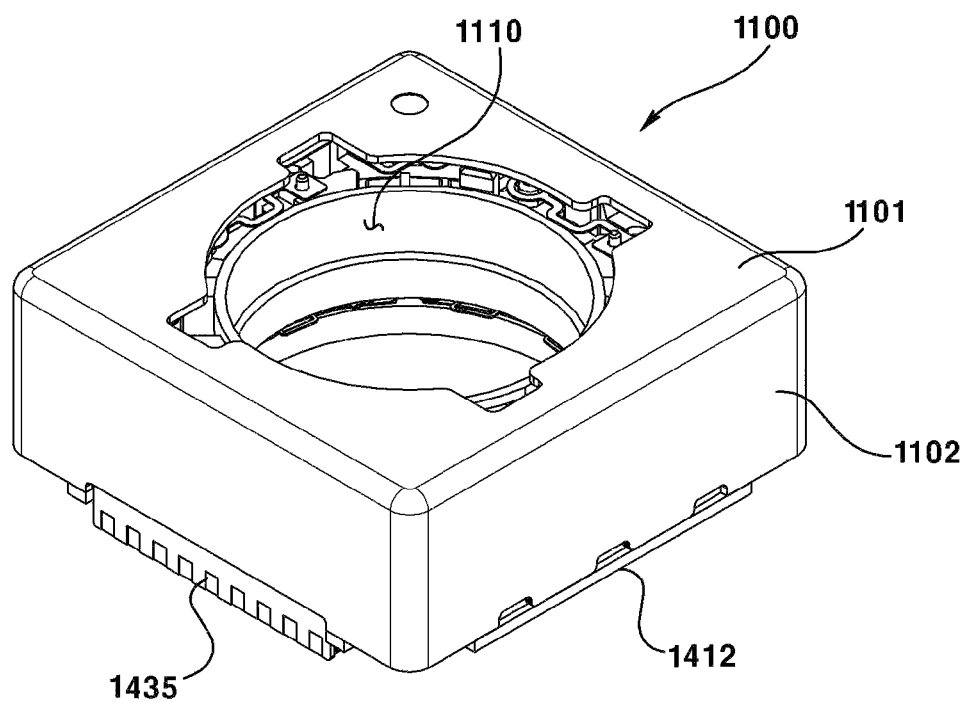
FIG. 23 is a perspective view of a lens moving apparatus according to another embodiment.
Figure 24:
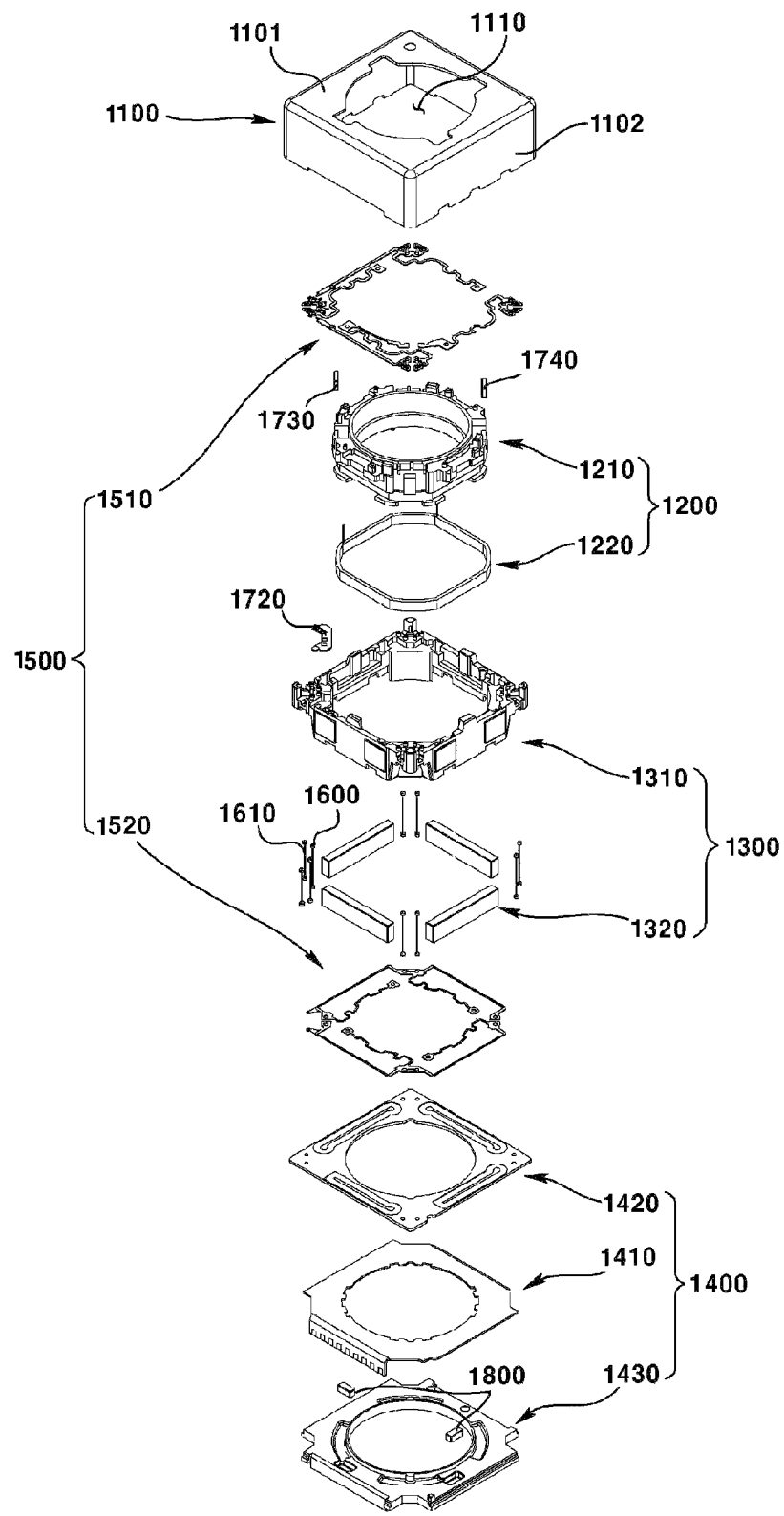
FIG. 24 is an exploded perspective view of a lens moving apparatus of FIG. 23.
Figure 25:
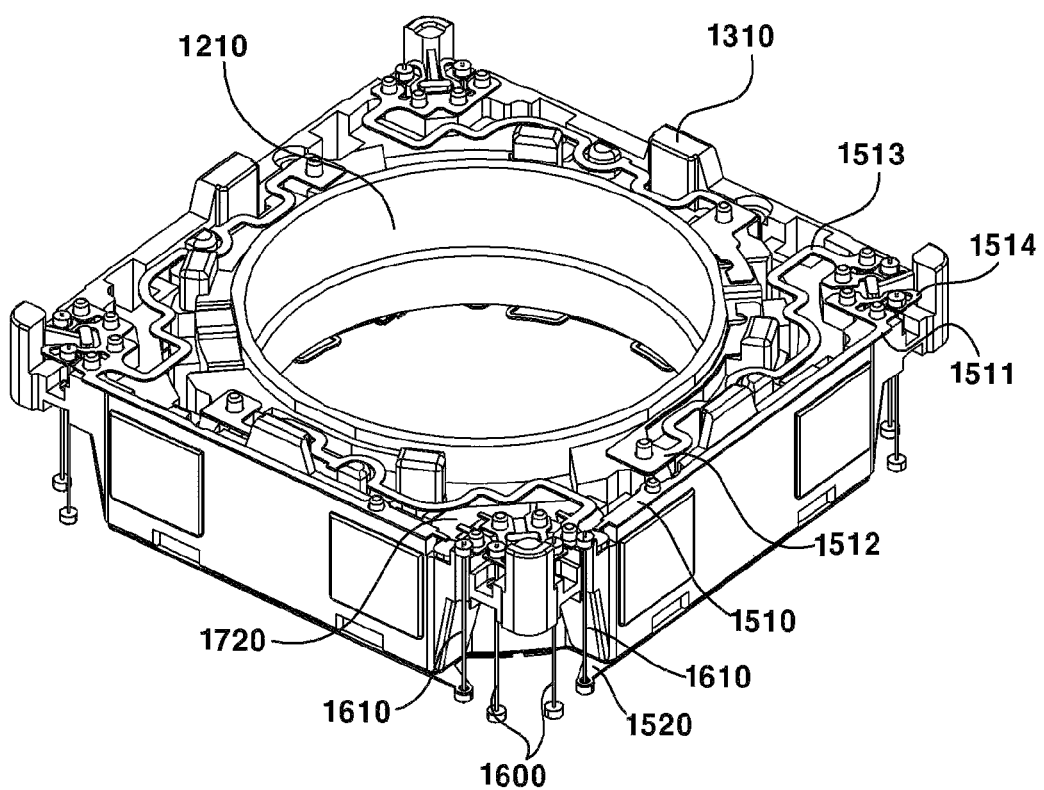
FIGS. 25 and 26 are perspective views of some components of a lens moving apparatus.
Figure 26:
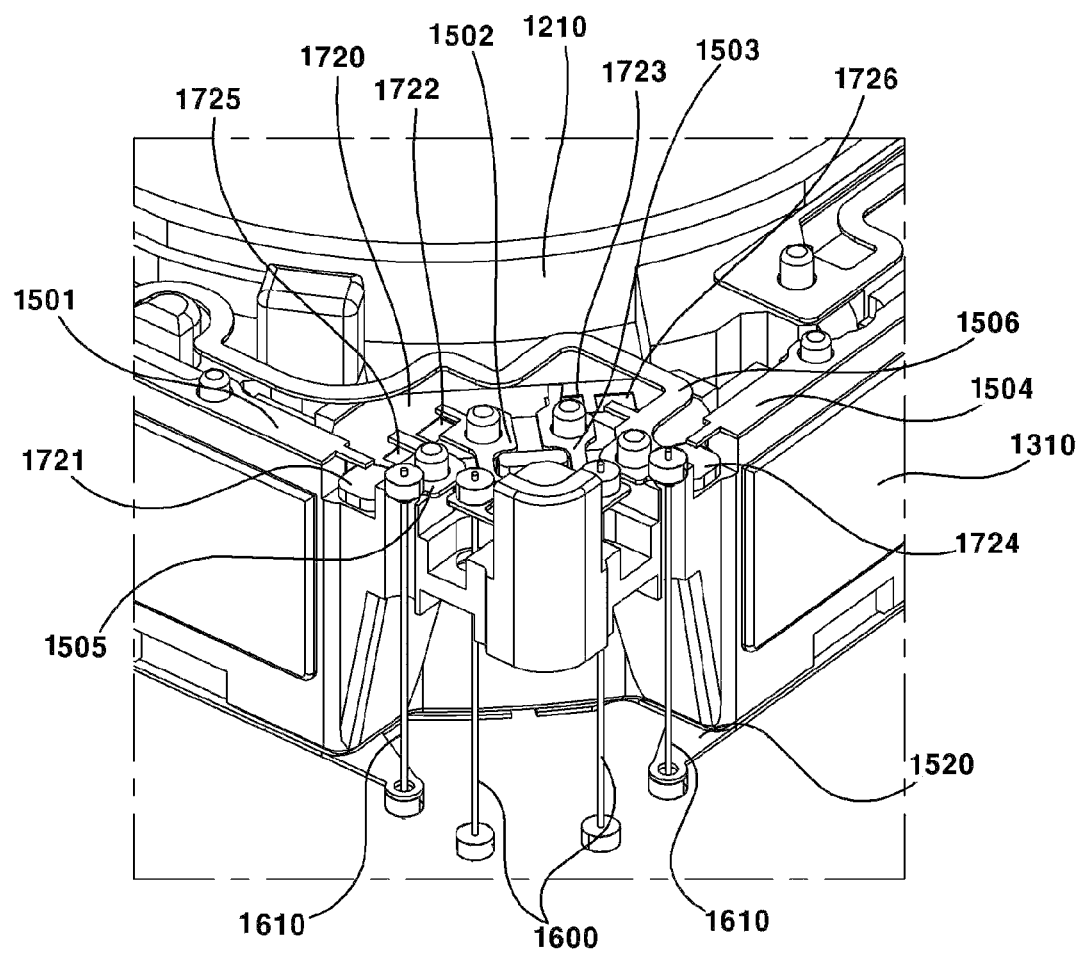
Figure 27:
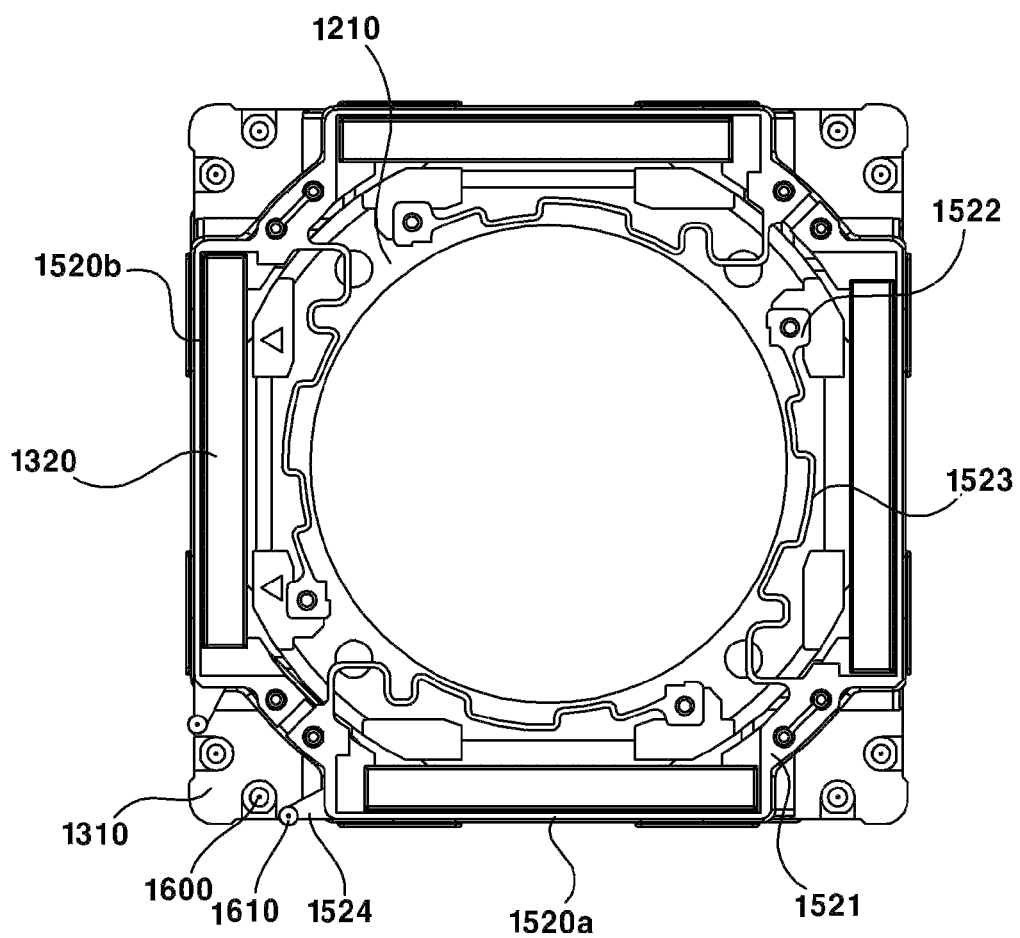
FIG. 27 is a bottom view of some components of a lens moving apparatus.
Figure 28:
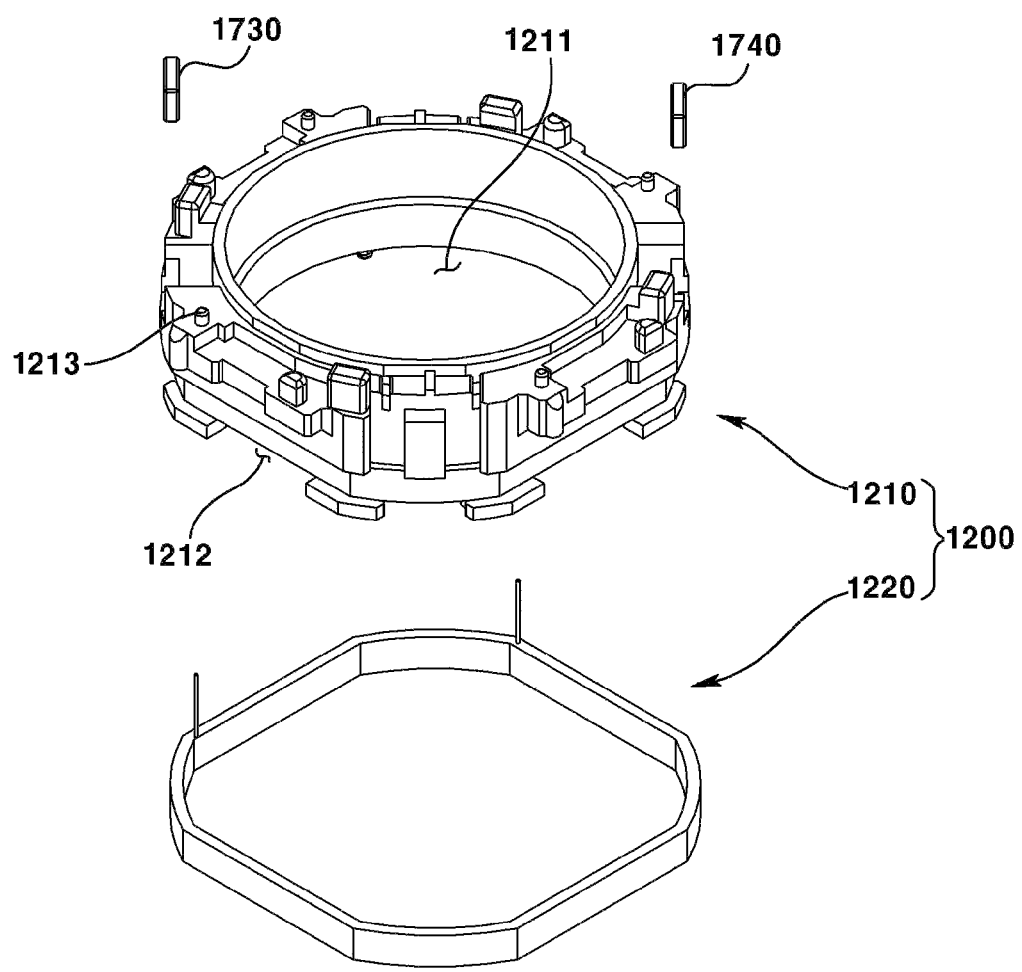
FIGS. 28 to 31 are exploded perspective views of some components of a lens moving apparatus.
Figure 29:
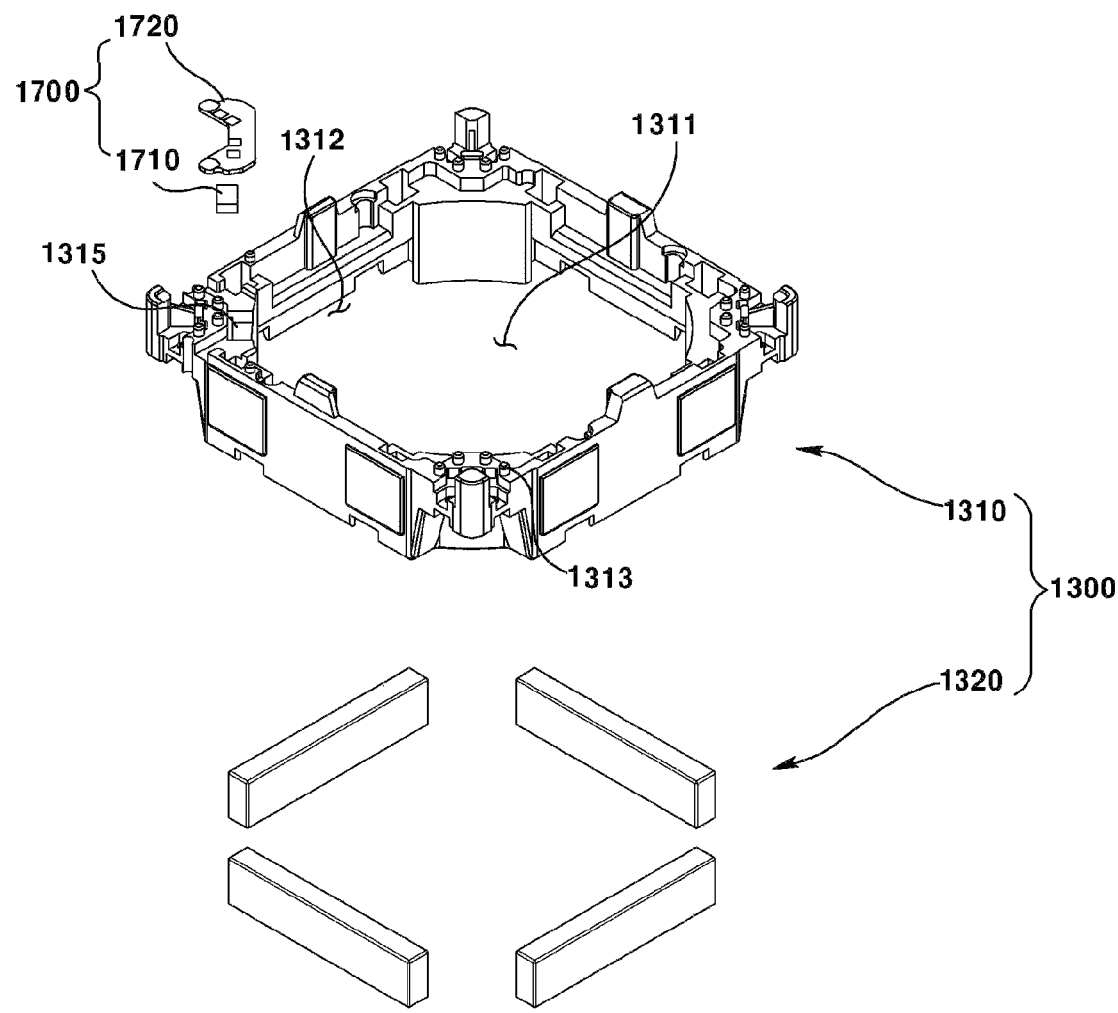
Figure 30:
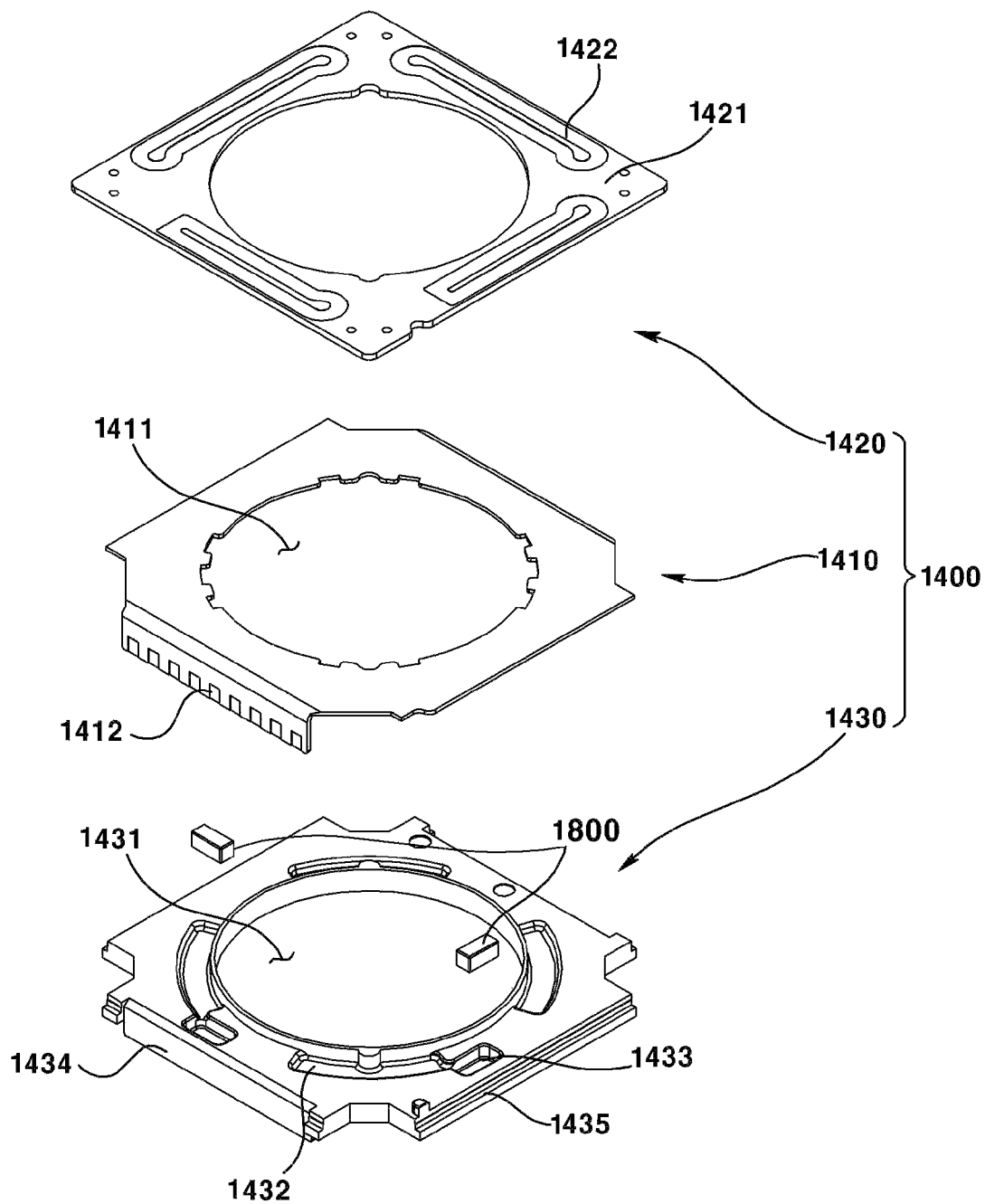

FIG. 23 is a perspective view of a lens moving apparatus 1100 according to another embodiment. FIG. 24 is an exploded perspective view of the lens moving apparatus 1100 of FIG. 23. FIGS. 25 and 26 are perspective views of some components of the lens moving apparatus 1100. FIG. 27 is a bottom view of some components of the lens moving apparatus 1100. FIGS. 28 to 31 are exploded perspective views of some components of the lens moving apparatus 1100. FIG. 32 is a diagram showing a concept of a communication structure of a hall driver IC and a controller 1080 of a camera module according to an embodiment.

The lens moving apparatus 1100 may include a cover member 1100, a first moving part 1200, a second moving part 1300, a stator 1400, a first supporting member 1500, a second supporting member 1600, a first sensor unit 1700, and a second sensor unit 1800. However, any one or more of the cover member 1100, the first moving part 1200, the second moving part 1300, the stator 1400, the first supporting member 1500, the second supporting member 1600, the first sensor unit 1700, and the second sensor unit 1800 may be omitted or modified from the lens moving apparatus 1100. In particular, the first sensor unit 1700 and the second sensor unit 1800 may be a component for auto focus feedback control and hand shake correction feedback control and any one or more may be omitted therefrom.

Figure 34:
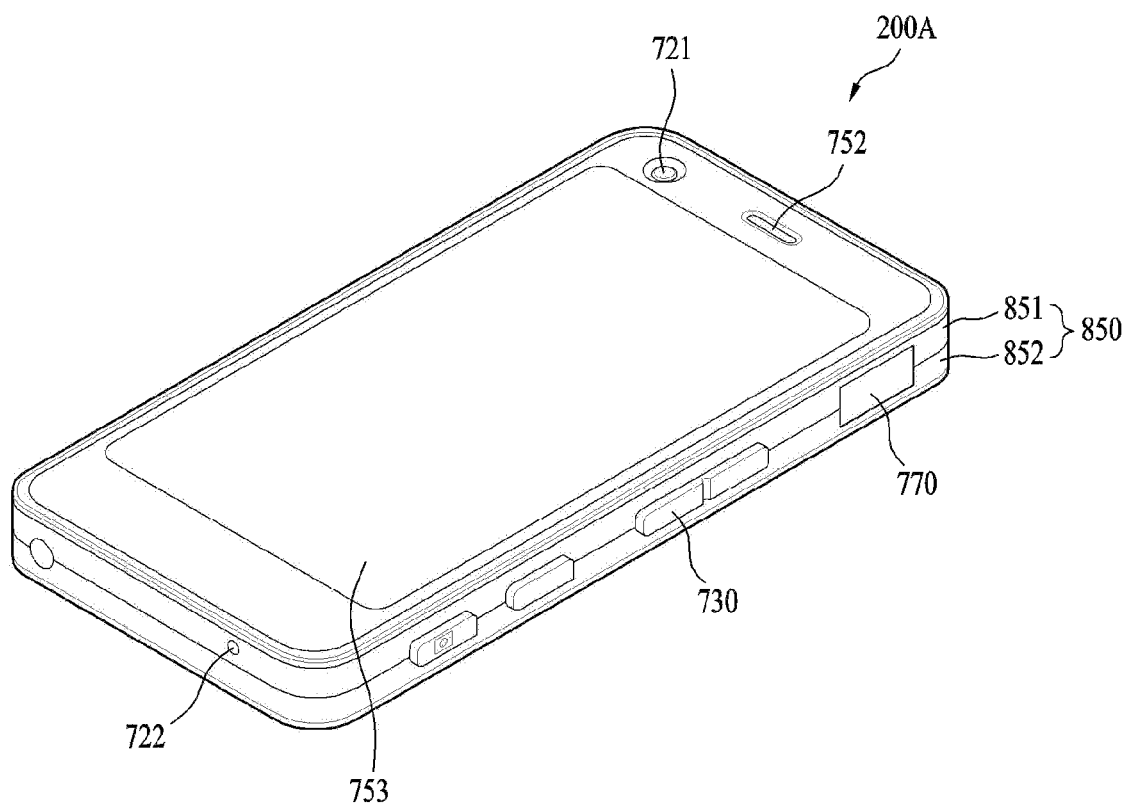
FIG. 34 is a perspective view of a portable terminal 200A according to an embodiment.

Referring to FIG. 34, any one of an AF driving coil 1220, a driving magnet 1320, and an OIS driving coil 1422 may be referred to as a 'first driver', another one may be referred to as a 'second driver', and the other one may be referred to as a 'third driver'. Positions of the AF driving coil 1220, the driving magnet 1320 and the OIS driving coil 1422 may be changed with each other.

Any one of the AF driving coil 1220 and the OIS driving coil 1422 may be referred to as a 'first coil' and the other one may be referred to as a 'second coil'.

Any one of the driving magnet 1320, a sensing magnet 1730, and a compensation magnet 1740 may be referred to as a 'first magnet', another one may be referred to as a 'second magnet', and the other one may be referred to as a 'third magnet'.

The cover member 1100 may form an outer appearance of the lens moving apparatus 1100. The cover member 1100 may be shaped like a hexahedron with an open lower portion. However, the shape of the cover member 1100 is not limited thereto. The cover member 1100 may be a nonmagnetic substance.

When the cover member 1100 is configured as a magnetic substance, the driving magnet 1320, magnetic force of a cover member 1100 may affect any one or more of the sensing magnet 1730 and the compensation magnet 1740.

The cover member 1100 may be formed of a metallic material. In more detail, the cover member 1100 may be formed of a plate-shaped metal material. In this case, the cover member 1100 may shield electromagnetic interference (EMI). Due to such characteristics of the cover member 1100, the cover member 1100 may be referred to as an 'EMI shield can'. The cover member 1100 may inhibit waves generated outside the lens moving apparatus 1100 from being introduced into the cover member 1100.

The cover member 1100 may inhibit waves generated inside the cover member 1100 from being discharged out of the cover member 110.

The cover member 1100 may include an upper plate 1101 and a side plate 1102.

The cover member 1100 may include the upper plate 1101 and the side plate 1102 that extends downward from an outer periphery of the upper plate 1101.

For example, the cover member 1100 may be coupled to a base 1430. A portion of the side plate 1102 of the cover member 1100 may be coupled to the base 1430.

A lower end of the side plate 1102 of the cover member 1100 may be disposed on a stair portion 1435 of the base 1430. The internal surface of the side plate 1102 of the cover member 1100 may directly contact an external side surface of the base 1430. The internal surface of the side plate 1102 of the cover member 1100 may be coupled to the base 1430 via adhesives (not shown). As another example, the cover member 1100 may be coupled directly to an upper surface of a printed circuit board 1010.

The first moving part 1200, the second moving part 1300, the stator 1400, the first supporting member 1500, and the second supporting member 1600 may be disposed in an internal space formed by the cover member 1100 and the base 1430. Through such a configuration, the cover member 1100 may protect internal components from external shocks, and simultaneously may inhibit penetrating of external pollutant.

The cover member 1100 may include an opening 1110.

The opening 1110 may be formed on an upper plate 101 of the cover member 1100. The opening 1110 may expose a lens module upward. The opening 1110 may be formed with a shape corresponding to the lens module. The size of the opening 1110 may be greater than a diameter of the lens module to assemble the lens module through the opening 1110. Light introduced through the opening 1110 may pass through the lens module. In this case, the light passing through the lens module may be converted into an electric signal to acquire an image by the image sensor.

The first moving part 1200 may be coupled to a lens module (however, a lens module may be described as a component of a lens moving apparatus) which is one component of the camera module. The first moving part 1200 may accommodate the lens module therein. An outer periphery surface of a lens module may be coupled to an inner periphery surface of the first moving part 1200.

The first moving part 1200 may be moved through interaction with the second moving part 1300 and/or the stator 1400. In this case, the first moving part 1200 may be moved integrally with the lens module. The first moving part 1200 may be formed for an AF function. In this case, the first moving part 1200 may be referred to as an 'AF moving part'. However, according to the disclosure, the first moving part 1200 is not limited to a member that is moved only for the AF function. The first moving part 1200 may also be moved for a hand shake correction function.

The first moving part 1200 may include a bobbin 1210 and an AF driving coil 1220. However, any one or more of the bobbin 1210 and the AF driving coil 1220 may be omitted or modified from the first moving part 1200.

The bobbin 1210 may be disposed inside a housing 1310. The bobbin 1210 may be disposed in a through hole 1311 of the housing 1310. The bobbin 1210 may be moved in the optical axis direction based on the housing 1310. The bobbin 1210 may be disposed in the through hole 1311 of the housing 1310 to be moved along the optical axis.

The bobbin 1210 may be coupled to the lens module. An outer periphery surface of the lens module may be coupled to the inner periphery surface of the bobbin 1210. The AF driving coil 1220 may be coupled to the bobbin 1210. The AF driving coil 1220 may be coupled to an external surface of the bobbin 1210. A lower portion of the bobbin 1210 may be coupled to a lower supporting member 1520. An upper portion of the bobbin 1210 may be coupled to an upper supporting member 1510.

The bobbin 1210 may include a through hole 1211, a driver coupling portion 1212, an upper coupling portion 1213, and a lower coupling portion (not shown). However, any one or more of the through hole 1211, the driver coupling portion 1212, the upper coupling portion 1213, and the lower coupling portion may be omitted from the bobbin 1210.

The through hole 1211 may be formed inside the bobbin 1210. The through hole 1211 may be formed to be open in up and down directions. The lens module may be coupled to the through hole 1211.

A screw thread corresponding to a screw thread formed on an outer periphery surface of the lens module may be formed on an inner periphery surface of the through hole 1211. That is, the lens module may be screwed to the through hole 1211. Adhesives may be disposed between the lens module and the bobbin 1210. In this case, the adhesives may be epoxy that is cured by any one of ultraviolet rays (UV), heat, and a laser beam.

The AF driving coil 1220 may be coupled to the driver coupling portion 1212. The driver coupling portion 1212 may be formed on an external surface of the bobbin 1210. The driver coupling portion 1212 may be configured in the form of a groove formed by recessing a portion of the external surface of the bobbin 1210 inward. In this case, the driver coupling portion 1212 may accommodate at least a portion of the AF driving coil 1220 therein. The driver coupling portion 1212 may be formed to be integrated into the external surface of the bobbin 1210. For example, the driver coupling portion 1212 may be continuously formed along the external surface of the bobbin 1210. In this case, the AF driving coil 1220 may be wound around the driver coupling portion 1212.

As another example, the plurality of driver coupling portions 1212 may be configured to be spaced apart from each other. In this case, the plurality of AF driving coils 1220 may be configured to each be coupled to the driver coupling portion 1212. As another example, the driver coupling portion 1212 may be open upward or downward. In this case, the AF driving coil 1220 may be inserted into and coupled to the driver coupling portion 1212 through an open portion while being pre-wound.

The upper coupling portion 1213 may be coupled to the upper supporting member 1510. The upper coupling portion 1213 may be coupled to a internal portion 1512 inside the upper supporting member 1510. The upper coupling portion 1213 may protrude upward from an upper surface of the bobbin 1210.

For example, the protrusion of the upper coupling portion 1213 may be inserted into and coupled to a groove or a hole of the internal portion 1512 of the upper supporting member 1510. In this case, the protrusion of the upper coupling portion 1213 may be thermally fused while being inserted into the hole of the internal portion 1512 to fix the upper supporting member 1510 between the thermally fused protrusion and the upper surface of the bobbin 1210.

A lower coupling portion may be coupled to the lower supporting member 1520. The lower coupling portion may be coupled to the internal portion 1522 of the lower supporting member 1520. The lower coupling portion may protrude downward from the lower surface of the bobbin 1210. For example, the protrusion of the lower coupling portion may be inserted into and coupled to a groove or a hole of the internal portion 1522 of the lower supporting member 1520. In this case, the protrusion of the lower coupling portion may be thermally fused while being inserted into a hole of the internal portion 1522 to fix the lower supporting member 1520 between the thermally fused protrusion and the lower surface of the bobbin 1210.

The AF driving coil 1220 may be disposed on the bobbin 1210. The AF driving coil 1220 may be disposed on the external surface of the bobbin 1210. The AF driving coil 1220 may be wound around the bobbin 1210. The AF driving coil 1220 may face the driving magnet 1320. In this case, when current is supplied to the AF driving coil 1220 to form a magnetic field around the AF driving coil 1220, the AF driving coil 1220 may be moved with respect to the driving magnet 1320 through electromagnetic interaction between the AF driving coil 1220 and the driving magnet 1320. The AF driving coil 1220 may electromagnetically interact with the driving magnet 1320.

The AF driving coil 1220 may move the bobbin 1210 with respect to the housing 1310 in the optical axis direction through electromagnetic interaction with the driving magnet 1320. For example, the AF driving coil 1220 may be one integrally formed coil. As another example, the AF driving coil 1220 may include a plurality of coils that are spaced apart from each other. The AF driving coil 1220 may include four coils that are spaced apart from each other. In this case, four coils may be disposed on the external surface of the bobbin 1210 to form an angle of 90° between two neighboring coils.

The AF driving coil 1220 may include one pair of lead lines for power supply. In this case, the lead lines of one pair of AF driving coils 1220 may be electrically connected to the fifth and sixth upper supporting portions 1505 and 1506 that are components included in the upper supporting member 1510.

That is, the AF driving coil 1220 may receive power through the upper supporting member 1510. In more detail, the AF driving coil 1220 may sequentially receive power through a driver 1750, the upper supporting member 1510, a conductive member 1610, and the lower supporting member 1520 of a hall driver IC 1070.

According to the present embodiment, the driver 1750 for controlling current provided to the AF driving coil 1220 may be disposed inside the lens moving apparatus 1100. In more detail, the driver 1750 may be formed to be integrated into a first sensor 1710 and may be disposed as the hall driver IC 1070 in the housing 1310.

The second moving part 1300 may accommodate at least a portion of the first moving part 1200 therein. The second moving part 1300 may move the first moving part 1200 or may be moved along with the first moving part 1200. The second moving part 1300 may be moved via interaction with the stator 1400. The second moving part 1300 may be moved for a hand shake correction function. In this case, the second moving part 1300 may be referred to as an 'OIS moving part'. The second moving part 1300 may be moved integrally with the first moving part 1200 while being moved for the hand shake correction function.

The second moving part 1300 may include the housing 1310 and the driving magnet 1320. However, any one or more of the housing 1310 and the driving magnet 1320 may be omitted or modified from the second moving part 1300.

The housing 1310 may be disposed outside the bobbin 1210. The housing 1310 may accommodate at least a portion of the bobbin 1210 therein. For example, the housing 1310 may include a hexahedron shape. The housing 1310 may include four side surfaces and four corner portions disposed between the four side surfaces.

The driving magnet 1320 may be disposed in the housing 1310. For example, the driving magnet 1320 may be disposed on each of the four side surfaces of the housing 1310. As another example, the driving magnet 1320 may be disposed at each of the four corner portions of the housing 1310. At least a portion of the outer periphery surface of the housing 1310 may be formed with a shape corresponding to the inner periphery surface of the cover member 1100.

In particular, the outer periphery surface of the housing 1310 may be formed with a shape corresponding to the inner periphery surface of the side plate 1102 of the cover member 1100. The housing 1310 may be formed of an insulating material. The housing 1310 may be formed of a different material from the cover member 1100. The housing 1310 may be formed using a mold in consideration of productivity. An external side surface of the housing 1310 may be spaced apart from an internal side surface of the side plate 1102 of the cover member 1100. The housing 1310A may be moved for OIS driving in a space between the housing 1310 and the cover member 1100. The upper supporting member 1510 may be coupled to an upper portion of the housing 1310. The lower supporting member 1520 may be coupled to a lower portion of the housing 1310.

The housing 1310 may include the through hole 1311, a driver coupling portion 1312, an upper coupling portion 1313, a lower coupling portion (not shown), and a sensor coupling portion 1315. However, any one or more of the through hole 1311, the driver coupling portion 1312, the upper coupling portion 1313, the lower coupling portion, and the sensor coupling portion 1315 may be omitted or modified from the housing 1310.

The through hole 1311 may be formed in the housing 1310. The through hole 1311 may be formed inside the housing 1310. The through hole 1311 may be formed to penetrate the housing 1310 in up and down directions. The bobbin 1210 may be disposed in the through hole 1311. The bobbin 1210 may be disposed in the through hole 1311 to be moveable. At least a portion of the through hole 1311 may be formed with a shape corresponding to the bobbin 1210. The inner periphery surface of the housing 1310 in which the through hole 1311 is formed may be spaced apart from the outer periphery surface of the bobbin 1210. However, a stopper that protrudes inward and instrumentally limits movement of the bobbin 1210 in the optical axis direction may be formed on the inner periphery surface of the housing 1310 in which the through hole 1311 is formed.

The driving magnet 1320 may be coupled to the driver coupling portion 1312. The driver coupling portion 1312 may be formed in the housing 1310. The driver coupling portion 1312 may be formed on the inner periphery surface of the housing 1310. In this case, the driving magnet 1320 disposed on the driver coupling portion 1312 may advantageous to electromagnetic interaction with the AF driving coil 1220 positioned inside the driving magnet 1320.

The driver coupling portion 1312 may be an open lower portion. In this case, the driving magnet 1320 disposed on the driver coupling portion 1312 may be advantageous to electromagnetic interaction with the OIS driving coil 1422 positioned below the driving magnet 1320. The driver coupling portion 1312 may be configured in the form of a groove that is formed by recessing the inner periphery surface of the housing 1310 outward. In this case, the plurality of driver coupling portions 1312 may be configured. Each of the plurality of driver coupling portions 1312 may accommodate the driving magnet 1320 therein.

For example, the driver coupling portion 1312 may be separated into four pieces. The driving magnet 1320 may be disposed on each of the four driver coupling portions 1312. For example, the driver coupling portion 1312 may be formed on a side surface of the housing 1310. As another example, the driver coupling portion 1312 may be formed at a corner portion of the housing 1310.

The upper coupling portion 1313 may be coupled to the upper supporting member 1510. The upper coupling portion 1313 may be coupled to an external portion 1511 of the upper supporting member 1510. The upper coupling portion 1313 may protrude upward from an upper surface of the housing 1310. For example, the protrusion of the upper coupling portion 1313 may inserted into and coupled to a groove or a hole of the external portion 1511 of the upper supporting member 1510. In this case, the protrusion of the upper coupling portion 1313 may be thermally fused while being inserted into the hole of the external portion 1511 to fix the upper supporting member 1510 between the thermally fused protrusion and the upper surface of the housing 1310.

The lower coupling portion may be coupled to the lower supporting member 1520. The lower coupling portion may be coupled to an external portion 1521 of the lower supporting member 1520. The lower coupling portion may protrude downward from the lower surface of the housing 1310. For example, the protrusion of the lower coupling portion may be inserted into and coupled to a groove or hole of the external portion 1521 of the lower supporting member 1520. In this case, the protrusion of the lower coupling portion may be thermally fused while being inserted into a hole of the external portion 1521 to fix the lower supporting member 1520 between the thermally fused protrusion and the lower surface of the housing 1310.

At least a portion of the first sensor unit 1700 may be disposed on the sensor coupling portion 1315. For example, the first sensor 1710 may be disposed on the sensor coupling portion 1315. The sensor coupling portion 1315 may be formed in the housing 1310. The sensor coupling portion 1315 may be formed in the form of a groove that is formed by recessing a portion of an upper surface of the housing 1310 downward. In this case, the sensor coupling portion 1315 may accommodate at least a portion of the first sensor 1710. At least a portion of the sensor coupling portion 1315 may be formed with a shape corresponding to the first sensor 1710.

The driving magnet 1320 may be disposed in the housing 1310. The driving magnet 1320 may be disposed outside the AF driving coil 1220. The driving magnet 1320 may face the AF driving coil 1220.

The driving magnet 1320 may electromagnetically interact with the AF driving coil 1220. The driving magnet 1320 may be disposed above the OIS driving coil 1422. The driving magnet 1320 may face the OIS driving coil 1422. The driving magnet 1320 may electromagnetically interact with the OIS driving coil 1422. The driving magnet 1320 may be commonly used in an auto focus function and a hand shake inhibition function. However, the driving magnet 1320 may include a plurality of magnets that are separately used in the auto focus function and the hand shake inhibition function. For example, the driving magnet 1320 may be disposed on a side surface of the housing 1310. In this case, the driving magnet 1320 may be a flat magnet. The driving magnet 1320 may have a flat plate shape. As another example, the driving magnet 1320 may be disposed at a corner portion of the housing 1310. In this case, the driving magnet 1320 may be a corner magnet. The driving magnet 1320 may be shaped like a hexahedron with a wider internal side surface than an external side surface.

The driving magnet 1320 may include a plurality of magnets that are spaced apart from each other. The driving magnet 1320 may include four magnets that are spaced apart from each other. In this case, the four magnets may be disposed in the housing 1310 to form an angle of 90° between two neighboring magnets.

That is, the driving magnets 1320 may be disposed on four side surfaces of the housing 1310 at equidistant intervals. In this case, an internal volume of the housing 1310 may be effectively used. In addition, the driving magnet 1320 may be adhered to the housing 1310 by adhesives.

The stator 1400 may be disposed below the housing 1310. The stator 1400 may be disposed below the second moving part 1300. The stator 1400 may face the second moving part 1300. The stator 1400 may moveably support the second moving part 1300. The stator 1400 may move the second moving part 1300. In this case, the first moving part 1200 may also be moved along with the second moving part 1300.

The stator 1400 may include a board 1410, a circuit member 1420, and the base 1430. However, any one or more of the board 1410, the circuit member 1420, and the base 1430 may be omitted or modified from the stator 1400.

The board 1410 may supply power to the circuit member 1420. The board 1410 may be coupled to the circuit member 1420. The board 1410 may be coupled to the printed circuit board 1010 disposed below the base 1430. The board 1410 may be disposed on a lower surface of the circuit member 1420. The board 1410 may be disposed on an upper surface of the base 1430. The board 1410 may be disposed between the circuit member 1420 and the base 1430.

The board 1410 may include a flexible printed circuit board (FPCB). The board 1410 may be partially bent. The board 1410 may supply power to the hall driver IC 1070. For example, the board 1410 may supply power to the hall driver IC 1070 through the second supporting member 1600 and the upper supporting member 1510. In addition, power supplied to the hall driver IC 1070 may be used to drive the first sensor 1710 and the driver 1750.

The board 1410 may include an opening 1411 and a stair portion 1412. However, any one or more of the opening 1411 and the stair portion 1412 may be omitted or modified from the board 1410.

The opening 1411 may be formed on the board 1410. The opening 1411 may be formed on a central portion of the board 1410. The opening 1411 may be formed to penetrate the board 1410. The opening 1411 may pass light transmitted through the lens module. The opening 1411 may be formed like a circle. However, the shape of the opening 1411 is not limited thereto.

The stair portion 1412 may be formed on the board 1410. The stair portion 1412 may be formed by bending a portion of the board 1410 downward. At least a portion of the stair portion 1412 may be exposed to the outside. The stair portion 1412 may be coupled to the printed circuit board 1010 disposed below the base 1430 via soldering. A lower end of the stair portion 1412 may directly contact the printed circuit board 1010. The stair portion 1412 may be disposed on a terminal coupling portion 1434 of the base 1430.

The circuit member 1420 may be disposed on the base 1430. The circuit member 1420 may be disposed on the board 1410. The circuit member 1420 may be disposed on an upper surface of the board 1410. The circuit member 1420 may be disposed below the driving magnet 1320. The circuit member 1420 may be disposed between the driving magnet 1320 and the base 1430. The second supporting member 1600 may be coupled to the circuit member 1420. The circuit member 1420 may moveably support the second moving part 1300.

The circuit member 1420 may include a board portion 1421 and the OIS driving coil 1422. However, any one or more of the board portion 1421 and the OIS driving coil 1422 may be omitted or modified from the circuit member 1420.

The board portion 1421 may be a circuit board. The board portion 1421 may be an FPCB. The OIS driving coil 1422 may be formed to be integrated into the board portion 1421.

The second supporting member 1600 may be coupled to the board portion 1421. A hole penetrated by the second supporting member 1600 may be formed in the board portion 1421. A lower surface of the board portion 1421 and a lower end of the second supporting member 1600 may be coupled to each other via soldering. An opening may be formed on the board portion 1421. An opening that penetrates the board portion 1421 may be formed on the board portion 1421. The opening of the board portion 1421 may be formed to correspond to the opening 1411 of the board 1410.

The OIS driving coil 1422 may include at least one coil. The OIS driving coil 1422 may be a fine pattern (FP) coil that is formed to be integrated into the board portion 1421. The OIS driving coil 1422 may include a plurality of coils that are spaced apart from each other. The OIS driving coil 1422 may include four coils that are spaced apart from each other. In this case, four coils may be disposed on the board portion 1421 to form an angle of 90° between two neighboring coils. The four coils may be separately controlled. The OIS driving coil 1422 may sequentially receive power through the printed circuit board 1010, the board 1410, and the board portion 1421. The OIS driving coil 1422 may face the driving magnet 1320. In this case, when current is supplied to the OIS driving coil 1422 to for a magnetic field around the OIS driving coil 1422, the driving magnet 1320 may be moved with respect to the OIS driving coil 1422 through electromagnetic interaction between the OIS driving coil 1422 and the driving magnet 1320.

The OIS driving coil 1422 may electromagnetically interact with the driving magnet 1320. The OIS driving coil 1422 may move the housing 1310 and the bobbin 1210 with respect to the base 1430 in a direction perpendicular to the optical axis through electromagnetic interaction with the driving magnet 1320.

The base 1430 may be disposed on a lower surface of the board 1410. The board 1410 may be disposed on an upper surface of the base 1430. The OIS driving coil 1422 may be disposed on the base 1430. The base 1430 may be coupled to the cover member 1100. The base 1430 may be disposed on an upper surface of the printed circuit board 1010. However, a separate holder member 1011 may be disposed between the base 1430 and the printed circuit board 1010. The base 1430 may function as a sensor holder installed on the printed circuit board 1010.

The base 1430 may include a through hole 1431, an impurities collector 1432, a sensor coupling portion 1433, the terminal coupling portion 1434, and the stair portion 1435. However, any one or more of the through hole 1431, the impurities collector 1432, the sensor coupling portion 1433, the terminal coupling portion 1434, and the stair portion 1435 may be omitted or modified from the base 1430.

The through hole 1431 may be formed in the base 1430. The through hole 1431 may be formed to penetrate the base 1430 in up and down directions. An infrared ray filter may be disposed in the through hole 1431. However, the infrared ray filter may be coupled to the separate holder member 1011 disposed below the base 1430. Light passing through the lens module may be incident on the image sensor through the through hole 1431. That is, light passing through the lens module may be incident on the image sensor through an opening of the circuit member 1420, the opening 1411 of the board 1410, and the through hole 1431 of the base 1430. The through hole 1431 may be shaped like a circle. However, the shape of the through hole 1431 is not limited thereto.

The impurities collector 1432 may collect impurities introduced into the lens moving apparatus. The impurities collector 1432 may include a groove formed by recessing an upper surface of the base 1430 downward, and adhesives disposed in the groove. The adhesives may include an adhesive material. Impurities introduced into the lens moving apparatus may be adhered by an adhesive portion.

The second sensor unit 1800 may be disposed on the sensor coupling portion 1433. The sensor coupling portion 1433 may accommodate at least a portion of the second sensor unit 1800. The sensor coupling portion 1433 may be configured in the form of a groove formed by recessing an upper surface of the base 1430 downward. The sensor coupling portion 1433 may be spaced apart from the impurities collector 1432. The sensor coupling portion 1433 may be formed as a plurality of grooves. For example, the sensor coupling portion 1433 may be formed as two grooves. In this case, the second sensor unit 1800 may be disposed in each of the two grooves.

The stair portion 1412 of the board 1410 may be disposed on the terminal coupling portion 1434. The terminal coupling portion 1434 may be configured in the form of a groove formed by recessing a portion of one side surface of the base 1430 inward. In this case, the terminal coupling portion 1434 may accommodate at least a portion of the stair portion 1412 of the board 1410. The width of the terminal coupling portion 1434 may correspond to the width of the stair portion 1412 of the board 1410. The length of the terminal coupling portion 1434 may correspond to the length of the stair portion 1412 of the board 1410.

The stair portion 1435 may be formed on a side surface of the base 1430. The stair portion 1435 may be formed to surround the outer periphery surface of the base 1430. The stair portion 1435 may be formed by recessing an upper portion of a side surface of the base 1430. Alternatively, the stair portion 1435 may protrude from a lower portion of the side surface of the base 1430. A lower end of the side plate 1102 of the cover member 1100 may be disposed on the stair portion 1435.

The first supporting member 1500 may be coupled to the bobbin 1210 and the housing 1310. The first supporting member 1500 may elastically support the bobbin 1210. At least a portion of the first supporting member 1500 may have elasticity.

In this case, the first supporting member 1500 may be referred to as a 'first elastic member'. The first supporting member 1500 may moveably support the bobbin 1210. The first supporting member 1500 may moveably support the bobbin 1210 with respect to the housing 1310 in the optical axis direction. That is, the first supporting member 1500 may support the bobbin 1210 to be AF driven. In this case, the first supporting member 1500 may be referred to as an 'AF supporting member'.

The first supporting member 1500 may include the upper supporting member 1510 and the lower supporting member 1520. However, any one or more of the upper supporting member 1510 and the lower supporting member 1520 may be omitted or modified from the first supporting member 1500.

The upper supporting member 1510 may be disposed above the bobbin 1210 and may be coupled to the bobbin 1210 and the housing 1310. The upper supporting member 1510 may be coupled to the bobbin 1210 and the housing 1310. The upper supporting member 1510 may be coupled to an upper portion of the bobbin 1210 and an upper portion of the housing 1310. The upper supporting member 1510 may elastically support the bobbin 1210.

At least a portion of the upper supporting member 1510 may have elasticity. In this case, the upper supporting member 1510 may be referred to as an 'upper elastic member'. The upper supporting member 1510 may moveably support the bobbin 1210. The upper supporting member 1510 may moveably support the bobbin 1210 with respect to the housing 1310 in the optical axis direction. The upper supporting member 1510 may be configured in the form of a leaf spring.

The upper supporting member 1510 may include a plurality of division components. The upper supporting member 1510 may include eight upper supporting portions 1501 to 1508 that are spaced apart from each other.

The upper supporting member 1510 may include a first upper supporting portion 1501, a second upper supporting portion 1502, a third upper supporting portion 1503, a fourth upper supporting portion 1504, a fifth upper supporting portion 1505, a sixth upper supporting portion 1506, a seventh upper supporting portion 1507, and an eighth upper supporting portion 1508, which are spaced apart from each other. However, any one or more of the first to eighth upper supporting portions 1501 to 1508 may be omitted or modified from the upper supporting member 1510. The upper supporting portions 1501 to 1508 may have elasticity. In this case, the upper supporting portions 1501 to 1508 may be referred to as an 'upper elastic portion'.

The first to eighth upper supporting portions 1501 to 1508 may be spaced apart from each other. As such, the first to eighth upper supporting portions 1501 to 1508 may be used as a conductive line inside the lens moving apparatus 1100.

The first to sixth upper supporting portions 1501 to 1506 may form a pair with first to sixth terminals 1721 to 1726 of the board 1720 of the first sensor unit 1700 and may be electrically connected thereto. As such, the first to sixth upper supporting portions 1501 to 1506 may be electrically connected to the hall driver IC 1070.

The first to fourth upper supporting portions 1501 to 1504 may be electrically connected to the board 1410 through the second supporting member 1600. The fifth and sixth upper supporting portions 1505 and 1506 may be electrically connected to the AF driving coil 1220 through the conductive member 1610 and the lower supporting member 1520.

The upper supporting member 1510 may include the external portion 1511, the internal portion 1512, a connecting portion 1513, and a coupling portion 1514. However, any one or more of the external portion 1511, the internal portion 1512, the connecting portion 1513, and the coupling portion 1514 may be omitted or modified from the upper supporting member 1510.

The external portion 1511 may be coupled to the housing 1310. The external portion 1511 may be coupled to an upper portion of the housing 1310. The external portion 1511 may be coupled to the upper coupling portion 1313 of the housing 1310. The external portion 1511 may include a hole or groove coupled to the upper coupling portion 1313 of the housing 1310.

The internal portion 1512 may be coupled to the bobbin 1210. The internal portion 1512 may be coupled to an upper portion of the bobbin 1210. The internal portion 1512 may be coupled to the upper coupling portion 1213 of the bobbin 1210. The internal portion 1512 may include a hole or groove coupled to the upper coupling portion 1213 of the bobbin 1210.

The connecting portion 1513 may connect the external portion 1511 and the internal portion 1512 to each other. The connecting portion 1513 may elastically connect the external portion 1511 and the internal portion 1512 to each other. The connecting portion 1513 may have elasticity. In this case, the connecting portion 1513 may be referred to as an 'elastic portion'. The connecting portion 1513 may be bent twice or more. The external portion 1511 may be replaced with the term "external frame", and the internal portion 1512 may be replaced with the term "internal frame".

The coupling portion 1514 may be coupled to the second supporting member 1600. The coupling portion 1514 may be coupled to the second supporting member 1600 via soldering. For example, the coupling portion 1514 may include a hole penetrated by the second supporting member 1600.

As another example, the coupling portion 1514 may include a groove to which the second supporting member 1600 is coupled. The coupling portion 1514 may extend from the external portion 1511. The coupling portion 1514 may extend from the external portion 1511 outward. The coupling portion 1514 may include a bent portion that is formed via bending. The coupling portion 1514 may be coupled to the conductive member 1610. The coupling portion 1514 may be coupled to the conductive member 1610 via soldering.

Some of the first to eighth upper supporting portions 1501 to 1508 may include the external portion 1511, the internal portion 1512, the connecting portion 1513, and the coupling portion 1514, but other remaining may not include any one or more of the external portion 1511, the internal portion 1512, the connecting portion 1513, and the coupling portion 1514.

The lower supporting member 1520 may be disposed below the bobbin 1210 and may be coupled to the bobbin 1210 and the housing 1310. The lower supporting member 1520 may be coupled to the bobbin 1210 and the housing 1310. The lower supporting member 1520 may be coupled to a lower portion of the bobbin 1210 and a lower portion of the housing 1310. The lower supporting member 1520 may elastically support the bobbin 1210. At least a portion of the lower supporting member 1520 may have elasticity. In this case, the lower supporting member 1520 may be referred to as a 'lower elastic member'. The lower supporting member 1520 may moveably support the bobbin 1210. The lower supporting member 1520 may moveably support the bobbin 1210 with respect to the housing 1310 in the optical axis direction. The lower supporting member 1520 may be configured in the form of a leaf spring.

The lower supporting member 1520 may include two lower supporting portions 1520a and 1520b that are spaced apart from each other. The lower supporting member 1520 may include the first and second lower supporting portions 1520a and 1520b that are spaced apart from each other.

The two lower supporting portions 1520a and 1520b may form a pair with one pair of lead lines of the AF driving coil 1220 and may be electrically connected thereto. That is, the two lower supporting portions 1520a and 1520b may be used as a conductive line for supplying current to the AF driving coil 1220.

The two lower supporting portions 1520a and 1520b may be electrically connected to the upper supporting member 1510 through the conductive member 1610. The lower supporting portions 1520a and 1520b may have elasticity. In this case, the lower supporting portions 1520a and 1520b may be referred to as a 'lower elastic portion'.

The lower supporting member 1520 may include the external portion 1521, an internal portion 1522, a connecting portion 1523, and a coupling portion 1524. However, any one or more of the external portion 1521, internal portion 1522, the connecting portion 1523, and the coupling portion 1524 may be omitted or modified from the lower supporting member 1520.

The external portion 1521 may be coupled to the housing 1310. The external portion 1521 may be coupled to a lower portion of the housing 1310. The external portion 1521 may be coupled to a lower coupling portion of the housing 1310. The external portion 1521 may include a hole or groove coupled to the lower coupling portion of the housing 1310.

The internal portion 1512 may be coupled to the bobbin 1210. The internal portion 1512 may be coupled to an upper portion of the bobbin 1210. The internal portion 1512 may be coupled to the lower coupling portion of the bobbin 1210. The internal portion 1512 may include a hole or groove coupled to the lower coupling portion of the bobbin 1210.

The connecting portion 1523 may connect the external portion 1521 and the internal portion 1522 to each other. The connecting portion 1523 may elastically connect the external portion 1521 and the internal portion 1522 to each other. The connecting portion 1523 may have elasticity. In this case, the connecting portion 1523 may be referred to as an 'elastic portion'. The connecting portion 1523 may be bent twice or more.

The coupling portion 1524 may be coupled to the conductive member 1610. The coupling portion 1524 may be coupled to the conductive member 1610 via soldering. For example, the coupling portion 1524 may include a hole penetrated by the conductive member 1610. As another example, the coupling portion 1514 may include a groove to which the conductive member 1610 is coupled. The coupling portion 1514 may extend from the external portion 1511. The coupling portion 1514 may extend outward from the external portion 1511. The coupling portion 1514 may include a bent portion that is formed via bending.

The second supporting member 1600 may moveably support the housing 1310. The second supporting member 1600 may elastically support the housing 1310. At least a portion of the second supporting member 1600 may have elasticity. In this case, the second supporting member 1600 may be referred to as a 'second elastic member'.

For example, the second supporting member 1600 may moveably support the housing 1310 with respect to the stator 1400 in a direction perpendicular to the optical axis. In this case, the bobbin 1210 may be moved integrally with the housing 1310. As another example, the second supporting member 1600 may tiltably support the housing 1310 with respect to the stator 1400. That is, the second supporting member 1600 may support the housing 1310 and the bobbin 1210 to be OIS-driven. In this case, the second supporting member 1600 may be referred to as an 'OIS supporting member'. For example, the second supporting member 1600 may be configured in the form of a wire. As another example, the second supporting member 1600 may be configured in the form of a leaf spring.

The second supporting member 1600 may be coupled to the upper supporting member 1510 and the stator 1400. A lower end of the second supporting member 1600 may be coupled to the board portion 1421 of the circuit member 1420. The second supporting member 1600 may penetrate the board portion 1421 of the circuit member 1420.

In such a structure, the lower end of the second supporting member 1600 may be coupled to the lower surface of the board portion 1421 of the circuit member 1420 via soldering. An upper end of the second supporting member 1600 may be coupled to the coupling portion 1514 of the upper supporting member 1510.

The upper end of the second supporting member 1600 may penetrate the coupling portion 1514 of the upper supporting member 1510. In such a structure, the upper end of the second supporting member 1600 may be coupled to an upper surface of the coupling portion 1514 of the upper supporting member 1510 via soldering. As a modification example, a lower end of the second supporting member 1600 may be coupled to the board 1410.

The lower end of the second supporting member 1600 may be coupled to the base 1430. The upper end of the second supporting member 1600 may be coupled to the housing 1310. The structure of the second supporting member 1600 is not limited thereto, and the second supporting member 1600 may be provided with any structure for moveably supporting the second moving part 1300 with respect to the stator 1400.

The second supporting member 1600 may include a plurality of division components. The second supporting member 1600 may include eight supporting portions 1601 to 1608 that are spaced apart from each other.

The second supporting member 1600 may include the first to eighth supporting portions 1601 to 1608 that are spaced apart from each other. However, any one or more of the first to eighth supporting portions 1601 to 1608 may be omitted or modified from the second supporting member 1600.

The first to eighth supporting portions 1601 to 1608 may be spaced apart from each other. As such, the first to eighth supporting portions 1601 to 1608 may be used as a conductive line inside the lens moving apparatus. The first to eighth supporting portions 1601 to 1608 may be coupled to the board portion 1421 of the circuit member 1420.

The first to eighth supporting portions 1601 to 1608 may be coupled to the upper supporting member 1510. That is, the first to eighth supporting portions 1601 to 1608 may electrically connect the board portion 1421 of the circuit member 1420 to the upper supporting member 1510.

Four of the first to eighth supporting portions 1601 to 1608 may be coupled to an upper supporting portion that is a division component of the upper supporting member 1510 and the remaining four may form two pairs with each other and may be coupled to the other upper supporting portions of the upper supporting member 1510.

Figure 31:
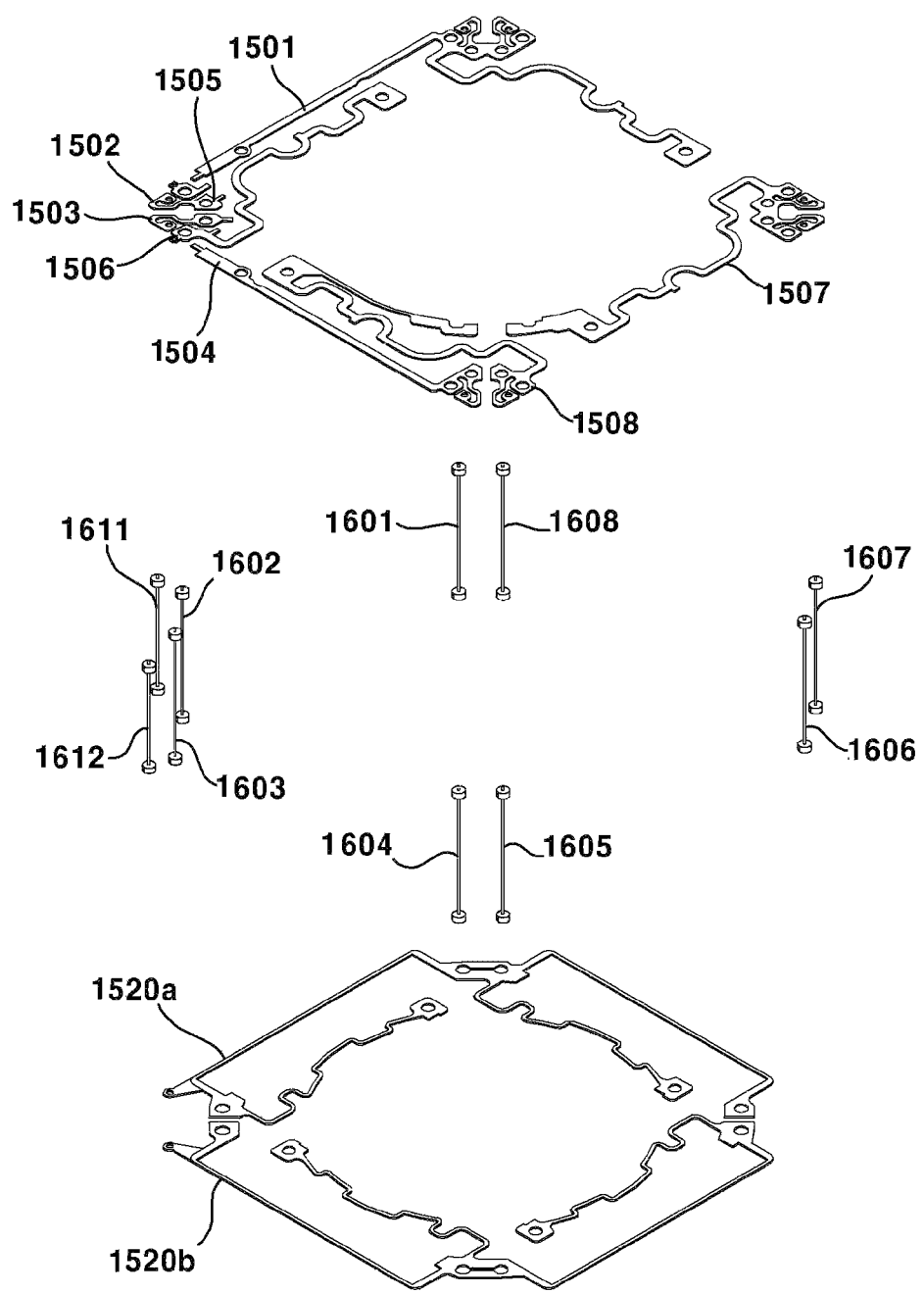
Figure 32:
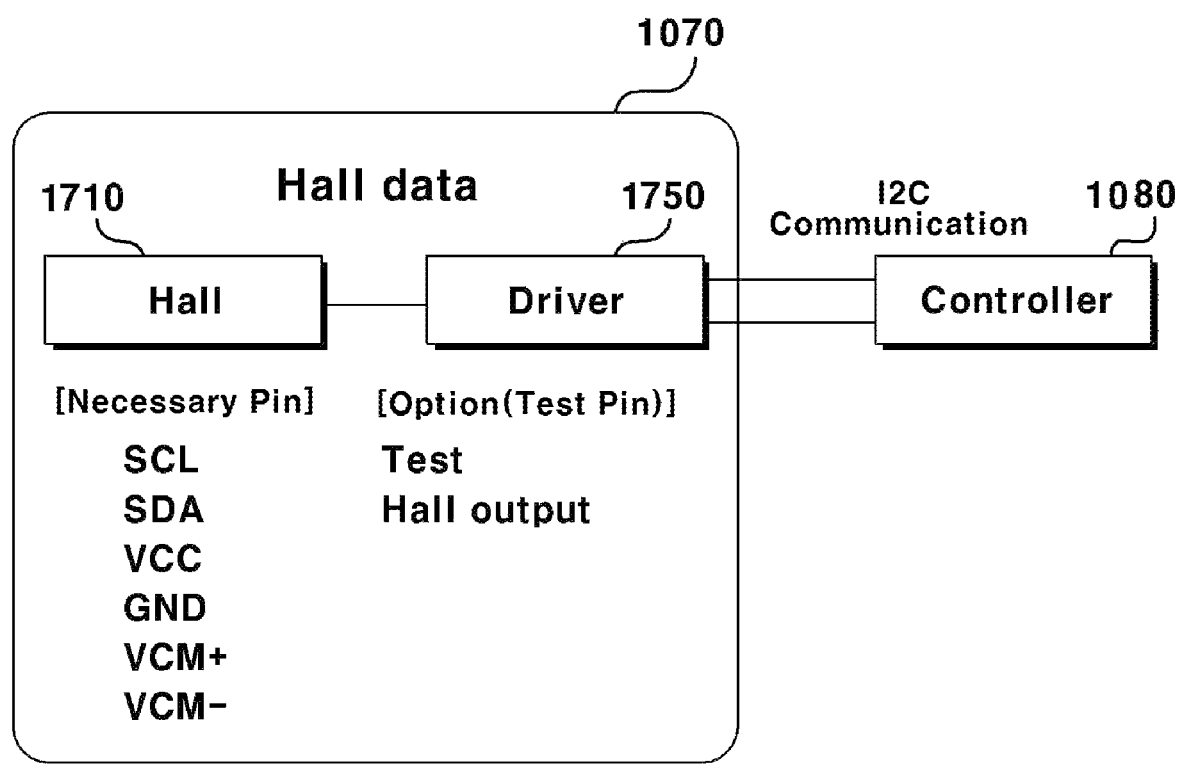
FIG. 32 is a diagram showing a concept of a communication structure of a hall driver IC and a controller of a camera module according to an embodiment.

For example, as shown in FIG. 31, the first and eighth supporting portions 1601 and 1608 may be coupled to the first upper supporting portion 1501. The second supporting portion 1602 may be coupled to the second upper supporting portion 1502. The third supporting portion 1603 may be coupled to the third upper supporting portion 1503.

The fourth supporting portion 1604 may be coupled to the fourth upper supporting portion 1504. The fifth supporting portion 1605 may be coupled to the eighth upper supporting portion 1508. The sixth and seventh supporting portions 1606 and 1607 may be coupled to the seventh upper supporting portion 1507.

The first to eighth supporting portions 1601 to 1608 may each be a wire. Two of the first to eighth supporting portions 1601 to 1608 may disposed at each of the four corner portion of the housing 1310.

The conductive member 1610 may be coupled to the upper supporting member 1510 and the lower supporting member 1520. An upper end of the conductive member 1610 may be coupled to the upper supporting member 1510. A lower end of the conductive member 1610 may be coupled to the lower supporting member 1520. The conductive member 1610 may electrically connect the upper supporting member 1510 to the lower supporting member 1520. The length of the conductive member 1610 in a length direction may be smaller than the length of the second supporting member 1600 in a length direction. The conductive member 1610 may be disposed at one side corner of the housing 1310. The conductive member 1610 may be spaced apart from the second supporting member 1600. The conductive member 1610 may be disposed at an outer side compared with the second supporting member 1600. The conductive member 1610 may be disposed at an inner side compared with the second supporting member 1600. The conductive member 1610 may be disposed adjacently to the second supporting member 1600. The two supporting portions 1602 and 1603 and the two conductive portions 1611 and 1612 may be disposed at one side corner of the housing 1310.

The conductive member 1610 may include the two conductive portions 1611 and 1612 that are spaced apart from each other. The conductive member 1610 may include the first and second conductive portions 1611 and 1612 that are spaced apart from each other. The first and second conductive portions 1611 and 1612 may be spaced apart from each other.

The first conductive portion 1611 may be coupled to the fifth upper supporting portion 1505 and the first lower supporting portion 1520a. The first conductive portion 1611 may electrically connect the fifth upper supporting portion 1505 and the first lower supporting portion 1520a to each other. The second conductive portion 1612 may be coupled to the sixth upper supporting portion 1506 and the second lower supporting portion 1520b. The second conductive portion 1612 may electrically connect the sixth upper supporting portion 1506 and the second lower supporting portion 1520b to each other.

A damper (not shown) may be disposed on the second supporting member 1600. The damper may be disposed on the second supporting member 1600 and the housing 1310. The damper may be disposed on the first supporting member 1500. The damper may be disposed on the first supporting member 1500 and/or the second supporting member 1600 to inhibit a resonance phenomenon that occurs in the first supporting member 1500 and/or the second supporting member 1600. An impact absorption portion (not shown) may be provided to any one or more of the first supporting member 1500 and the second supporting member 1600. The impact absorption portion may be formed by changing a shape of a portion of the first supporting member 1500 and/or the second supporting member 1600.

The first sensor unit 1700 may be provided for auto focus feedback. The first sensor unit 1700 may detect movement of the bobbin 1210 in the optical axis direction. The first sensor unit 1700 may detect a movement amount of the bobbin 1210 in the optical axis direction and may provide the detected movement amount of a controller in real time.

The first sensor unit 1700 may include the first sensor 1710, the board 1720, and the sensing magnet 1730. However, any one or more of the first sensor 1710, the board 1720 and the sensing magnet 1730 may be omitted or modified from the first sensor unit 1700. The first sensor unit 1700 may further include the compensation magnet 1740. However, the compensation magnet 1740 is barley related to sensing of a position of the bobbin 1210, and thus may be described as a separate component from the first sensor unit 1700.

The first sensor 1710 may be provided for auto focus feedback. In this case, the first sensor 1710 may be referred to as an 'AF feedback sensor'. The first sensor 1710 may detect the sensing magnet 1730. The first sensor 1710 may detect the sensing magnet 1730 disposed on the bobbin 1210. The first sensor 1710 may detect a position of the bobbin 1210. The first sensor 1710 may detect a movement amount of the bobbin 1210 in the optical axis direction. The first sensor 1710 may be disposed in the housing 1310. The first sensor 1710 may be disposed on the board 1720. The first sensor 1710 may be electrically connected to the board 1720. The first sensor 1710 may be a hall sensor. The first sensor 1710 may be a hall integrated circuit (IC). The first sensor 1710 may detect magnetic force of the sensing magnet 1730. That is, the first sensor 1710 may detect a change in magnetic force that is changed due to movement of the sensing magnet 1730 when the bobbin 1210 is moved and may detect a displacement amount of the bobbin 1210. According to the present embodiment, the first sensor 1710 may be integrated into the driver 1750. Alternatively, the first sensor 1710 may include the driver 1750 built therein. In this case, an integrated structure of the first sensor 1710 and the driver 1750 may be referred to as the hall driver IC 1070.

The board 1720 may be disposed in the housing 1310. The board 1720 may be coupled to the first sensor 1710. The board 1720 may be electrically connected to the first sensor 1710. The board 1720 may be coupled to the upper supporting member 1510. The board 1720 may be electrically connected to the first to sixth upper supporting portions 1501 to 1506 of the upper supporting member 1510. The board 1720 and the upper supporting member 1510 may be coupled to be each other via soldering.

The hall driver IC 1070 may be disposed on the board 1720. The first sensor 1710 and the driver 1750 may be disposed on a lower surface of the board 1720. The six terminals 1721 to 1726 that are spaced apart from each other may be formed on the upper surface of the board 1720. In this case, the six terminals 1721 to 1726 may form a pair with the six upper supporting portions 1501 to 1506 and may be electrically connected thereto.

The four terminals 1721, 1722, 1723, and 1724 of the six terminals 1721 to 1726 may be connected to the board 1410 through the upper supporting member 1510, the second supporting member 1600, and the board portion 1421. The remaining two terminals 1725 and 1726 of the six terminals 1721 to 1726 may be connected to the AF driving coil 1220 through the upper supporting member 1510, the conductive member 1610, and the lower supporting member 1520.

The sensing magnet 1730 may be disposed on the bobbin 1210. The sensing magnet 1730 may be detected by the first sensor 1710. The sensing magnet 1730 may face the first sensor 1710. The sensing magnet 1730 may be shaped like a hexahedron. However, the shape of the sensing magnet 1730 may not be limited thereto. The sensing magnet 1730 may be disposed at one side of the bobbin 1210. The sensing magnet 1730 may be disposed at the corner portion of the bobbin 1210. That is, the sensing magnet 1730 may be disposed to face the corner portion of the housing 1310.

The compensation magnet 1740 may be disposed on the bobbin 1210. The compensation magnet 1740 may be disposed to be counterbalanced to magnetic force of the sensing magnet 1730. The compensation magnet 1740 may be symmetric with the sensing magnet 1730 based on the optical axis. The compensation magnet 1740 may be disposed at a position corresponding to the sensing magnet 1730 based on the optical axis.

The compensation magnet 1740 may have a size and/or shape corresponding to the sensing magnet 1730 based on the optical axis. The compensation magnet 1740 may be disposed at the other side (an opposite side to one side) of the bobbin 1210. That is, the sensing magnet 1730 may be disposed at one side of the bobbin 1210 and the compensation magnet 1740 may be disposed at the other side of the bobbin 1210. The compensation magnet 1740 may be disposed at a corner portion of the bobbin 1210. That is, the compensation magnet 1740 may be disposed to face the corner portion of the housing 1310. The compensation magnet 1740 may be configured for balancing with the sensing magnet 1730. In this case, the compensation magnet 1740 may be referred to as a 'balancing magnet'.

The second sensor unit 1800 may be provided for hand shake correction feedback. In this case, the second sensor unit 1800 may be referred to as an 'OIS feedback sensor'. The second sensor unit 1800 may detect movement of the housing 1310. The second sensor unit 1800 may movement or tilt of the housing 1310 and/or the bobbin 1210 in a direction perpendicular to the optical axis. The second sensor unit 1800 may detect the driving magnet 1320.

The second sensor unit 1800 may detect the driving magnet 1320 disposed in the housing 1310. The second sensor unit 1800 may detect a position of the housing 1310. The second sensor unit 1800 may detect a movement amount of the housing 1310 in a direction perpendicular to the optical axis. In this case, the movement amount in the direction perpendicular to the optical axis of the housing 1310 may correspond to a movement amount of the lens module coupled to the bobbin 1210 and the bobbin 1210.

The second sensor unit 1800 may be disposed on the stator 1400. The second sensor unit 1800 may be disposed on the lower surface of the board 1410. The second sensor unit 1800 may be electrically connected to the board 1410. The second sensor unit 1800 may be disposed on the base 1430.

The second sensor unit 1800 may be accommodated in the sensor coupling portion 1433 formed on an upper surface of the base 1430. The second sensor unit 1800 may be a hall sensor. The second sensor unit 1800 may be a hall integrated circuit (IC). The second sensor unit 1800 may detect magnetic force of the driving magnet 1320.

That is, the second sensor unit 1800 may detect a change in magnetic force that is changed due to movement of the driving magnet 1320 when the housing 1310 is moved and may detect a displacement amount of the housing 1310. The plurality of second sensor units 1800 may be provided. For example, the two second sensor units 1800 may be provided to detect movement of the housing 1310 in the x axis and y axis (here, the optical axis is the z axis).

The hall driver IC 1070 may be disposed in the board 1720. The hall driver IC 1070 may be understood as a component formed by integrally configuring the first sensor 1710 and the driver 1750. The hall driver IC 1070 may have a temperature detection function. According to the present embodiment, even if a temperature change occurs, auto focus feedback may be accurately controlled through the temperature detection function of the hall driver IC 1070.

The first sensor 1710 may be formed of a silicon-based material. In this case, as surrounding temperature is increased, output of the first sensor 1710 may be increased. According to another embodiment, the first sensor 1710 may be formed of GaAs. In this case, output of the first sensor 1710 with respect to the surrounding temperature may have an inclination of about −0.06%/° C.

The hall driver IC 1070 may further include a temperature sensing device (not shown) for detecting the surrounding temperature. The temperature sensing device may output a temperature detection signal based on the measurement result of the surrounding temperature of the hall driver IC 1070 to the driver 1750.

The first sensor 1710 may generate output based on the detection result of intensity of magnetic force of the sensing magnet 1730. The driver 1750 may output a driving signal for driving the first sensor 1710 and a driving signal for driving the AF driving coil 1220. The driver 1750 may receive a clock signal SCL, a data signal SDA, and power signals VCC and GND from the controller 1080 using data communication using a protocol, for example, I2C communication. The driver 1750 may generate a driving signal for driving the first sensor 1710 and a driving signal for driving the AF driving coil 1220 using the clock signal SCL and the power signals VCC and GND.

The driver 1750 may receive output of the first sensor 1710. The driver 1750 may transmit the clock signal SCL and the data signal SDA about the output of the first sensor 1710 to the controller 1080 using data communication using a protocol, for example, I2C communication. The driver 1750 may receive the temperature detection signal measured by the temperature sensing device. The driver 1750 may transmit the temperature detection signal to the controller 1080 using data communication using a protocol, for example, I2C communication.

As shown in FIG. 32, the hall driver IC 1070 may include six necessary pins. In more detail, the six necessary pins may include SCL, SDA, VCC, GND, VCM+, and VCM−. SCL may be a component for clock (time) information. SDA may be a component for data information. VCC and GND may be a component for power supply. VCM+ and VCM− may be a component for supplying current to the AF driving coil 1220.

The six necessary pins of the hall driver IC 1070 may form a pair with the six terminals 1721 to 1726 of the board 1720 and may be electrically connected thereto. In more detail, SCL, SDA, VCC, and GND of the hall driver IC 1070 may form a pair with the first to fourth terminals 1721 to 1724 of the board 1720 and may be electrically connected thereto.

VCM+ and VCM− of the hall driver IC 1070 the board 1720 may form a pair with the fifth and sixth terminals 1725 and 1726 and may be electrically connected thereto. For reference, the fifth terminal 1725 may be coupled to one end of the AF driving coil 1220 through the fifth upper supporting portion 1505, the first conductive portion 1611, and the first lower supporting portion 1520*a*. The sixth terminal 1726 may be coupled to the other end of the AF driving coil 1220 through the sixth upper supporting portion 1506, the second conductive portion 1612, and the second lower supporting portion 1520*b*.

The hall driver IC 1070 may include two options (test pins). In more detail, the two options may be Test and Hall output. Test may be a component for testing an operation of the hall driver IC 1070. Hall output may be a component for processing a hall value detected by the first sensor 1710 and transmitting the value to the controller 1080. For reference, even if there is no Hall output, a detection value detected by the first sensor 1710 may be transmitted to the controller 1080 through SCL and SDA. However, a difference therebetween may correspond to a format difference of data for transmitting the detection value detected by the first sensor 1710. For example, when the detection value of the first sensor 1710 is transmitted to the controller 1080 through SCL and SDA, an analog signal may be transmitted. When the detection value of the first sensor 1710 is transmitted to the controller 1080 through Hall output, a digital signal may be transmitted. However, the above description is merely exemplary, and on the other hand, a digital signal may be transmitted through SCL and SDA and an analog signal may be transmitted through Hall output.

The hall driver IC 1070 may be electrically connected to the controller 1080. The hall driver IC 1070 may be connected to the controller 1080 through the upper supporting member 1510, the second supporting member 1600, the circuit member 1420, the board 1410, and the printed circuit board 1010. The hall driver IC 1070 may transmit and receive information to and from the controller 1080 via I2C communication.

The hall driver IC 1070 may include the first sensor 1710 and the driver 1750. However, any one or more of the first sensor 1710 and the driver 1750 may be omitted or modified from the hall driver IC 1070.

The driver 1750 may be disposed on the board 1720. The driver 1750 may supply current to the AF driving coil 1220. The driver 1750 may be electrically connected to the AF driving coil 1220 through the upper supporting member 1510, the conductive member 1610, and the lower supporting member 1520. The driver 1750 may have a temperature sensing function. The driver 1750 may be electrically connected to the first sensor 1710. The driver 1750 may be formed to be integrated into the first sensor 1710.

According to the present embodiment, the lens module and the hall device of the first sensor 1710 may be changed along with a change in temperature. In this case, the temperature change may be caused by sensor temperature, surrounding circuit temperature, portable phone chip temperature, and the like. The hall device of the first sensor 1710 may be formed of GaAs. In this case, the hall device may have an inclination of about −0.06%/° C. with respect to temperature. According to the present embodiment, the hall driver IC 1070 that is a drive integrated product having a temperature sensing function and a hall device function may be applied to measure temperature and to set a hall inclination to 0 or an opposite direction to an inclination of a lens. According to the present embodiment, six or more conductive lines may be required for conductive connection of the hall driver IC 1070. This is different in that a conventional hall sensor requires four conductive lines.

Thus far, the structure in which VCC− and VCC+ of the hall driver IC 1070 are connected to the AF driving coil 1220 through the fifth and sixth terminals 1725 and 1726 of the board 1720, the fifth and sixth upper supporting portions 1605 and 1606, the first and second conductive portions 1611 and 1612, and the first and second lower supporting portions 1520$a$ and 1520$b$ has been described as an example.

However, according to a modified example, any one of VCC− and VCC+ of the hall driver IC 1070 may be coupled to the AF driving coil 1220 through the sixth upper supporting portion 1606. That is, the sixth upper supporting portion 1606 may be coupled directly to a lead line of the AF driving coil 1220. In this case, the other one of VCC− and VCC+ of the hall driver IC 1070 may be electrically connected to the AF driving coil 1220 through the upper supporting member 1510, the conductive member 1610, and the lower supporting member 1520. In this case, the lower supporting member 1520 may not inevitably include two division components. That is, the lower supporting member 1520 may be integrally formed. According to a modified example, the number of wires included in the second supporting member 1600 and the conductive member 1610 may also be reduced.

Thus far, an example in which all of the upper supporting member 1510, the lower supporting member 1520, the second supporting member 1600, and the conductive member 1610 are formed as separate members has been described. However, according to a modified example, the second supporting member 1600 and the conductive member 1610 may be integrally formed with the upper supporting member 1510 or the lower supporting member 1520. For example, the second supporting member 1600 and/or the conductive member 1610 may be formed by bending a portion of the lower supporting member 1520 upward. Alternatively, the second supporting member 1600 and/or the conductive member 1610 may be formed by bending a portion of the upper supporting member 1510 downward.

Thus far, an example in which both the second supporting member 1600 and the conductive member 1610 are formed as a wire has been described. However, according to a modified example, any one or more of the second supporting member 1600 and the conductive member 1610 may be configured in the form of a spring or an iron plate. Alternatively, the second supporting member 1600 and the conductive member 1610 may be omitted, a through hole (not shown) may be formed in the housing 1310 in the optical axis direction, and a conductive material may be inserted into the through hole to replace with a function of the second supporting member 1600 and the conductive member 1610. Alternatively, a spring, an iron plate, or a conductive wire may be inserted into the housing 1310.

Figure 33:
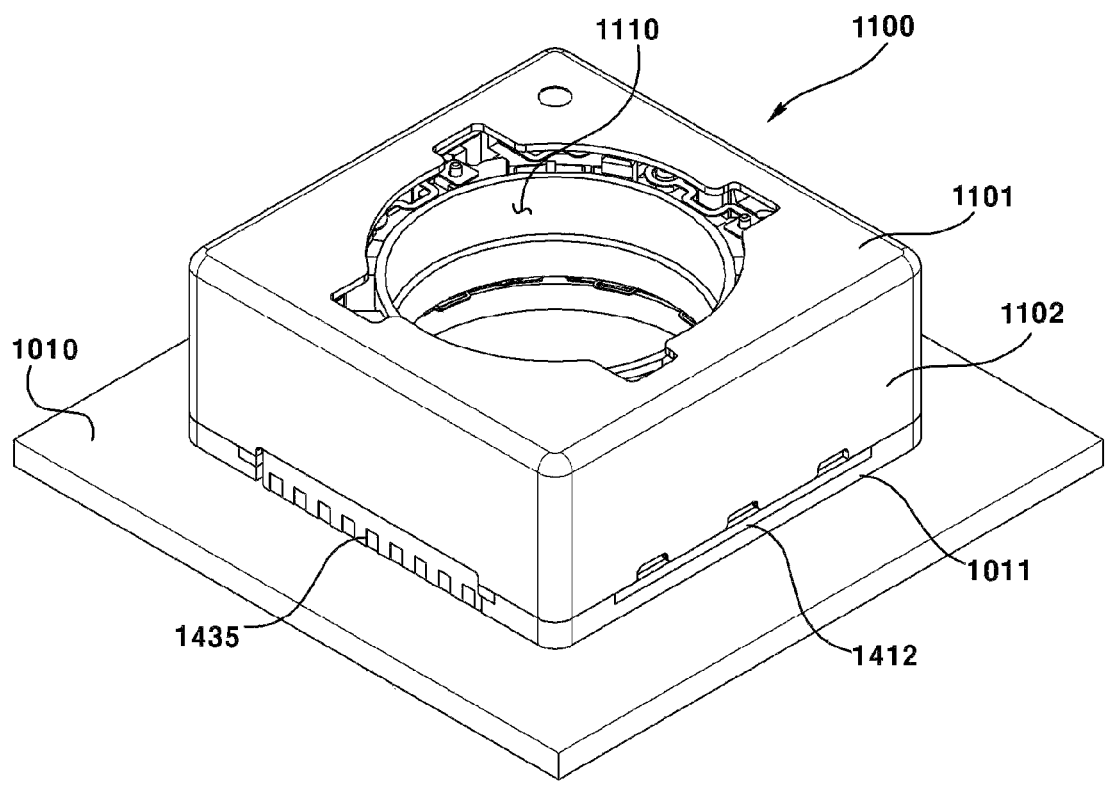
FIG. 33 is a perspective view of a camera module according to another embodiment.

FIG. 33 is a perspective view of a camera module according to another embodiment.

Referring to FIG. 33, the camera module may include the lens moving apparatus 1100, a lens module (not shown), an infrared ray block filter (not shown), the printed circuit board 1010, an image sensor (not shown), and the controller 1080. However, any one or more of the lens moving apparatus, the lens module, the infrared ray block filter, the printed circuit board 1010, the image sensor, and the controller 1080 may be omitted or modified from the camera module.

The controller 1080 may be disposed on the printed circuit board 1010. For example, the controller 1080 may be disposed inside the lens moving apparatus. As another example, the controller 1080 may be positioned outside the lens moving apparatus.

The controller 1080 may separately control the direction, intensity, amplitude, and the like of current applied to the AF driving coil 1220 and the OIS driving coil 1422 of the lens moving apparatus 1100. However, intensity of current supplied to the AF driving coil 1220 may be controlled by the driver 1750 of the hall driver IC 1070.

The controller 1080 may control the lens moving apparatus 1100 to perform any one or more of the auto focus function and the hand shake correction function of the camera module.

That is, the controller 1080 may control the lens moving apparatus 1100 to move the lens module in the optical axis direction or move or tilt the lens module in a direction perpendicular to the optical axis direction. The controller 1080 may perform any one or more of feedback control of the auto focus function and feedback control of the hand shake correction function.

For example, the controller 1080 may receive position information of the bobbin 1210 or the housing 1310, which is detected by the first sensor unit 1700, may control current supplied to the AF driving coil 1220, and may perform auto focus feedback control.

The controller 1080 may receive position information of the bobbin 1210 or the housing 1310, which is detected by the second sensor unit 1800, may control current supplied to the OIS driving coil 1422, and may perform hand shake correction feedback control.

Feedback control by the controller 1080 may be performed in real time, and thus the auto focus function and the hand shake correction function may be more accurately performed. As shown in FIG. 31, the controller 1080 may be electrically connected to the hall driver IC 1070. As shown in FIG. 32, the controller 1080 may perform I2C communication with the hall driver IC 1070.

Hereinafter, an operation of the camera module according to the present embodiment will be described.

First, the auto focus function of the camera module according to the present embodiment is described.

When power is supplied to the AF driving coil 1220, the AF driving coil 1220 may be moved with respect to the driving magnet 1320 through electromagnetic interaction between the AF driving coil 1220 and the driving magnet 1320. In this case, the bobbin 1210 to which the AF driving coil 1220 is coupled may be moved integrally with the AF driving coil 1220. That is, the bobbin 1210 to which the lens module is coupled may be moved with respect to the housing 1310 in the optical axis direction. Such movement of the bobbin 1210 may cause movement of the lens module to be close to or away from the image sensor, and according to the present embodiment, power may be supplied to the AF driving coil 1220 to adjust a focus of a subject. The aforementioned focus adjustment may be automatically performed depending on a distance of the subject.

In the camera module according to the present embodiment, auto focus feedback control may be performed for more accurately perform the auto focus function. The first sensor 1710 disposed in the housing 1310 may detect a magnetic field of the sensing magnet 1730 disposed on the bobbin 1210. Accordingly, when the bobbin 1210 is relatively moved with respect to the housing 1310, the amount of the magnetic field detected by the first sensor 1710 may be changed. The first sensor 1710 may detect a movement amount of the bobbin 1210 or a position of the bobbin 1210 using such a method and may transmit the detection value to the controller. The controller may determine whether the bobbin 1210 is additionally moved, through the received detection value. Such a process is performed in real time, and thus the auto focus function of the camera module according to the present embodiment may be more accurately performed through auto focus feedback control. According to the present embodiment, the first sensor 1710 is installed in the hall driver IC 1070 having the temperature detection function, and thus, even if a temperature change occurs, accurate auto focus feedback control may be embodied.

The hand shake correction function of the camera module according to the present embodiment will be described. When power is supplied to the OIS driving coil 1422, the driving magnet 1320 may be moved with respect to the OIS driving coil 1422 through electromagnetic interaction between the OIS driving coil 1422 and the driving magnet 1320. In this case, the housing 1310 to which the driving magnet 1320 is coupled may be moved integrally with the driving magnet 1320.

That is, the housing 1310 may be moved with respect to the base 1430 in a horizontal direction (which is a direction perpendicular to the optical axis). However, in this case, tilt of the housing 1310 with respect to the base 1430 may be guided. The bobbin 1210 may be moved integrally with the housing 1310 with respect to movement of the housing 1310 in a horizontal direction. Accordingly, such movement of the housing 1310 may cause movement of the lens module coupled to the bobbin 1210 with respect to the image sensor in a direction parallel to a direction in which the image sensor is put. That is, according to the present embodiment, power may be supplied to the OIS driving coil 1422 to perform the hand shake correction function.

Hand shake correction feedback control may be performed for a more accurate hand shake correction function of the camera module according to the present embodiment. The second sensor unit 1800 disposed on the base 1430 may detect a magnetic field of the driving magnet 1320 disposed in the housing 1310. Accordingly, when the housing 1310 is relatively moved with respect to the base 1430, the amount of the magnetic field detected by the second sensor unit 1800 may be changed. A pair of the second sensor units 1800 may detect the movement amount or position of the housing 1310 in a horizontal direction (x-axis and y-axis directions) using such a method and may transmit the detection value to the controller. The controller may determine whether the housing 1310 is additionally moved, through the received detection value. Such a process may be performed in real time, and thus the hand shake correction function of the camera module according to the present embodiment may be more accurately performed through hand shake correction feedback control.

The lens moving apparatus 100 according to an embodiment may be included in an optical instrument that forms an image of an object in a space using optical characteristics including reflection, refraction, absorption, inference, diffraction, and the like in order to enhance visual power of eyes, to record or reproduce an image via a lens, to perform optical measurement, or to propagate or transmit the image. For example, the optical instrument according to an embodiment may include a smart phone, and a portable terminal with a camera installed thereon.

FIG. 34 is a perspective view of a portable terminal 200A according to an embodiment. FIG. 35 is a diagram showing a configuration of the portable terminal shown in FIG. 34.

Referring to FIGS. 34 and 35, the portable terminal 200A (hereinafter, referred to as a "terminal") may include a body 850, a wireless communication unit 710, audio/video (A/V) input unit 720, a sensing unit 740, an input/output unit 750, a memory unit 760, an interface unit 770, a controller 780, and a power supply 790.

The body 850 shown in FIG. 34 may be configured in the form of a bar, but embodiments are not limited thereto, and two or more sub-bodies may be coupled to be relatively moved and may be configured in various structures such as a slide type, a folder type, a swing type, or a swirl type.

The body 850 may include a case (e.g., a casing, a housing, or a cover) which forms an outer appearance. For example, the body 850 may be divided into a front case 851 and a rear case 852. Various electronic components of the terminal may be installed in a space formed between the front case 851 and the rear case 852.

The wireless communication unit 710 may include one or more modules for enabling wireless communication between the terminal 200A and a wireless communication system or between the terminal 200A and a network in which the terminal 200A is positioned. For example, the wireless communication unit 710 may include a broadcast receiving module 711, a mobile communication module 712, a wireless internet module 713, a near field communication module 714, and a location information module 715.

The A/V input unit 720 may be used to input an audio signal or a video signal and may include a camera 721, a microphone 722, and the like.

The camera 721 may be a camera 200 including the camera module according to the embodiment shown in FIG. 22 or 33.

The sensing unit 740 may detect a current state of the terminal 200A, such as an opening and closing state of the terminal 200A, a position of the terminal 200A, whether user contact is present, a bearing of the terminal 200A, and acceleration/deceleration of the terminal 200A and may generate a sensing signal for controlling an operation of the terminal 200A. For example, when the terminal 200A is configured in the form of a slide phone, whether the slide phone is open and closed may be sensed. In addition, the sensing unit 740 may perform a sensing function related to whether the power supply 790 supplies power, whether the interface unit 770 is coupled to an external device, or the like.

The input/output unit 750 may generate input or output related to vision, hearing, touch, or the like. The input/output unit 750 may generate input data for controlling an operation of the terminal 200A and may display information processed by the terminal 200A.

The input/output unit 750 may include a key pad portion 730, a display panel 751, a sound output module 752, and a touchscreen panel 753. The key pad portion 730 may generate input data in response to key pad input.

The display panel 751 may include a plurality of pixels, color of which is changed depending on an electric signal. For example, the display panel 751 may include at least one of a liquid crystal display, a thin film transistor-liquid crystal display, an organic light-emitting diode, a flexible display, and a 3D display.

The sound output module 752 may output audio data that is received from the wireless communication unit 710 in a call signal reception mode, a phone calling mode, a recording mode, a voice recognition mode, a broadcast reception mode, or the like, or may output audio data stored in the memory unit 760.

The touchscreen panel 753 may convert a change in capacitance generated by a user touch on a specific region of a touchscreen into an electric input signal.

The memory unit 760 may store a program for processing and controlling the controller 780 and may temporally store input/output data (e.g., a telephone directory, a message, audio, a still image, a picture, or a video image). For example, the memory unit 760 may store an image captured by the camera 721, for example, a picture or a video image.

The interface unit 770 may function as a path for connecting with an external device connected to the terminal 200A. The interface unit 770 may receive data from an external device, may receive power and may transmit the power to each component inside the terminal 200A, or may transmit data inside the terminal 200A to the external device. For example, the interface unit 770 may include a wired/wireless head port, an external charger port, a wired/wireless data port, a memory card port, a port for connection with a device including an identification module, an audio input/output (I/O) port, a video I/O port, an earphone port, and the like.

The controller 780 may control an overall operation of the terminal 200A. For example, the controller 780 may perform related control and process for voice call, data communication, video call, and the like.

The controller 780 may include a multimedia module 781 for multimedia reproduction. The multimedia module 781 may be embodied in the controller 780 or may be separately embodied from the controller 780.

The controller 780 may perform pattern recognition process for recognizing writing input or drawing input performed on a touchscreen as a character and an image.

The power supply unit 790 may receive external power or internal power and may supply power required for an operation of each component under control of the controller 780.

Features, structures and effects and the like described associated with the embodiments above are incorporated into at least one embodiment of the disclosure, but are not limited to only one embodiment. Furthermore, features, structures and effects and the like exemplified associated with respective embodiments can be implemented in other embodiments by combination or modification by those skilled in the art. Therefore, contents related to such combinations and modifications should be construed as falling within the scope of the disclosure.

INDUSTRIAL APPLICABILITY

Embodiments may be used in a lens moving apparatus, and a camera module and optical instrument including the same, for reducing the sizes, reducing current consumption, and enhancing the sensitivity of driving of an optical image stabilizer (OIS).

The invention claimed is:

1. A lens moving apparatus comprising:
   a housing;
   a bobbin disposed in the housing;
   a first coil disposed on the bobbin;
   a first magnet disposed on the housing;
   a first circuit board disposed on the housing;
   a first position sensor disposed on the first circuit board and electrically connected to the first circuit board;
   an upper elastic member coupled with an upper portion of the housing;
   a lower elastic member coupled with a lower portion of the housing and electrically connected to the first coil;
   a second circuit board disposed below the housing; and
   a supporting member electrically connecting the upper elastic member and the second circuit board,
   wherein the first circuit board comprises:
   an upper portion;
   a lower portion disposed under the upper portion of the first circuit board;
   first to fourth pads disposed on the upper portion of the first circuit board and electrically connected to the upper elastic member; and
   fifth and sixth pads disposed on the lower portion of the first circuit board and electrically connected to the lower elastic member.

2. The lens moving apparatus of claim 1, wherein the first position sensor is configured to provide a driving signal to the first coil through the lower elastic member and the fifth and sixth pads.

3. The lens moving apparatus of claim 1, wherein the first position sensor is a hall driver integrated circuit (IC) comprising a driver and a hall sensor.

4. The lens moving apparatus of claim 1, wherein the upper elastic member comprises a first upper spring, a second upper spring, a third upper spring, and a fourth upper spring,
   wherein the first upper spring is coupled with the first pad of the first circuit board by a solder or a conductive member,
   wherein the second upper spring is coupled with the second pad of the first circuit board by a solder or a conductive member, wherein the third upper spring is coupled with the third pad of the first circuit board by a solder or a conductive member, and wherein the fourth upper spring is coupled with the fourth pad of the first circuit board by a solder or a conductive member.

5. The lens moving apparatus of claim 1, wherein the lower elastic member comprises a first lower spring and a second lower spring, and wherein the first lower spring is coupled with the fifth pad through a solder or a conductive member and the second lower spring is coupled with the sixth pad through a solder or a conductive member.

6. The lens moving apparatus of claim 4, wherein the supporting member comprises a first supporting member coupled with the first upper spring, a second supporting member coupled with the second upper spring, a third supporting member coupled with the third upper spring, and a fourth supporting member coupled with the fourth upper spring.

7. The lens moving apparatus of claim 6, wherein the first to fourth supporting members are disposed at four corner portions of the housing, respectively.

8. The lens moving apparatus of claim 1, comprising a second magnet disposed on the bobbin and opposite to the first position sensor.

9. The lens moving apparatus of claim 8, wherein the bobbin comprises a groove in which the second magnet is disposed, and wherein the second magnet overlaps the first coil in a direction perpendicular to an optical axis.

10. The lens moving apparatus of claim 1, wherein the second circuit board comprises a second coil opposite to the first magnet and, wherein the second coil is configured to move the housing a direction perpendicular to an optical axis by an interaction with the first magnet.

11. The lens moving apparatus of claim 1, comprising:
a base disposed under the second circuit board; and
a second position sensor comprising a first sensor and a second sensor and configured to detect a displacement of the housing in a direction perpendicular to an optical axis.

12. The lens moving apparatus of claim 10, wherein the second circuit board comprises a terminal surface bent from an upper surface thereof and a plurality of terminals formed on the terminal surface.

13. The lens moving apparatus of claim 1, wherein the upper elastic member comprises an external frame coupled with the upper portion of the housing, an internal frame coupled to an upper portion of the bobbin, and a frame connecting portion connecting the external frame and the internal frame.

14. The lens moving apparatus of claim 13, wherein the external frame comprises:
a first coupling portion coupled with a corner portion of the housing:
a second coupling portion coupled with the supporting member;
a first connecting portion connecting a first region of the first coupling portion and the second coupling portion; and
a second connecting portion connecting a second region of the first coupling portion and the second coupling portion.

15. The lens moving apparatus of claim 14, wherein the first connecting portion comprises a portion in which a width of the first connecting portion decreases in a direction toward the second coupling portion from the first region of the first coupling portion, and wherein the second connecting portion comprises a portion in which a width of the second connecting portion decreases in a direction toward the second coupling portion from a second region of the first coupling portion.

16. The lens moving apparatus of claim 1, wherein the first magnet comprises four magnet units and the housing comprises four corner portions, and wherein the four magnet units are disposed on the four corner portions of the housing, respectively.

17. A camera module comprising:
a lens;
the lens moving apparatus according to claim 1; and
an image sensor.

18. A mobile phone comprising the camera module according to claim 17.

* * * * *